United States Patent [19]
Suzuki et al.

[11] Patent Number: 5,708,869
[45] Date of Patent: Jan. 13, 1998

[54] IMAGE MAGNIFICATION CONTROL DEVICE FOR A CAMERA

[75] Inventors: Noboru Suzuki; Shigeo Toji, both of Tokyo; Masahiro Kawasaki, Saitama-ken, all of Japan

[73] Assignee: Asahi Kogaku Kogyo Kabushiki Kaisha, Tokyo, Japan

[21] Appl. No.: 701,759

[22] Filed: Aug. 22, 1996

Related U.S. Application Data

[62] Division of Ser. No. 431,284, Apr. 28, 1995, abandoned, which is a division of Ser. No. 373,369, Jan. 17, 1995, Pat. No. 5,541,702, which is a division of Ser. No. 149,226, Nov. 2, 1993, Pat. No. 5,428,419, which is a continuation of Ser. No. 881,785, May 11, 1992, Pat. No. 5,283,607, which is a continuation of Ser. No. 652,038, Feb. 4, 1991, Pat. No. 5,159,377, which is a continuation of Ser. No. 410,880, Sep. 22, 1989, Pat. No. 5,093,680.

[30] Foreign Application Priority Data

| Sep. 22, 1988 | [JP] | Japan | 63-237570 |
| Sep. 22, 1988 | [JP] | Japan | 63-237571 |
| Sep. 22, 1988 | [JP] | Japan | 63-237572 |
| Sep. 22, 1988 | [JP] | Japan | 63-237573 |
| Sep. 22, 1988 | [JP] | Japan | 63-237574 |
| Sep. 22, 1988 | [JP] | Japan | 63-237575 |

[51] Int. Cl.⁶ .................................................. G03B 1/18
[52] U.S. Cl. .................................................. 397/77; 396/104
[58] Field of Search .................................. 396/72, 77, 78, 396/104

[56] References Cited

U.S. PATENT DOCUMENTS

| 4,446,526 | 5/1984 | Iwande . |
| 4,491,396 | 1/1985 | Isobe et al. . |
| 4,500,778 | 2/1985 | Kusaka et al. . |
| 4,508,443 | 4/1985 | Matsuzaki et al. . |
| 4,509,842 | 4/1985 | Taniguchi et al. . |
| 4,145,732 | 3/1979 | Pandres, Jr. . |

(List continued on next page.)

FOREIGN PATENT DOCUMENTS

| 53-113527 | 10/1978 | Japan . |
| 54-25819 | 2/1979 | Japan . |
| 57-165806 | 10/1982 | Japan . |
| 58-103273 | 6/1983 | Japan . |
| 59-64816 | 4/1984 | Japan . |
| 59-177510 | 10/1984 | Japan . |
| 60-1602 | 1/1985 | Japan . |
| 61-26015 | 2/1986 | Japan . |

(List continued on next page.)

OTHER PUBLICATIONS

English Language Abstract of JP 1-131509.
English Language Abstract of JP 1-123026.
English Language Abstract of JP 1-99012.
English Language Abstract of JP 1-99011.
English Language Abstract of JP 64-79713.
English Language Abstract of JP 64-62608.
English Language Abstract of JP 64-56406.
English Language Abstract of JP 64-44429.
English Languge Abstract of JP 64-44228.
English Language Abstract of JP 63-220118.
English Language Abstract of JP 63-5331.
English Language Abstract of JP 63-200340.
English Language Abstract of JP 62-133431.
English Language Abstract of JP 62-133430.
English Language Abstract of JP 62-118328.

(List continued on next page.)

*Primary Examiner*—David M. Gray
*Attorney, Agent, or Firm*—Greenblum & Bernstein P.L.C.

[57] ABSTRACT

An image magnification control device for a camera. Control focal length required to maintain an image magnification constant is computed based upon defocus information detected by analyzing a light that passes through a photographic lens. In case a focal length of the photographic lens moves out of a range wherein the set image magnification can be obtained, various options, such as a shutter-release lock operation, can be executed depending upon the chosen design of the camera.

4 Claims, 42 Drawing Sheets

U.S. PATENT DOCUMENTS

| | | |
|---|---|---|
| 4,156,933 | 5/1979 | Pandres, Jr. . |
| 4,560,267 | 12/1985 | Nakai et al. . |
| 4,623,238 | 11/1986 | Taniguchi et al. . |
| 4,717,933 | 1/1988 | Ando et al. . |
| 4,724,454 | 2/1988 | Misawa . |
| 4,857,951 | 8/1989 | Nakajima et al. . |
| 4,908,643 | 3/1990 | Tamada et al. . |
| 4,935,763 | 6/1990 | Itoh et al. . |
| 4,951,075 | 8/1990 | Tokumaru et al. . |
| 4,962,400 | 10/1990 | Otani et al. . |
| 5,063,402 | 11/1991 | Shimada et al. . |
| 5,093,680 | 3/1992 | Suzuki et al. . |
| 5,113,209 | 5/1992 | Ueyema et al. . |
| 5,159,377 | 10/1992 | Suzuki et al. . |
| 5,283,607 | 2/1994 | Suzuki et al. . |
| 5,428,419 | 6/1995 | Suzuki . |
| 5,541,702 | 7/1996 | Suzuki et al. . |

FOREIGN PATENT DOCUMENTS

| | | |
|---|---|---|
| 61-230111 | 10/1986 | Japan . |
| 61-292608 | 12/1986 | Japan . |
| 62-118328 | 5/1987 | Japan . |
| 62-133430 | 6/1987 | Japan . |
| 62-133431 | 6/1987 | Japan . |
| 62-200340 | 9/1987 | Japan . |
| 63-5331 | 1/1988 | Japan . |
| 63-131112 | 6/1988 | Japan . |
| 63-189817 | 8/1988 | Japan . |
| 63-220118 | 9/1988 | Japan . |
| 64-44428 | 2/1989 | Japan . |
| 64-44429 | 2/1989 | Japan . |
| 64-56406 | 3/1989 | Japan . |
| 64-62608 | 3/1989 | Japan . |
| 64-79713 | 3/1989 | Japan . |
| 1-99011 | 4/1989 | Japan . |
| 1-99012 | 4/1989 | Japan . |
| 1123026 | 5/1989 | Japan . |
| 1131509 | 5/1989 | Japan . |
| 1179113 | 7/1989 | Japan . |
| 1232311 | 9/1989 | Japan . |
| 1307711 | 12/1989 | Japan . |
| 2-12116 | 7/1990 | Japan . |
| 61-38917 | 2/1996 | Japan . |

OTHER PUBLICATIONS

English Language Abstract of JP 61—230111.
English Language Abstract of JP 61–38917.
English Language Abstract of JP 61–26015.
English Language Abstract of JP 53–113527.
Infinity Super Zoom 300 Camera Instruction Manual, p. 67, published Jul. 1988.
A Copy of an Office Action issued by the European Patent Office on Aug. 11, 1994.
Patent Abstracts of Japan, vol. 13, No. 12 (P–812) [3360], Dec. 1, 1989.
An English Language Abstract of JP–A–60 001602.
A Copy of a Search Report issued by the European Patent Office in EP 94 10 8436.
Patent Abstracts of Japan, vol. 10, No. 195 (P–475) (2251), Jul. 9, 1986.
A Copy of a Search Report issued by the European Patent Office in EP 94 10 6154.
Patent Abstracts of Japan, vol. 9, No. 33 (P–334) (1756), Feb. 13, 1985.

IMAGE MAGNIFICATION CONTROL DEVICE FOR A CAMERA

This application is a division, of application Ser. No. 08/431,284, filed Apr. 28, 1995 now abandoned, which is a division of application Ser. No. 08/373,369, filed Jan. 17, 1995, which issued as U.S. Pat. No. 5,541,702 on Jul. 30, 1996, which is a division of application Ser. No. 08/149,226, filed Nov. 2, 1993, which issued as U.S. Pat. No. 5,428,419 on Jun. 27, 1995, which is a continuation of application Ser. No. 07/881,785, filed May 11, 1992, which issued as U.S. Pat. No. 5,283,607 on Feb. 1, 1994, which is a continuation of application Ser. No. 07/652,038, filed Feb. 4, 1991, which issued as U.S. Pat. No. 5,159,377 on Oct. 27, 1992, which is a continuation of application Ser. No. 07/410,880, filed on Sep. 22, 1989, which issued as U.S. Pat. No. 5,093,680 on Mar. 3, 1992.

BACKGROUND OF THE INVENTION

This invention relates to an image magnification control device for a camera, wherein photographic lens for a camera, including single lens reflex cameras and video still cameras, is driven and controlled by a zoom drive means so as to automatically control an image magnification of the photographic lens to a predetermined magnification.

A desirable feature for a power zoom camera is to be able to maintain a constant image magnification of an object as the distance between the object and the camera varies. For instance, when taking a series of continuous photographs, of for instance, a baseball player running to catch a ball, the photographer may wish that the baseball player occupies the same area of the film frame as the player moves. This can be accomplished by varying the focal length of the lens as the player moves. Unfortunately, an individual cannot change the magnification value (by changing the focal length of the lens) fast enough and accurately enough to achieve the desired result.

Over the years, camera manufacturers have developed power zoom lenses for lens shutter cameras. This enables a photographer to quickly and smoothly change the focal length of the camera lens. Lens shutter cameras typically employ a triangulation technique to determine the distance of an object to be photographed from the camera. In the triangulation technique, a source of light, such as infrared or ultrasonic, is emitted by the camera. The light source is bounced off of an object to be photographed and returned to the camera. By utilizing the triangulation technique, the distance "a" of the object can be determined.

The magnification value of a lens shutter camera is determined by an equation m=f/a, where "m" equals the magnification value, "f" equals the focal length of the lens and "a" equals the distance of the object from the camera. If a constant picture image size is to be maintained, the lens shutter camera must merely determine the distance of the object from the camera and change the focal length of the lens according to the above equation, so that the magnification value, "m", remains constant. This is easily accomplished with a power zoom, autofocus, lens shutter camera.

Many individuals prefer using interchangeable lens cameras, such as SLR cameras, because a plurality of different lenses can be easily attached to a camera body. It would be desirable to enable an interchangeable lens camera to also be able to maintain the constant picture image size as the object to be photographed moves relative to the camera. However, constant image magnification techniques that are applicable to lens shutter cameras are not applicable to interchangeable lens cameras.

In an interchangeable lens camera, triangulation techniques are generally not used for focusing purposes because of inherent inaccuracies in such a system. Such inaccuracies are accept able when a small size lens (i.e., 70 mm) is used, but is unacceptable when a large size lens (i.e., 200 mm) is employed. Due to the intrinsic errors of the triangulation technique, manufacturers developed a technique for focusing an object based on the amount of defocus of the object to be photographed. Two such defocus techniques are a phase difference detection (PDD) method and a contrast difference (CD) method.

A camera employing the defocus technique for focusing does not determine the distance "a" of an object from the camera. Thus, it is not possible to maintain a constant image magnification value "m" as the distance "a" of the object changes, using the techniques developed for lens shutter cameras (i.e., m=f/a). Because it is desired that the typical interchangeable lens camera be able to maintain a constant image magnification value as the distance of an object to be photographed from the camera moves, an alternative system must be developed.

Two methods exist for making an image on a film frame occupy the same amount of space, even though the distance between the object to be photographed and the camera varies. In the first method, the photographer preliminarily sets the size of the image before taking a picture. For instance, the photographer can select a portrait mode of operation, after which all pictures that are taken will be of the portrait type. In the second method, the camera photographer views the size of the image (as shown in the viewfinder) and adjusts the focal length of the lens until he likes the size. Then, the operator "fixes" the size. Thereafter, even if the object moves or the lens zooms, the image size of the object will be fixed. The present invention embodies both methods for making the image constant.

An image magnification control device for a camera, using a linking mechanism for a zoom lens device is disclosed, for example, in Japanese Patent Publication No. SHO 60-1602. In this prior art, a cam mechanism provided in a zoom lens controls the amount of zooming of the zoom lens so as to keep the ratio of a real subject length and a real focal length constant. Moreover, in this cam mechanism, a cam surface provided in a lens barrel is formed in a shape of a logarithmic curve. By touching a linked roller which travels in the forward and backward directions in parallel with the lens axis to the cam surface using a spring, as the lens barrel rotates, the linked roller follows the cam surface. In addition, a variable resistor is linked with the linked roller so as to control the amount of zooming by means of such a variable resistor.

However, it is preferred that the position where the linked roller touches the cam surface be at the intersection of a plane including the center line of the linked roller and the lens axis and of the cam surface.

However, there is a limit to how much one can decrease the radius of the linked roller. Since the cam surface is in the shape of a logarithmic curve, rather than a linear shape the position where the linked roller touches the cam surface deviates from the intersection described above due to a change of slope of the cam surface. Thus, there is a tendency for the amount of deviation to depend on the degree of the slope of the cam surface. Such a deviation is undesirable for a precise zooming control.

In addition, it is very difficult to accurately machine a cam surface, with a high precision, in the shape of a logarithmic curve.

Further, a camera which is equipped with a CPU used for conducting an autofocus control and process control has been developed. For such a camera, motors therein may drive a zoom lens and conduct the image magnification.

When a release process is performed while a subject is out of the range where the image magnification can be controlled, a photograph is taken in the condition where a predetermined image magnification is not obtained, resulting in an undesirable situation.

In this case, when a subject moves out of a range where the image magnification can be controlled, the image magnification control is temporarily stopped. When the subject moves back too many spaces into the allowable range of the image magnification control, it is desirable to resume the image magnification control. In addition, it is preferred that this operation be conducted simply.

Moreover, there has been a camera which is equipped with an interchangeable lens. For such a camera, motors therein may drive a zoom lens and conduct the image magnification.

In the meantime, when such an image magnification control is performed in a sequence shot mode, if a subject moves after it has been focused and until the next release process is conducted, the next photograph would be unfocused.

Further, new types of electronically controlled cameras have been developed having features, such as autofocus control and program control. Conventionally, a camera has been known wherein a focus lock takes place when a subject is focused and a light metering operation is started by turning ON a light metering switch in an auto and in-focus priority mode. As another prior art camera, a camera has been devised wherein pressing an image magnification mode setting switch allows an autofocus operation and power zoom operation to take place regardless of the distance to a subject so as to automatically control an image magnification of a photographic lens. By confining the functions of the above cameras, the performance of such cameras can be enhanced.

SUMMARY OF THE INVENTION

Accordingly, an object of the present invention is to provide a technique for maintaining a constant image magnification value of an object that moves relative to the camera, by varying the focal length of the lens secured to the camera.

An advantage of the present invention is its applicability to all types of cameras, such as lens shutter cameras, SLR cameras, electronic video cameras and electronic still cameras.

Another advantage of the present invention is the ability to provide an image magnification control device which can automatically control an image magnification to a predetermined value without using a cam mechanism.

Another object of the present invention is to provide an image magnification control device which prohibits a user from taking a photograph when a subject is not in the allowable range of the image magnification control, until the subject is in the allowable range so as to prevent wasteful photographs.

A further object of the present invention is to provide an image magnification control device for interchangeable lens cameras which can easily set an image magnification from the outside.

A further object of the present invention is to provide an image magnification control device for a camera wherein after a subject is focused and a shutter is released in the sequence shot mode, the subject is focused again, so that in-focus photographs can be taken even if the subject, which has been previously focused, moves between shutter release operations.

Another object of the present invention is to provide an image magnification control device for a camera which satisfies both the focus lock function and image magnification function in the manner that when the image magnification control signal is output from the image magnification setting means in the in-focus priority mode of the priority mode selection switch, the light metering switch is turned ON and a subject is focused, so that the image magnification control takes place rather than the focus lock.

For the above purposes, according to the present invention, there is provided an image magnification control device for a camera, which controls the image magnification to be a set magnification, comprising:

means for detecting defocus information by analyzing a light that passed through the photographic lens;

means for computing a control focal length, which is required to maintain the image magnification at the set magnification, based upon the defocus information detected by the detection means; and means for controlling a focal length of the photograph Lens in response to the computation means so as to maintain a constant image magnification.

Optionally, the image magnification setting means may comprise an external setting means to set the image magnification from outside the camera.

According to another aspect of the invention, there is provided an image magnification control device for a camera, comprising:

means for detecting a distance "$X_o$" between a rear focal point of a photographic lens and an in-focus position of the photographic lens from a delivery-amount of a focusing lens;

means for detecting defocus information "dx" of the photographic lens by analyzing light that passed through the photographic lens;

means for detecting a focal length "$f_o$" of the photographic lens;

means for setting an image magnification "$m_o$" for taking a photograph;

means for computing a control focal length "$f_1$" in accordance with an equation:

$$f_1 = \frac{f_o^2 * m_o}{x_0 + dx}$$

using said $x_o$, dx, $f_o$ and $m_o$; and means for controlling the focal length of the photographic lens so as to meet the control focal length.

In another aspect of the invention, there is provided an image magnification control device for a camera comprising:

means for setting an image magnification to a certain magnification;

means for detecting a focal length of a photographic Lens;

means for controlling the focal length of the photographic lens so as to maintain the image magnification set by the image magnification setting means; and means for determining whether tile set image magnification is in a controllable range with the present focal length detected by the detecting means.

Optionally, the above device further comprises means for inhibiting a shutter-release operation until the focal length comes into a range wherein the set image magnification can be obtained when it is determined by the determining means that the image magnification is out of the controllable range.

Also optionally, the above device further comprises means for inhibiting the image magnification control by disabling the focal length control means until the focal length comes into a range wherein the set image magnification can be obtained, when it is determined by the determining means that the image magnification is out of the controllable range.

Moreover, the above device may optionally comprise means for indicating a warning, when it is determined by the determining means that the image magnification is out of the controllable range.

According to another aspect of the invention, there is provided an image magnification control device for a camera, comprising:

means for driving a photographic lens for focusing;

means for driving the photographic lens for zooming;

means for setting an image magnification to a certain magnification;

means for detecting a focal length of the photographic lens; means for determining whether the image magnification set by the image magnification setting means is in a controllable range with the present focal length detected by the detection means; and means for controlling the zoom driving means to maintain the image magnification set by the image magnification setting means, wherein the control means disables at least the zoom driving means or the focus driving means when it is determined by the determining means that the image magnification is out off the controllable range until it is determined by the determining means that the focal length comes back into a range wherein the set image magnification can be obtained.

In still a further aspect of the invention, there is provided an image magnification control device for a camera wherein either a single-shot photographing mode or a sequential-shot photographing mode can be selected, comprising:

means (or setting an image magnification to a certain magnification; and means for controlling a photographic lens so as to maintain the image magnification set by the image magnification setting means, wherein the control meant drives the photographic lens, in the case where the sequential-shot mode is selected, in such a fashion that once a subject is focused at the image magnification set by the in, age magnification setting means in the sequential-shot photographing mode, the focusing operation is sequentially performed at the set image magnification as the subject moves.

Other aspects of the invention provide an image magnification control device for a camera wherein either a focus-priority mode or a shutter-release-priority mode can be selected, comprising means for setting an image magnification to a certain magnification; and means for controlling a photographic lens so as to maintain the image magnification set by the image magnification setting means, wherein the control means executes a focus-lock operation when a subject is focused in the focus-priority mode while the image magnification has not been set, and the control means executes the image magnification control without executing the focus-lock operation when a subject is focused in the focus-priority mode while the image magnification has been set by the image magnification setting means.

DESCRIPTION OF THE ACCOMPANYING DRAWINGS

Figure 14:
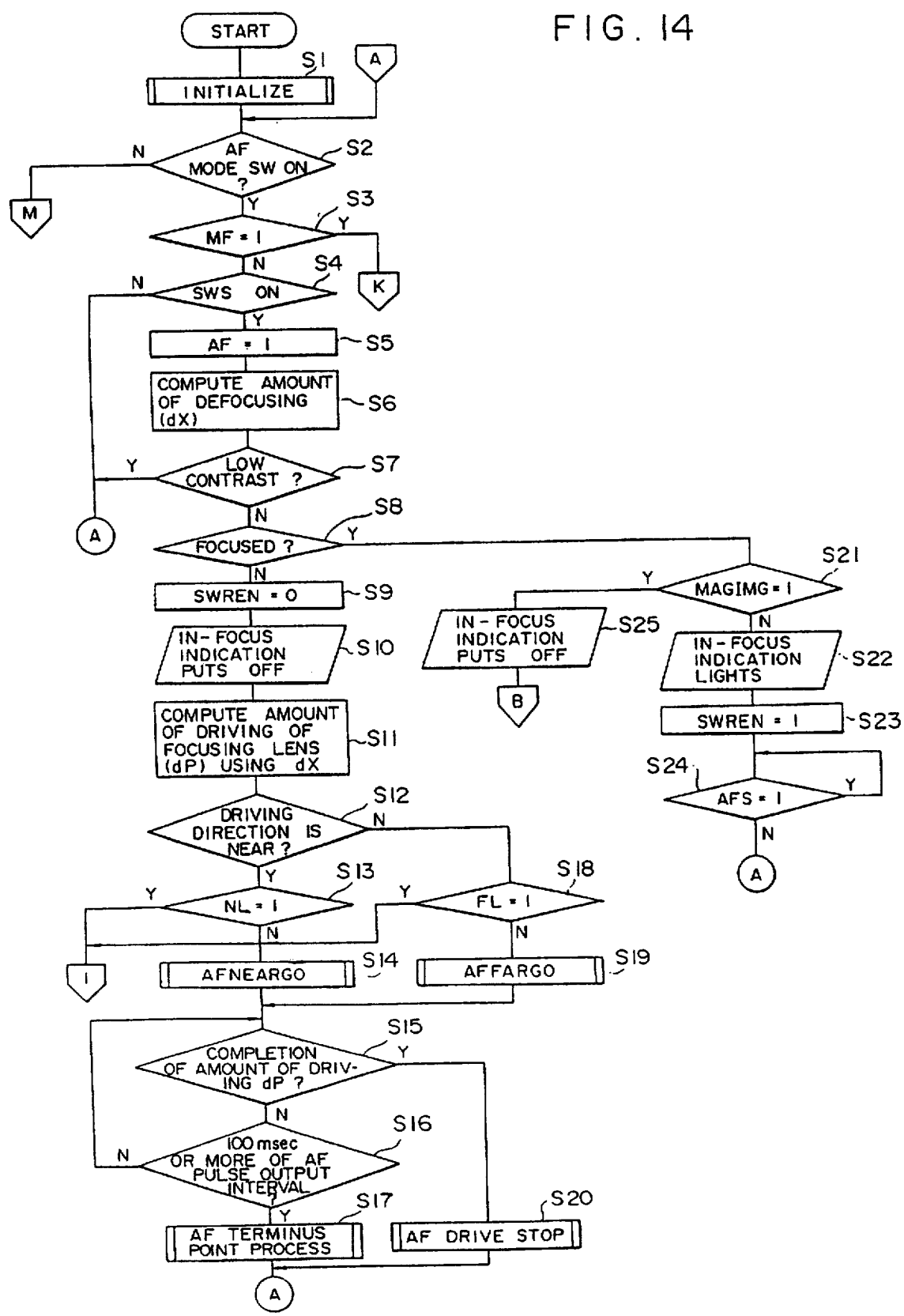
FIGS. 14 to 42 are flow charts describing the operations of the image magnification control device of the camera in accordance with the present invention.
Figure 14A:
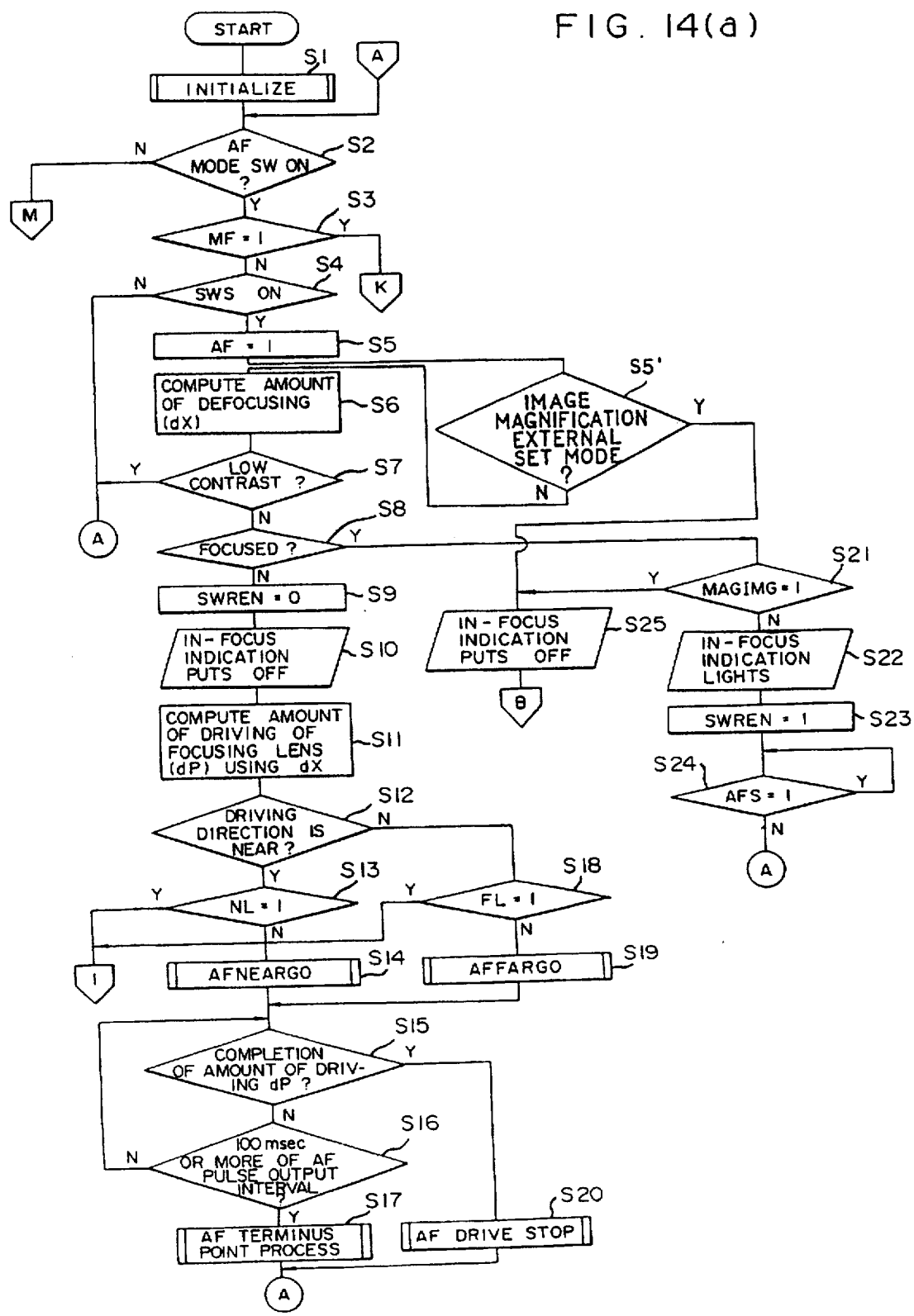
Figure 15:
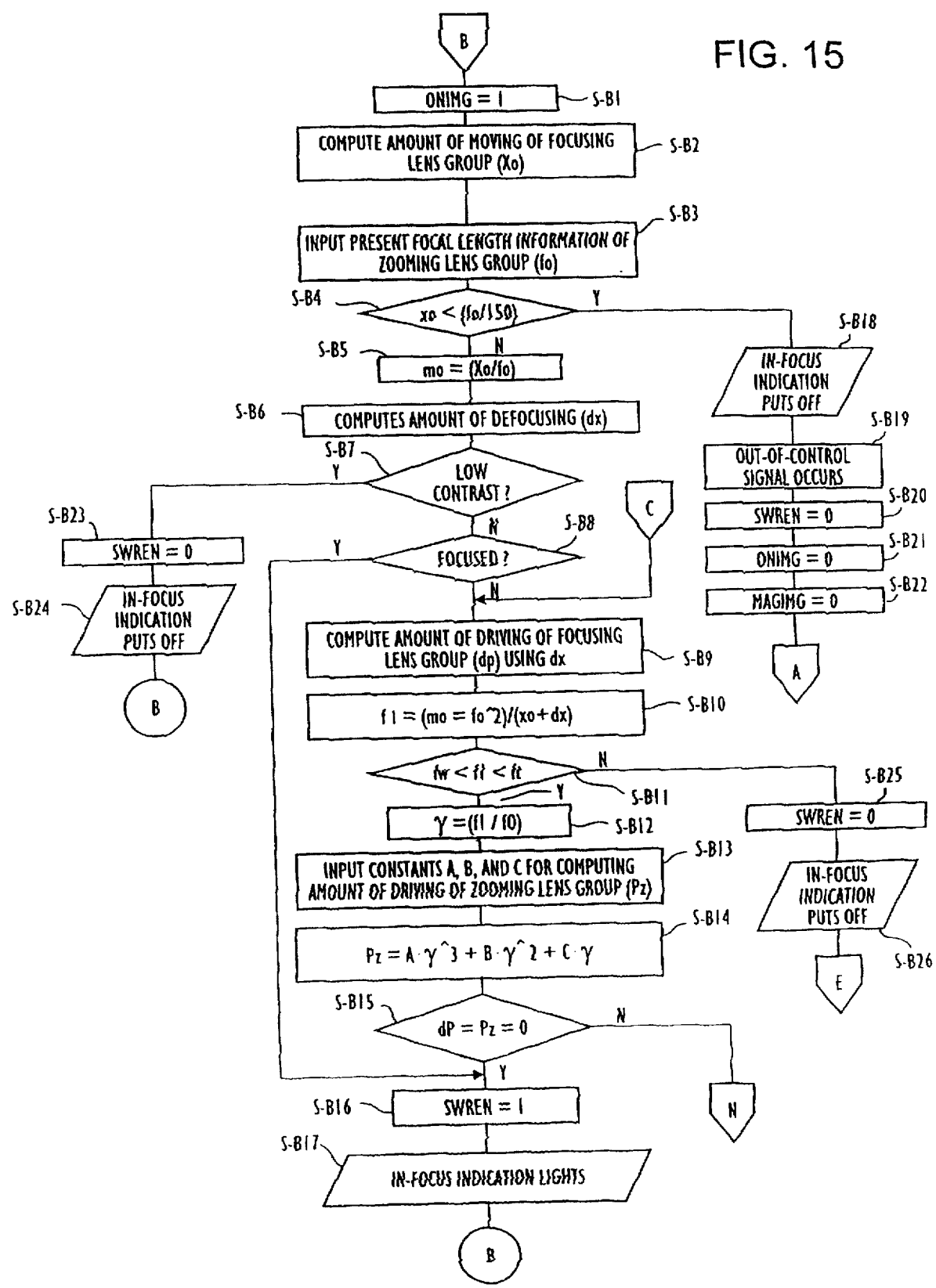
Figure 17:
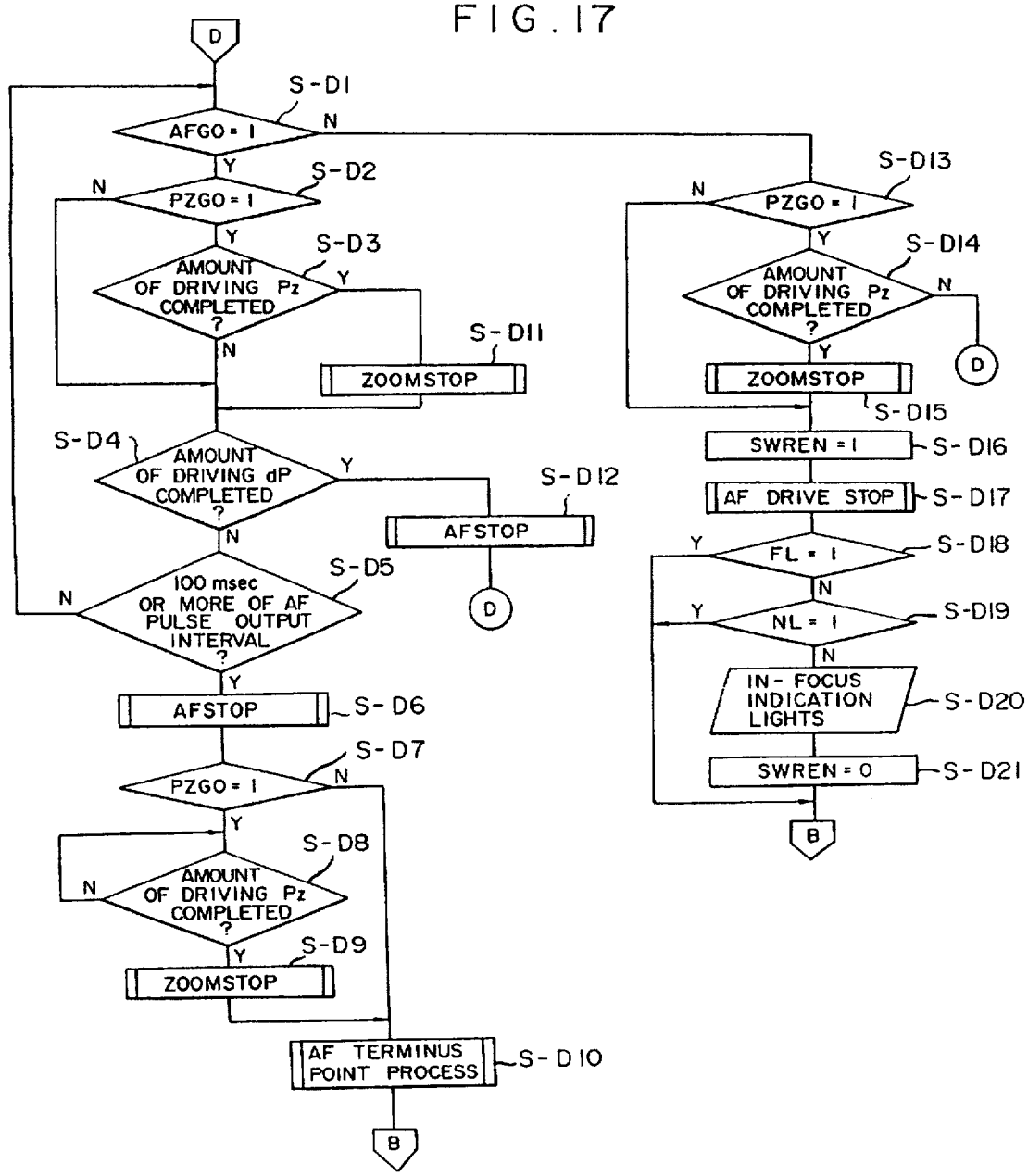
Figure 43:
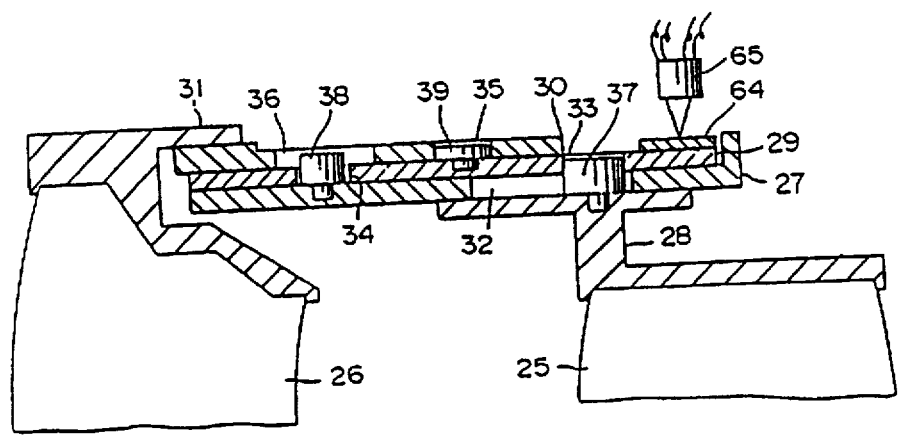
Figure 44:
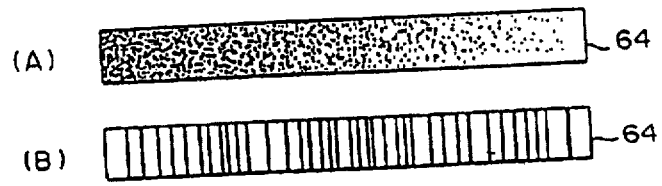
Figure 45:
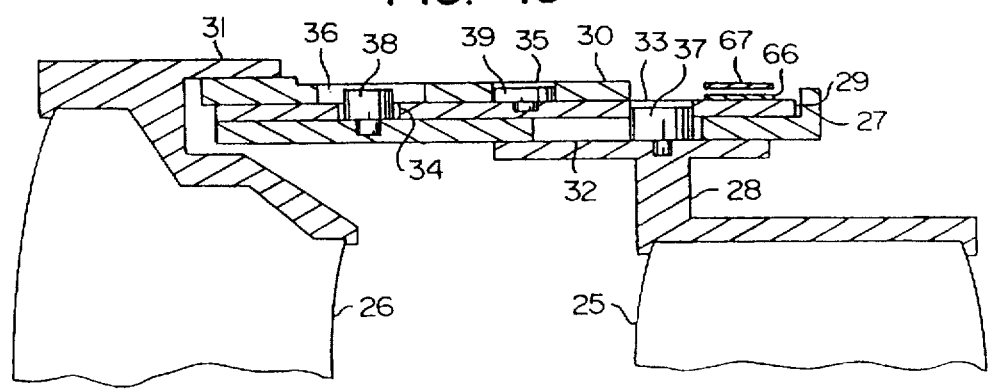
Figure 46:
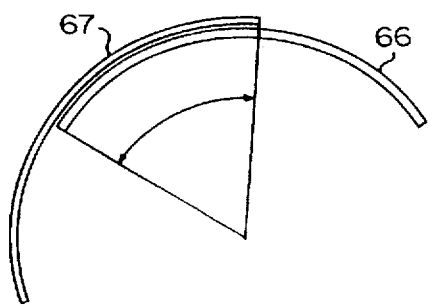
Figure 47:
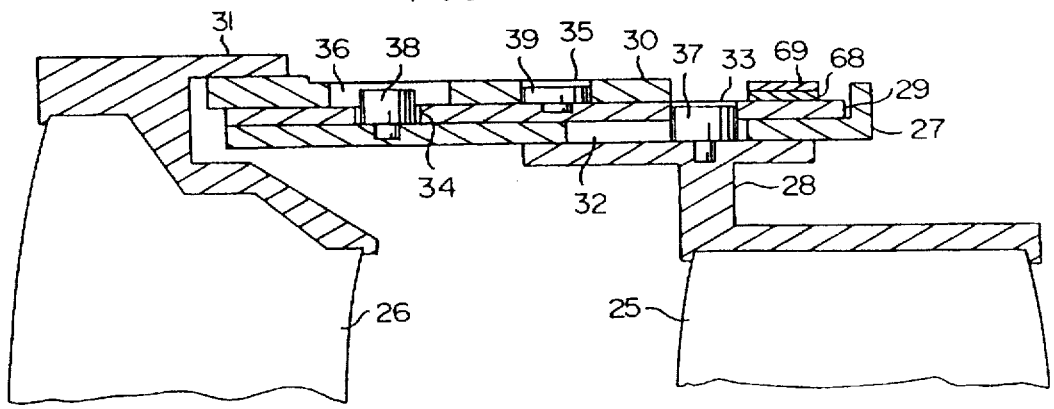
Figure 48:
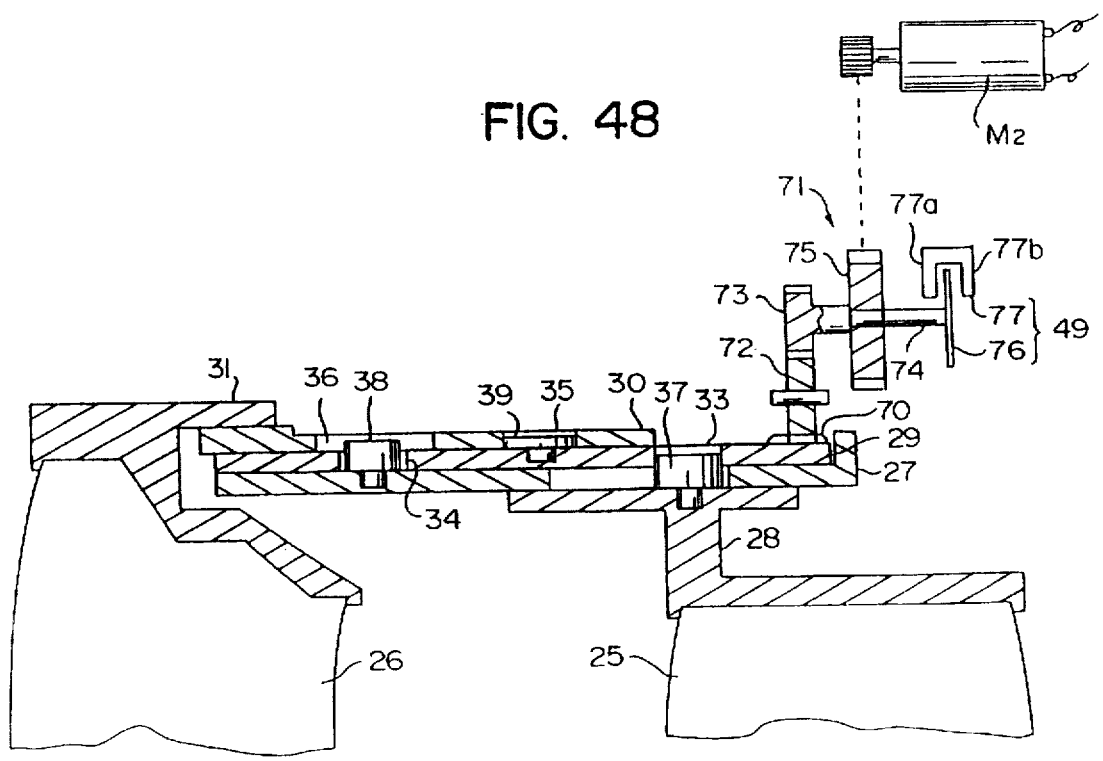
Figure 49:
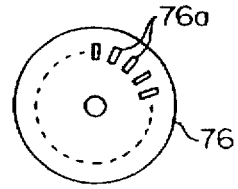
Figure 50:
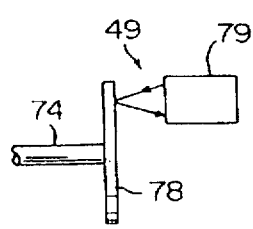
Figure 51:
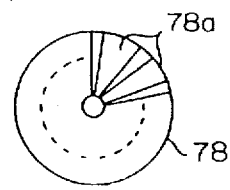
Figure 52:
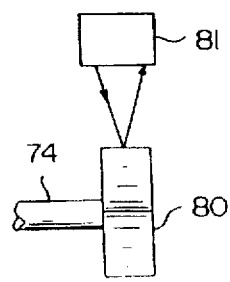
Figure 53:
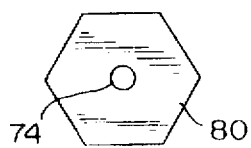

FIGS. 14(a), 15(a), 15(b) and 17(a) are modifications of FIGS. 14, 15 and 17, respectively;

FIG. 43 is a descriptive diagram showing another example of the zoom position detection means for detecting a zoom position of the zooming lens group;

FIG. 44 is an exploded diagram of the reflection plate shown in FIG. 43;

FIG. 45 is a descriptive diagram showing another example of the zoom position detection means for detecting a zoom position of the zooming lens group;

FIG. 46 is a descriptive diagram of an electrode plate shown in FIG. 45;

FIG. 47 is a descriptive diagram of another example of the zoom position detection means for detecting a zoom position of the zooming lens group;

FIG. 48 is a descriptive diagram which conceptually shows an example of the power zoom mechanism of the photographic lens;

FIG. 49 is a front view of a slit plate shown in FIG. 48;

FIG. 50 is a front view of another example of a PZ pulser shown in FIG. 48;

FIG. 51 is a descriptive diagram of a reflection plate shown in FIG. 50;

FIG. 52 is a descriptive diagram showing another example of the PZ pulser shown in FIG. 48; and FIG. 53 is a front view of a multiple side reflector shown in FIG. 52.

DESCRIPTION OF THE EMBODIMENTS

Figure 1:
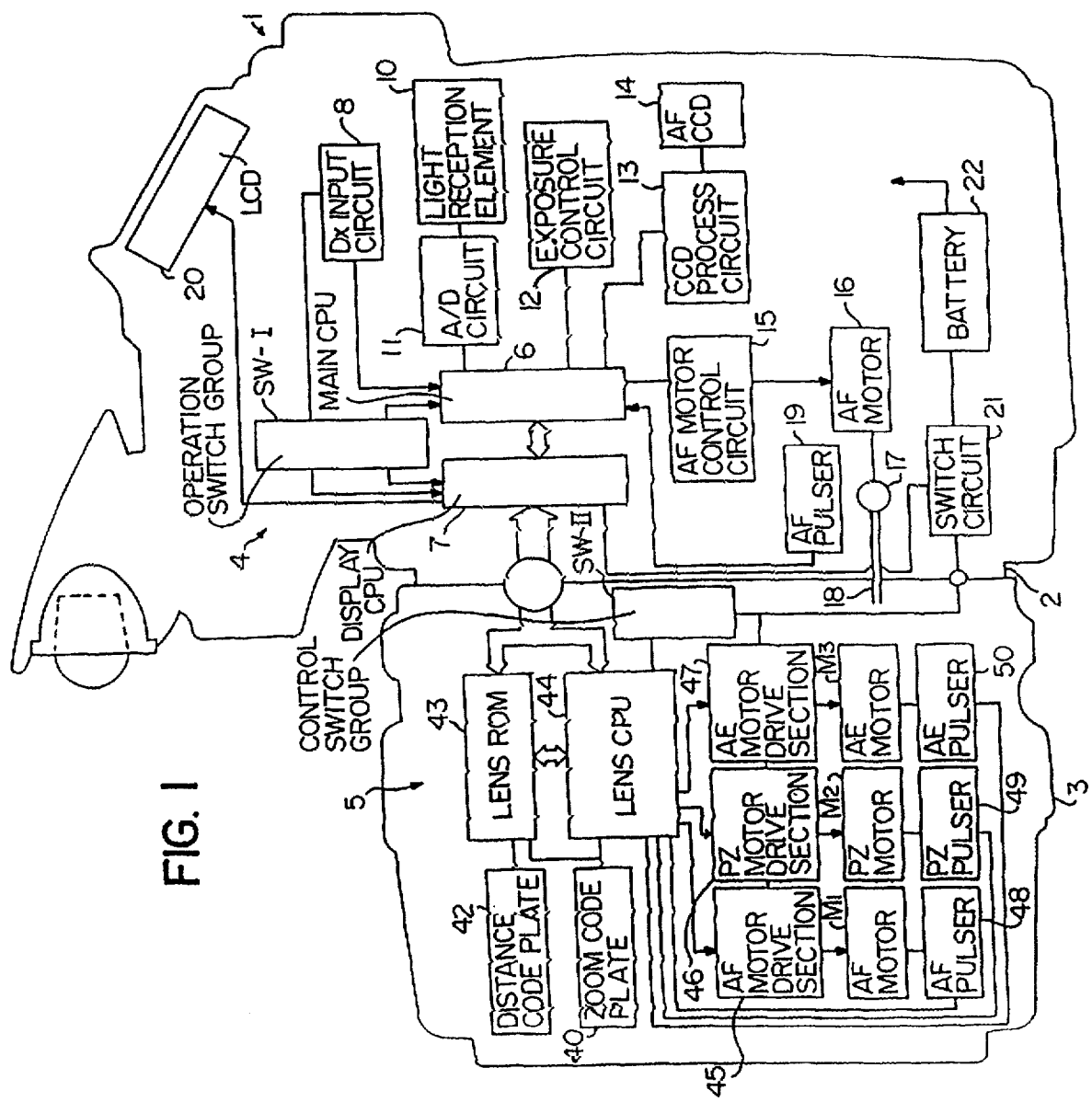
FIG. 1 is a control block circuit diagram of an image magnification control device of a camera in accordance with the present invention.

FIG. 1 illustrates an outlined descriptive diagram of a camera which is provided with a function which keeps an image magnification constant regardless of whether a subject moves. The camera comprises a camera main unit 1, a lens mount 2 that is part of the camera main unit 1, and a photographic lens 3 that is interchangeably mounted on the lens mount 2. The photographic lens 3 is provided with an autofocus mechanism (AF mechanism), comprising a focus drive means and a power zoom mechanism (PZ mechanism) comprising a zoom drive mechanism. In the embodiments, AF and PZ refer to autofocus and power zoom, respectively.

A zoom lens can be constructed in many ways. Two types of zoom lenses are commonly employed in cameras. The first commonly employed type of zoom lens is referred to as a so-called zoom lens. The second type of commonly employed zoom lens is referred to as a vari-focal lens. It is understood that the present invention is not limited to any particular zoom lens construction.

In a so-called zoom lens, light rays that pass through the lens are always projected to a fixed point, such as the film image plane, regardless of the setting of the focal length of the lens. In a vari-focal zoom lens, light rays that pass through the lens are not always projected to a fixed point. That is, the vari-focal lens has the disadvantage that as the focal length of the lens changes, the light rays that pass through the lens falls either in front of or behind the film image plane. Thus, it is necessary to compensate for the positioning of the focusing lens elements so that the light rays will fall onto the film image plane.

Figure 2:
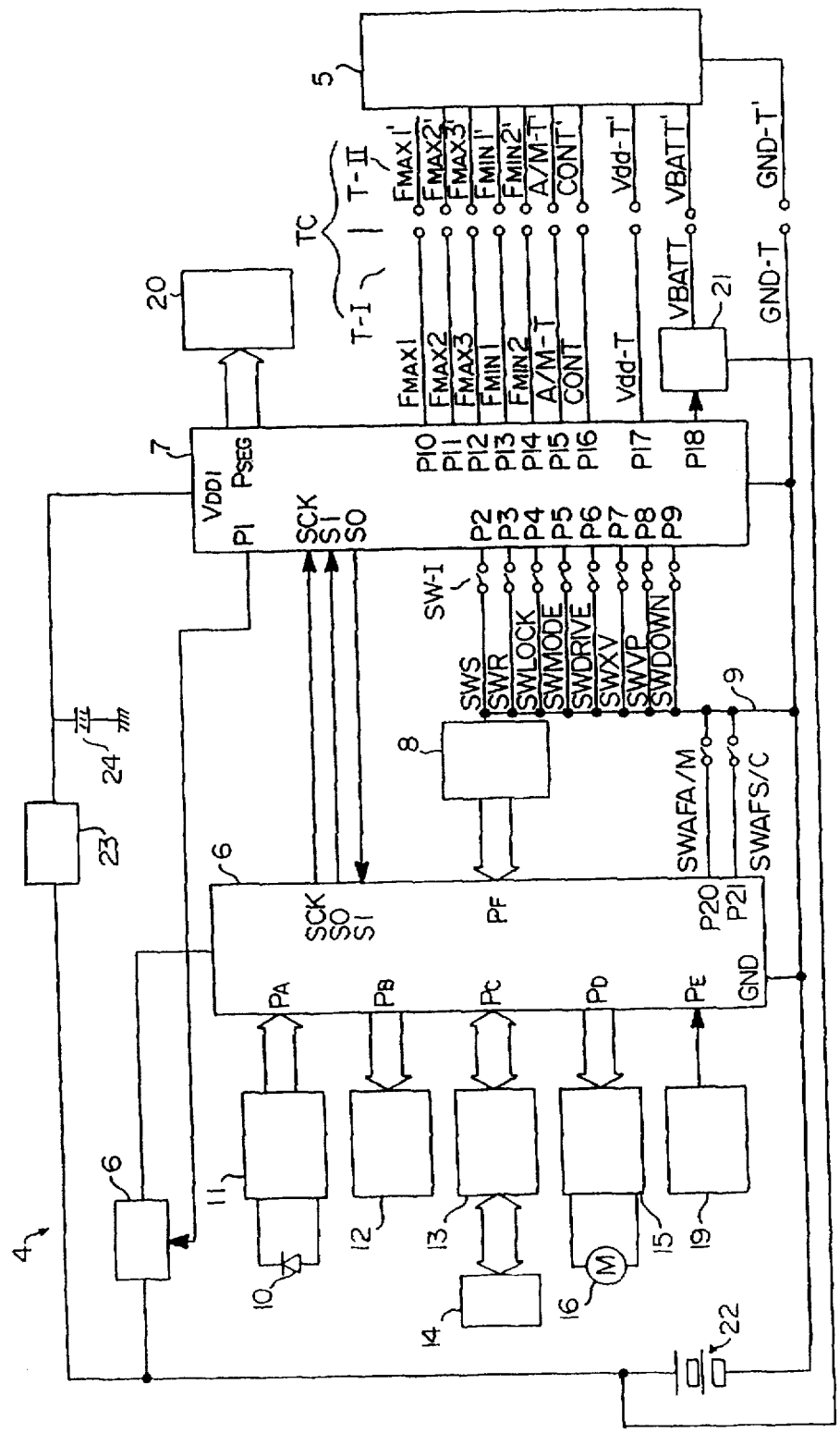
FIG. 2 is a detail circuit diagram of the image magnification control device in a camera body of the camera shown in FIG. 1.

The camera main unit 1 includes a camera control circuit 4, which is more clearly shown in FIG. 2. The photographic lens includes a lens control circuit 5, which is more clearly shown in FIG. 3.

Camera Control Circuit

The camera control circuit 4 comprises a main CPU 6 and a display CPU 7. A serial input terminal SI of the main CPU 6 is connected to a serial output terminal SO of the display CPU 7; a clock terminal SCK of the main CPU 6 is connected to a clock terminal SCK of the display CPU 7.

Terminal PF of the main CPU 6 is connected to a DX circuit 8 for detecting an ISO sensitivity of a film (i.e., a DX code). Terminal P20 of the main CPU 6 is connected to a switch, SWAF A/M, for selecting an automatic operating mode or a ma manual operating mode of the camera main unit 1. Terminal 21 of the main CPU 6 is connected to a switch, SWAF S/C, which selects an in-focus priority mode or a release priority mode of operation.

The DX circuit 8 and switches SWAF A/M and SWAF S/C are connected to a ground wire 9. Terminals P2 to P9 of the display CPU 7 are selectively connected to the ground wire 9 through a switch group SW-I, which includes a light metering switch SWS, a release switch SWR, a power ON/OFF lock switch SWLOCK, a mode switch SWMODE, a drive switch SWDRIVE, an exposure compensation switch SWXV, an up switch SWUP, and a down switch SWDOWN. By operating the mode switch SWMODE, along with the up and down switches SWUP and SWDOWN, a program photograph mode, an automatic photograph mode, a manual photograph mode, and so forth can be selected. In addition, by operating the up and down switches SWUP and SWDOWN along with the drive switch SWDRIVE, a sequence shot (i.e., sequential photography) mode, a single shot (i.e., single photograph) mode, a self-timer mode, and so forth can be selected. Moreover, by operating the up and down switches SWUP and SWDOWN along with the exposure compensation switch SWXV, an exposure value can be compensated. The light metering switch SWS and release switch SWR are actually a single push button that activates a light meter when the switch is depressed halfway and releases the shutter when the switch is fully depressed.

The main CPU 6 includes terminals PA, PB, PC, PD, PE, VDD, and Gnd. A light reception element 10, such as a LED, is used to measure the luminance of a subject that is seen by the photographic lens 3. The light reception element 10 is interfaced to an A/D circuit 11, which is then inputted to terminal PA. An exposure compensation signal is outputted from terminal PB to an exposure control circuit 12. Terminal PC is connected to a charge-coupled device (CCD) 14 for AF, namely, infocus operation, as a defocusing amount detection means through a CCD process circuit 13. The CCD 14 receives a light beam that is bounced off the subject and enters the photographic lens 3, so as to detect a focal point. A motor control signal is inputted from terminal PD to an AF motor control circuit 15. The AF motor control circuit 15 drives and controls an AF motor 16 located in the camera main unit 1.

The AF motor 16 rotates a coupler 18 (FIG. 1) through a speed reduction gear 17. When the photographic lens 3 is mounted on the lens mount 2, the coupler 18 may engage a lens side coupler (which is linked to a focusing lens group at the end of the lens barrel), causing the AF motor 16 to be linked with the focusing lens group of the photographic lens 3, so that the focusing lens group can be focused by the AF motor 16. However, a lens corresponding to this embodiment does not have to provide a lens side coupler which is engaged with the coupler 18. In such a case, the AF motor 16 does not drive the focusing lens group. In addition, the speed reduction gear 17 is linked with an AF pulser 19, the output of the pulser 19 being inputted to terminal PE of the main CPU 6.

Terminal $P_{SEG}$ on the display CPU 7 is interfaced to a LCD display 20. Terminals P10 to P17 of the display CPU 7 are connected to information transfer connection terminals Fmax1 to Fmax3, Fmin1 and Fmin2, auto/manual information connection terminal A/M-T, common connection terminal Cont, and power connection terminal Vdd-T, respectively. An ON/OFF signal is inputted from terminal P18 of the display CPU 7 to a switch circuit 21, which is also connected to a power connection terminal VBatt.

The positive side of battery 22 is connected through a regulator 23 to Vdd1 of the display CPU 7 and a capacitor 24. The positive side of the battery 22 is also connected to power terminal VDD of the main CPU 6 through DC/DC converter 6', and to the switch circuit 21. An ON/OFF control signal is outputted from terminal P1 of the display CPU 7 and inputted to the DC/DC converter 6'.

The negative side of the battery 22 is connected to ground terminal Gnd of the main CPU 6, ground terminal Gnd of the display CPU 7, the ground wire 9 of the operation switch group SW-I, and a ground connection terminal Gnd-T.

The connection terminals Fmax1 to Fmax3, Fmin1, Fmin2, Cont, Vdd- T, VBatt, and Gnd-T are provided at the end of the lens mount 2. They form a connection terminal group T-I of the camera body.

When the main switch, namely, the lock switch SWLOCK is in the OFF position, an operation signal is not outputted from terminal P1 of the display CPU 7 to the DC/DC converter Thus, no power is supplied from the battery 22 to the main CPU 6, and the main CPU 6 is in the OFF state.

On the other hand, the battery voltage is applied to terminal VDD of the display CPU 7 through regulator 23, so that the display CPU 7 operates even if the lock switch SWLOCK is in the OFF position. In this state, the LCD display 20 is OFF.

When the lock switch SWLOCK is turned ON, an ON signal is inputted to terminal P4 of the display CPU 7. A display signal is outputted from terminal $P_{SEG}$ of the display CPU 7 to the LCD display 20, and the LCD display 20 lights. At that time, an operation signal is outputted from terminal P1 of the display CPU 7 to the DC/DC converter 6' and the voltage of the battery 22 is applied to terminal VDD of the main CPU 6, activating the main CPU 6.

Power Zoom Focus Structure of Photographic Lens

Figure 4:
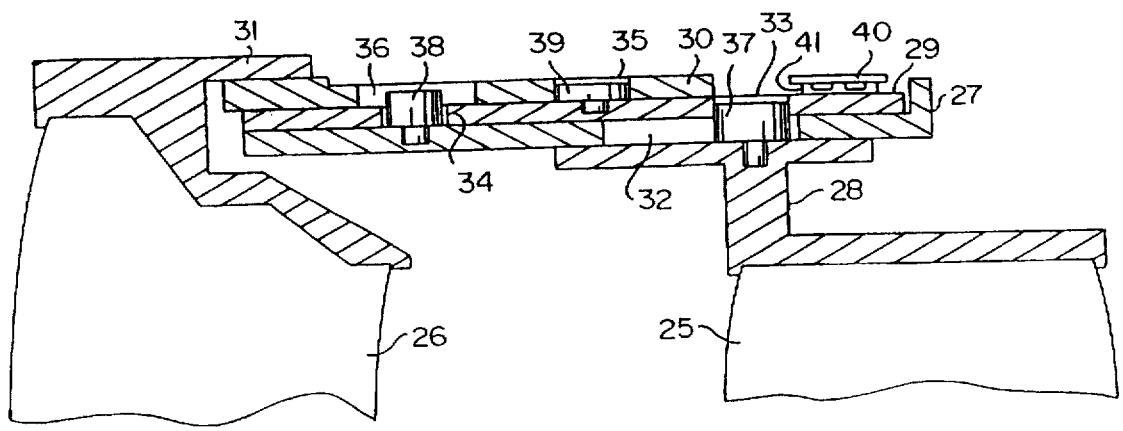
FIG. 4 is an outlined descriptive diagram showing a part of the driving mechanism of the zooming lens group of the photographic lens shown in FIG. 1.

The photographic lens 3 (FIG. 4) provides a power zoom mechanism which drives zooming lens groups 25 and 26 and a focus drive mechanism which drives a focus lens (not shown).

The power zoom mechanism has a ring-shaped fixing frame 27, a lens frame 28 which is engaged with the fixing frame 27 in a manner that the lens frame 28 can travel in an axial direction therein, a first cam ring 29 which is engaged with the fixing frame 27 in the manner that the first cam ring 29 can freely rotate on the outer surface of the fixing frame, a second cam ring 30 which is engaged with the first cam ring 29 in the manner that the second cam ring 30 can freely rotate on the outer surface thereof and can freely travel in the axial direction, and a lens frame 31 fixed to the cam ring 30. The lens frames 28 and 31 mount the lens groups 25 and 26 respectively.

Located on the fixing frame 27 is a guide hole 32 which is parallel with the axial line. Located on the cam ring 29 are slit cams 33 and 34. A slit cam 35 and a guide hole 36 are on the cram ring 30, which are parallel with the axial line. A guide roller 37, mounted on the outer surface of the lens frame 28, is inserted and engaged with the guide hole 32 and slit cam 33. A guide roller 38, mounted on the peripheral of the fixing frame 27, is inserted and engaged with the slit cam 34 and guide hole 36. A guide roller 39, mounted on the outer surface of the cam ring 29, is inserted and engaged with the slit cam 35.

The above focus drive mechanism has an AF motor M1 which drives the focus lens group (not shown) and a PZ motor M2 which drives the cam ring 29 (see FIG. 1). A variable aperture stop (not shown) provided in an optical path of the photographic lens 3 is controlled by an AE motor M3. The motor M1 and focus lens group, and the motor M2 and zoom lens group are linked through a friction type clutch.

Figure 5:
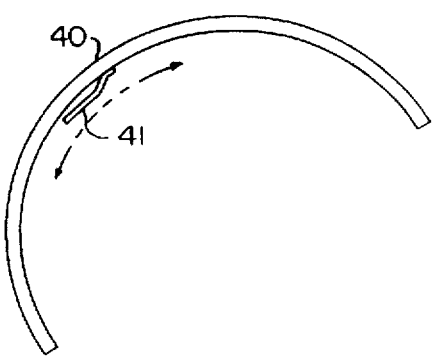
FIG. 5 is a descriptive diagram of a zoom code plate shown in FIG. 4.

Between a base of the cam ring 29 and a code plate mounting member (not shown), located on the fixing frame 27, is a zoom position reading means that is provided as a focal length detection means. The zoom position reading means has a zoom code plate 40 (FIGS. 4, 5) which is supported with a cord plate supporting member which is located concentric with the cam ring 29 and a brush 41, which elastically touches the inner surface of the zoom code plate. In addition, on the inner surface of the zoom code plate 40 are a plurality of pattern contacts which are intermittently provided in the peripheral direction. The patter contacts and brush 41 work together, outputting a zoom position signal.

On the focus lens side of the lens 3 is a focus position reading means (namely, a distance reading means (not shown)) which is provided as a focus position detection means. The distance reading means uses the same structure as the zoom position reading means. A distance signal is obtained from a distance code plate 42 (refer to FIGS. 1 and 3) which is similar to the zoom code plate 40.

Lens Control Circuit

Figure 3:
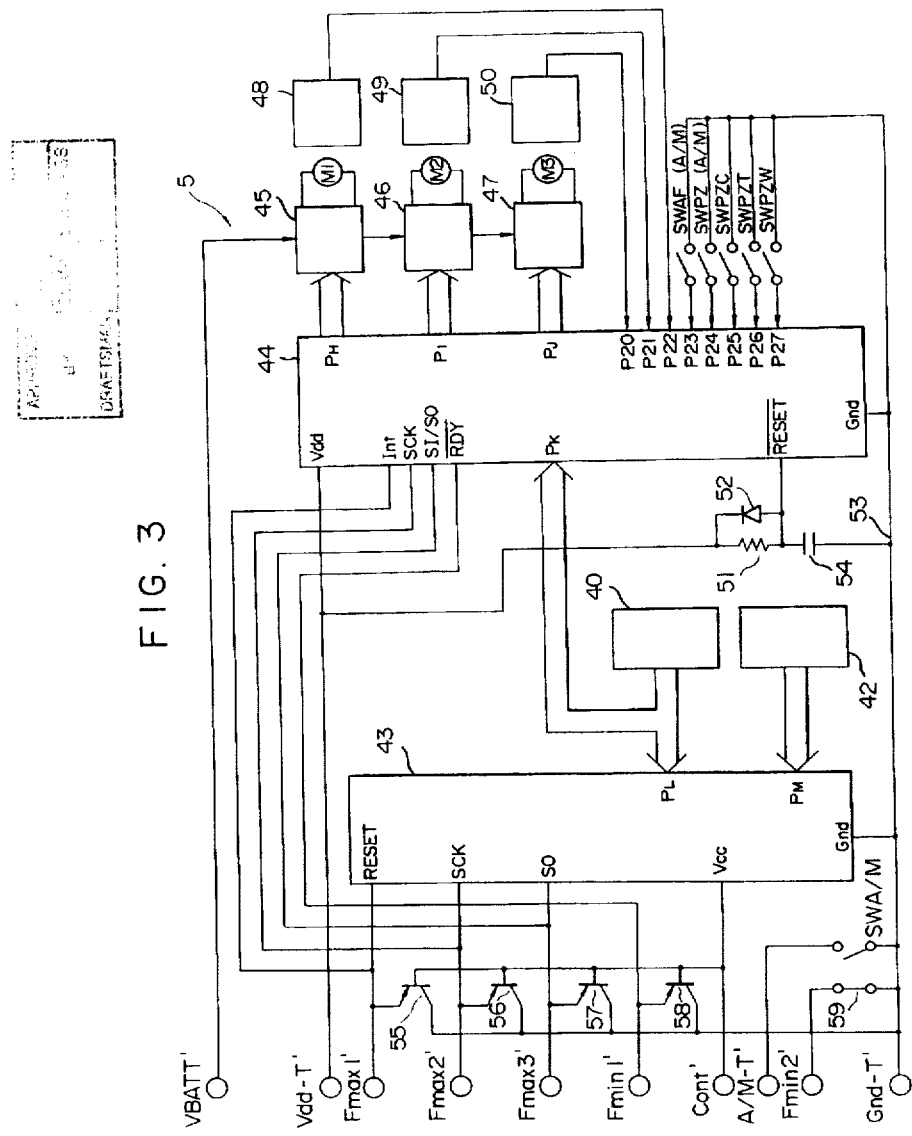
FIG. 3 is a detail circuit diagram of the image magnification control device in a photographic lens of the camera shown in FIG. 1.

Referring to FIG. 3, an end surface of the photographic lens 3, which is connected to the lens mount 2, contains a plurality of connection terminals Fmax1' to Fmax3', Fmin1', Fmin2', Cont', Vdd-T', VBatt', and Gnd-T'. When the photographic lens 3 is mounted on the lens mount 2 of the camera body 1, connection terminals Fmax1' to Fmax3', Fmin1', Fmin2', Cont', Vdd-T', VBatt', and Gnd-T' of the lens 3, which form a connection terminal group T-II, are connected to connection terminals Fmax1 to Fmax3, Fmin1, Fmin2, Cont, Vdd-T, VBatt, and Gnd-T, respectively. The connection terminal groups T-II and T-I form a connection section TC. Data is transferred between the camera control circuit 4 and the lens control circuit through the connection section TC.

The photographic lens 3 is equipped with a lens ROM 43 which stores information intrinsic to a lens, and a lens CPU 44 which controls the lens and performs other operations. The information intrinsic to the lens includes the number of pulses for maximally advancing the focus lens group and zoom lens group, availability of power zooming, availability of power focusing, presence of variable focus lens, and focus compensation value by zooming operation. An output signal of the zoom code plate 40 is inputted to terminal PL of the lens ROM 43 and terminal PK of the lens CPU 44. A distance signal from the distance code plate 42 is inputted to terminal PM of the lens ROM 43.

Motor control signals, which are outputted from terminals PH, PI, and PJ of the lens CPU 44, are inputted to an AF motor drive section (AF motor control circuit) 45, PZ motor drive section (PZ motor control circuit) 46, and AE motor drive section (AE motor control circuit) 47, respectively. The motor drive sections 45, 46, and 47 control motors M1, M2, and M3, respectively. The rotations of the motors M1, M2, and M3 are detected by an AF pulser 48 (a focus position detection means), PZ pulser 49 (zoom position detection means, namely, a focal length detection means), and AE pulser 50. Output signals of the pulsers 48, 49, and 50 are inputted to terminals P20 to P22 of the lens CPU 44.

Connection terminal VBatt' is connected to power input sections of the motor drive sections 45 to 47. Connection terminal Vdd-T' is connected to power terminal Vdd of the lens CPU 44 and to one end of a resistor 51 and the cathode of a diode 52. The other end of the resistor 51 and anode of the diode 52 are connected to a reset terminal RESET of the lens CPU 44 and to one end of a capacitor 54, while the remaining end of the capacitor is connected to a ground wire 53. The ground wire 53 is connected to connection terminal Gnd-T', ground terminal Gnd of the lens ROM 43, and ground terminal Gnd of the lens CPU 44. In addition, the ground wire 53 is connected to auto/manual selection switch SWAF(A/M), power zoom mode switch SWPZ (A/M), image magnification constant mode switch SWPZC (which keeps an image magnification of the zoom lens constant), zoom switch SWPZT (which drives the zoom lens to a Tele terminus (telephoto terminus) side), and zoom switch SWPZW (which drives the zoom lens in a Wide terminus (wide-angle terminus) side). The remaining terminal of the switches SWAF(A/M), SWPZ(A/M), SWPZC, SWPZT, and SWPZW are connected to terminals P23 to P27 of the CPU 44.

Connection terminal Fmax1' is connected to reset terminal RESET of the lens ROM 43, interrupt terminal Int of the lens CPU 44, and an emitter of transistor 55. Connection terminal Fmax2' is connected to a clock terminal SCK of the lens ROM 43, clock terminal SCK of the lens CPU 44, and an emitter of transistor 56. Connection terminal Fmax3' is connected to a serial output terminal SO of the lens ROM 43, serial input/output terminal SI/SO of the lens CPU 44, and an emitter of transistor 57. Connection terminal Fmin1' is connected to terminal RDY (not RDY) of the lens CPU 44 and an emitter of transistor 58. Connection terminal Fmin2' is connected to ground wire 53 through a fuse 59 for setting information. Connection terminal A/M-T' is connected to ground wire 53 through switch SW A/M, which selects an automatic mode (or program mode) and a manual mode which is operated by an aperture ring. Connection terminal Cont' and the bases of transistors 55 to 58 are connected to power input terminal Vcc of the lens ROM 43. The collectors of the transistors 55 to 58 are connected to the ground wire 53.

Theory of Constant Image Magnification

Figure 6:
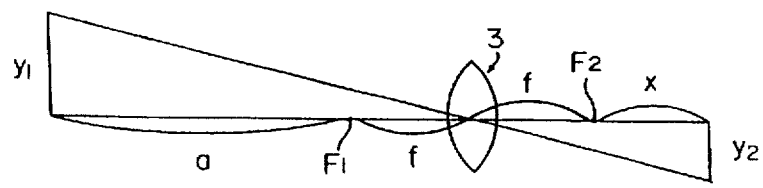
FIG. 6 is an outlined descriptive diagram showing the relationship between a subject and image taken by the photographic lens.

Referring to FIG. 6, $F_1$ represents a focal position on a front side (substance side, namely subject side), $F_2$ represents a focal position on a rear side (image side) of the photographic lens, $y_1$ represents a size of the substance (subject) on the front side of the photographic lens 3, $y_2$ represents the size of the image focused on the rear side of the photographic lens 3 by rays of light from an infinitive position, a represents a distance from the front focal position $F_1$ to the image; x represents a distance from the rear focal point $F_2$ to the substance; and f represents a focal length of the photographic lens 3. The position at which an image $Y_2$ is formed becomes a focused position.

An equation for the image formation shown in FIG. 6 is given as follows:

$$a*x=f^2 \qquad A$$

$$m=y_2/y_1=(x+f)/(a+f) \qquad B$$

Based on the distance a of the subject, the image magnification m can be obtained using equations A and B above:

$$m=f/a \qquad (1)$$

On the other hand, based on the distance x on the image side, the image magnification m can be obtained using equations A and B:

$$m=x/f \qquad (2)$$

Figure 7A:
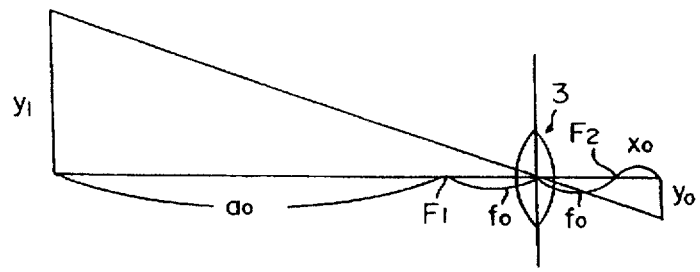
FIG. 7 is an outlined descriptive diagram which describes the image magnification constant theory in accordance with the present invention.

Assuming that the image magnification is $m_0$ when x and f in equation (2) is $x_0$ and $f_0$, respectively, as shown in FIG. 7(a), the image magnification $m_0$ is given as follows:

$$m=x_0/f_0 \qquad (3)$$

Figure 7B:
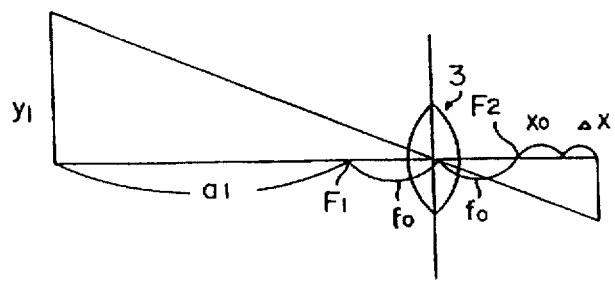

Assuming that the distance from the front focal position $F_1$ to the substance (subject) $y_1$ is $a_1$ when a defocus dx occurs as shown in FIG. 7(b), as the substance $y_1$ moves, equation A becomes:

$$a_1(x_0+dx)=f_0^2 \qquad (4)$$

Distance $a_1$ can be rewritten using equation (4), as follows:

$$a=f_0^2/(x_0+dx) \qquad (5)$$

Assuming that a new focal length is f, so as to keep the image magnification constant ($m_0$: constant), equation (1) can be described as follows:

$$m_0=f/a_1 \qquad (6)$$

Rewriting the equation for obtaining the focal length f and substituting equations (3) and (5) into the equation, yields:

$$f = m_0 \cdot a_1 = m_0 \frac{f_0}{x_0+dx} \qquad (7)$$

$$= \frac{x_0}{f_0} * \frac{f_0^2}{x_0+dx} = \frac{x_0 * f_0^2}{x_0+dx}$$

With equation (7), a zoom ratio $f/f_0$ is obtained as follows:

$$\frac{f}{f_0} = \frac{x_0}{x_0+dx} \qquad (8)$$

Figure 7C:
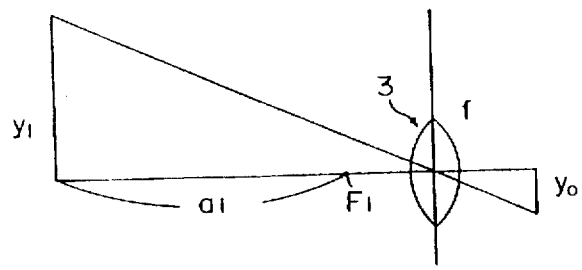

Thus, by driving the zoom ring in accordance with the zoom ratio, the image magnification becomes constant ($m_0 = f/a_1 = x_0/f_0$), as shown in FIG. 7(c).

Figure 8A:
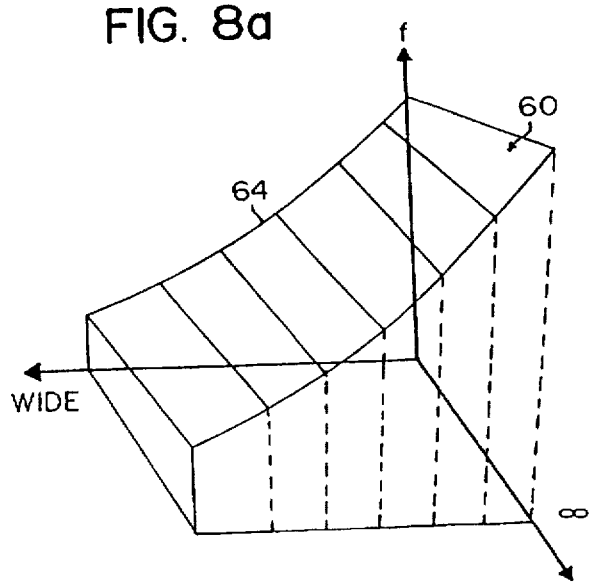
FIG. 8(a) is a three-dimensional change coordinate diagram showing a change of the focal point of a focusing lens group by a zoom operation.
Figure 8B:
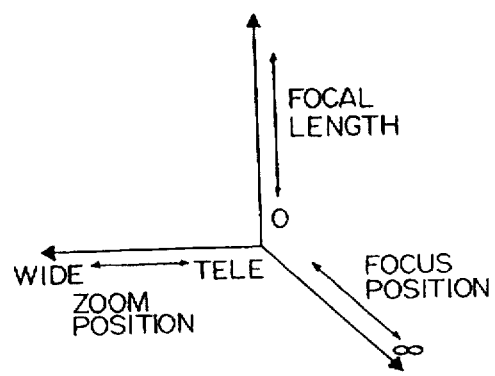
FIG. 8(b) is a descriptive diagram which describes the meaning of the coordinates shown in FIG. 8(a)
Figure 9A:
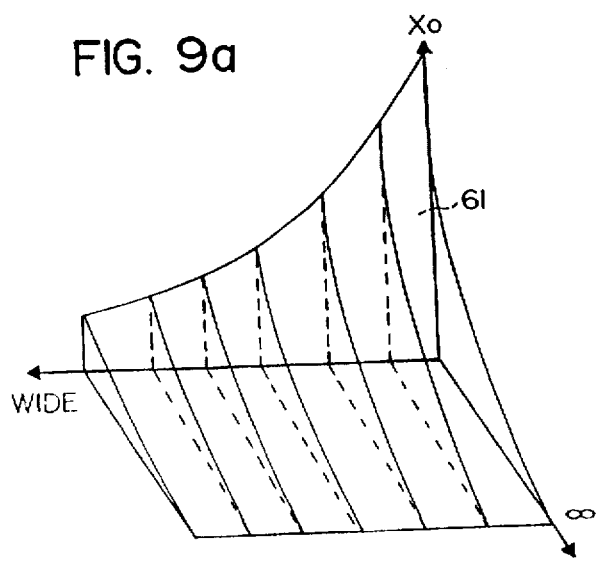
FIG. 9(a) is a three-dimensional change coordinate diagram showing a change of the amount of defocusing of the focusing lens group by a zoom operation.
Figure 9B:
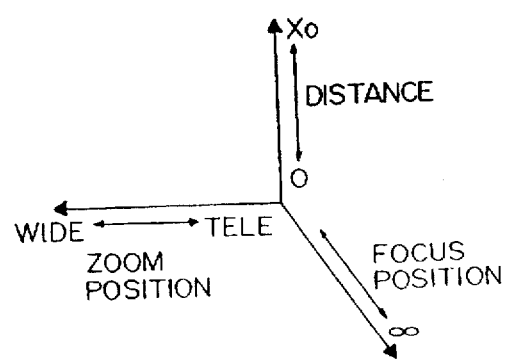
FIG. 9(b) is a descriptive diagram which describes the meaning of the coordinates shown in FIG. 9(a)

The focal length of the photographic lens 3 changes depending on the zoom position and focus position in three dimensions on a focal point curved surface 60, as shown in FIG. 8. Consequently, the distance $x_0$ from the focal length to the image also changes depending on the zoom position and focal position in three dimensions on a surface 61, as shown in FIG. 9.

Figure 10:
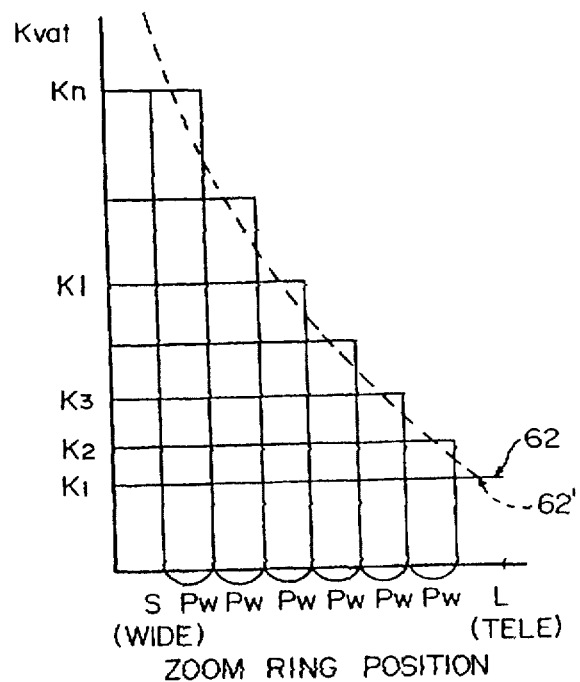
FIG. 10 is a descriptive diagram showing the relationship between a zoom position and K value of the zooming lens group.
Figure 11:
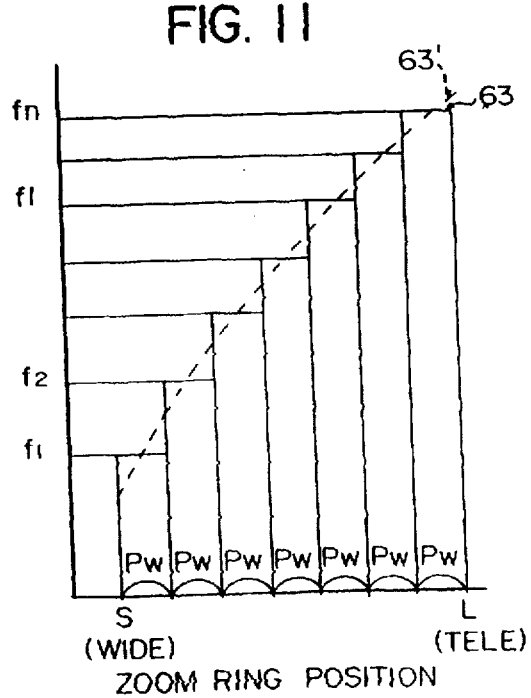
FIG. 11 is a descriptive diagram showing the relationship between a zoom position of a zooming lens group and the local length of the focusing lens group.

Moreover, a K value Kval (which is the deviation between the amount of lens advancement and the focal point) changes depending on the zoom position of the photographic lens 3. The relationship between the zoom position and Kval, as represented by the zoom code plate 40 stepwise changing along a compensation coefficient line 62, is illustrated by a solid line in FIG. 10. In addition, the relationship between the zoom position and local length also stepwise changes along a compensation coefficient line 63, as shown in FIG. 11. In the cases of FIGS. 10 and 11, it is desirable that the compensation coefficient lines 62 and 63 for the zoom control and focus control smoothly change as illustrated by broken lines 62' and 63', respectively. To accomplish this, compensation information, listed in Table 1, is stored in the lens ROM 43 and f and $x_0$ are computed by the lens CPU 44.

TABLE 1

| | Compensation Information |
|---|---|
| 01 | Number of initial pulses in encoder of zoom code plate $P_h$ |
| 02 | Width of initial pulses in encoder of zoom code plate $P_h$ |
| 03 | Initial Kval $K_h$ |
| 04 | Compensation coefficient of initial Kval $K_c$ |
| 05 | Initial focal length $f_h$ |
| 06 | Compensation coefficient of initial focal length $f_h$ |
| 07 | Primary compensation coefficient of focus lens position and focal length $f_{k1}$ |
| 08 | Secondary compensation coefficient of focus lens position and focal length $f_{k2}$ |
| 09 | Coefficient for computing amount of advancing $x_0$, Q, R, S, and T |
| 10 | Conversion coefficient from image magnification to zoom driving pulsers A, B, and C |

The start Kval, (start K value represents a Kval of the left and right most ends of step $K_i$) (where i=0, 1, 2, 3, . . . ) of the compensation coefficient 62 is shown in FIG. 10. In other words, when the lens moves from the L (Tele) side to the S (wide) side, the right end of the step $K_i$ is Kval. Conversely, when the lens moves from the S (wide) side to the L (Tele) side, the left end of the step $K_i$ is Kval.

Figure 12:
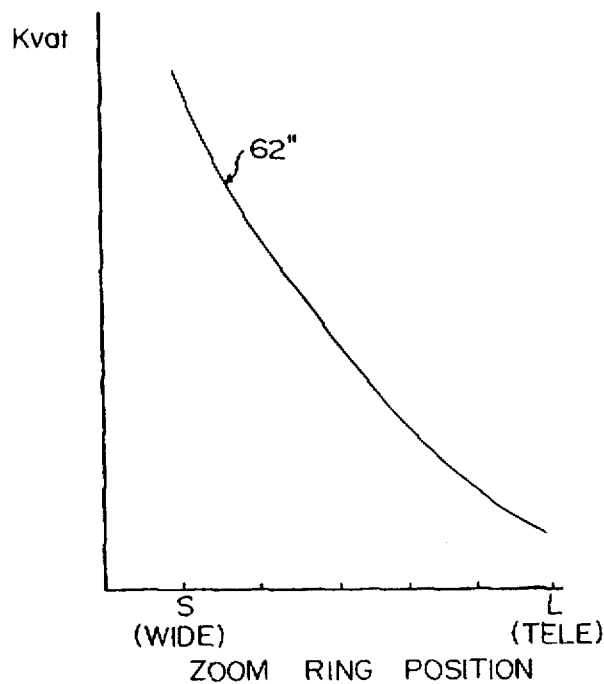
FIG. 12 is a descriptive diagram of a compensation curve where the relationship between the zoom position and K value of the zooming lens group shown in FIG. 10 is compensated.
Figure 13:
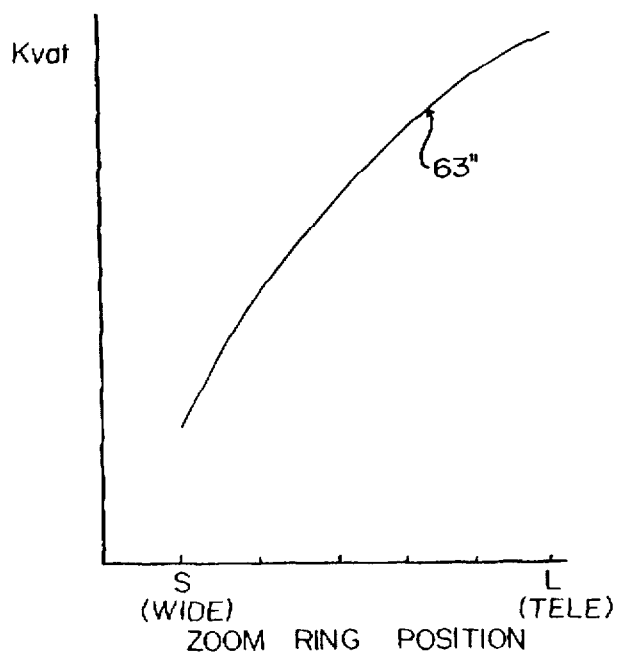
FIG. 13 is a descriptive diagram of a compensation carve where the relationship between the zoom position of the zooming lens group and the focal length of the focusing lens group shown in FIG. 11 is compensated.

The compensation coefficient of initial Kval $K_c$ is a coefficient for approximately computing a value that corresponds to the curve 62' as a slope of a straight line at the step $K_i$. The initial focal length $f_h$ refers to one of the left and right ends of the compensation coefficient line $f_i$ (where i=0, 1, 2, 3 . . . N) like the initial Kval. The compensation coefficient of initial focal point $f_c$ is a coefficient for approximately computing a value corresponding to the compensation curve 63' as a slope of a straight line at the step $f_i$. The Kval and focal length obtained in this manner are illustrated as compensation curves 62" and 63", shown in FIGS. 12 and 13, respectively. The primary compensation coefficient of the focus lens position and focal length $f_{fc1}$ can be obtained from a curve 64 determined by the zoom position and focal length shown in FIG. 8. The secondary compensation coefficient of focus lens position and focal length $f_{fc2}$ is determined by the three dimensional focal point curved surface 60, where the focus amount is considered against $f_{fc1}$ described above.

The focal point curved surface 60 is a curved surface which is determined by optical designing and mechanical designing of the photographic lens 3. It cannot be accurately and proportionally represented with a simple equation. The amount of advancing the focus lens defined by such a curved surface is relatively proportional to the amount of zooming of the more lens. Thus, it is necessary to compensate the amount of advancing of the focus lens. The compensation coefficients for that are Q, R, S, and T, which depend on the optical designing and mechanical designing of the lens. Moreover, equation (10), which uses the compensation coefficients Q, R, S, and T, depends on the optical designing and mechanical designing of the photographic lens. The number of pulses for diving the zoom lens, $P_z$, which is used to keep the image magnification constant, depends on the optical designing and mechanical designing of the photographic lens. Thus, the compensation coefficients A, B, and C of equation (11), which computes Pz, also are determined by the optical designing and mechanical designing.

Assuming that the number of pulses at the absolute position of the present zoom ring of the photographic lens 3 is $P_z$ and that the present focus lens is $P_{inf}$, the focal length f and the amount of advancing $x_0$, are obtained as follows:

$$f=f_h+f_c*(P_z-P_h)+f_{fc1}*P_{inf}+f_{fc2}*(P_{inf})^2 \quad (9)$$

$$x_0=Q(P_{inf})^3+R(P_{inf})^2+S(P_{inf})+P_{inf}*T(P_h-P_s) \quad (10)$$

In this case, considering an over-moving of the amount of advancing of the lens on the infinite side, $P_{inf}$ should be a small value. In addition, assuming that the control image magnification is r, the number of zoom driving pulses $P_z$ can be obtained from the following equation:

$$P_z=Ar^2+Br^2+Cr \quad (11)$$

The data listed in Table 1 and the computation equations described are stored in advance in the lens ROM 43 of the photographic lens 3.

Major terms used in the flow charts, which represent control operations of the camera control device structured as above, are described as follows:

AFSTOP represents a process which stops the focusing lens group;

FL stands for the far limit and is a flag for representing whether the far terminus of the focusing lens group is being detected. When FL=1, the control circuit detects that the focusing lens group is positioned at the far terminus;

NL stands for the near limit and is a flag for representing whether the near terminus of the focusing lens group is being detected. When NL=1, the control circuit detects that the focusing tens group is positioned at the near terminus;

$P_{inf}$ represents the number of pulses where the focusing lens group is driven from the far terminus to the near terminus. When $P_{inf}=0$, the focusing lens group is positioned at the far terminus. The number of pulses is detected by the AF pulse 48;

WL stands for the wide limit and is a flag for representing whether the wide terminus of the zooming lens group is being detected. When the WL flag equals 1, the control circuit detects that the zoom lens group is positioned at the wide terminus;

TL stands for the tele limit and is a flag for representing whether the tele terminus of the zooming lens group is being detected. When the TL flag=1, the control circuit detects that the zooming lens group is positioned at the tele terminus;

MFL stands for the macro far limit and is a flag for representing whether the far terminus of the focusing lens group is being detected by driving the zooming lens group in the macro area. When the MFL flag=1, the control circuit detects that the zooming lens group is a tele macro by a signal that is being outputted from the zoom code plate 40 and that the lens group is positioned at the far terminus in the focus state;

MNL stands for the macro near limit and is a flag for representing whether the near terminus of the focusing lens group is being detected by driving the zooming lens group in the macro area. When the MNL flag=1, the control circuit detects that the zooming lens group is a tele macro by a signal that is outputted from the zoom code plate 40 and that the lens group is positioned at the near terminus in the focus state;

SWREN is a release permission flag. When the SWREN flag=1, the release operation is permitted, while when the SWREN flag=0, the release operation is not permitted;

MF stands for manual focus and is a flag for representing whether a manual focus stale takes place. When the MF flag=1, the manual focus state takes place, while when MF=0, the manual focus state does not take place;

AF stands for auto focus and is a flag for representing whether an autofocus state takes place. When the AF flag=1, the autofocus state takes place, while when AF=0, the auto focus; state does not take place;

PZMACRO is a flag representing whether the zooming lens group is positioned in the macro area by the power zoom mechanism. When the PZMACRO flag=1, the zooming lens group is positioned in the macro area;

AFGO is a flag representing whether the focusing lens group is being driven. When the AFGO flag=1, the focusing lens group is being driven by AF motor M1;

PZGO is a flag representing whether the zooming lens group is being driven. When the PZGO flag=1, the zooming lens group is being driven by PZ motor M2;

PZMGO is a flag representing whether the focusing lens group is being driven by the PZ motor M2 in the macro area. When the PZMGO flag=1, the focusing lens group is being driven by PZ motor M2;

PZMODE is a flag representing whet%her the zooming lens group can be driven by the power zoom mechanism. When the PZMODE flag =1, the zooming lens group can be driven;

MAGIMG is a flag representing whether to start the image magnification constant operation. When MAGIMG=1, the image magnification constant start operation takes place;

ONIMG is a flag representing whether the image magnification constant control operation takes place. When ONIMG=1, the image magnification constant operation takes place;

AFFARGO represents a process which drives the focusing lens group in the far direction;

AFNEARGO represents a process which drives the focusing fens group in the near direction;

AFDRVF is a flag representing a direction in which the focusing lens is driven in the process. When AFDRVF=1, the focusing lens is driven in the far direction, while when AFDRVF =0, it is driven in the near direction;

PZTELGO represents a process which drives the zooming lens group in the tele direction;

PZWIDEGO represents a process which drives it in the wide direction;

PZDRVF is a flag representing a direction in which the zooming lens group is driven in the process. When PZDRVF=1, the zooming Lens group is driven in the tele direction, while when PZDRVF=0, it is driven in the wide direction;

MCRFARGO represents a process which drives the zooming lens group against the focusing lens group in the macro area;

MCRNEARGO represents a process which drives the zooming lens group against the focusing lens group in the macro area;

MCRDRVF is a flag which represents a direction in which the zooming lens group is driven. When MCRDRVF=1, the zooming lens group is driven in the far direction, while when MCRDRVF=0, it is driven in the near direction;

AFS is a flag representing whether an in-focus priority mode takes place. When AFS=1, the in- focus priority mode takes place, while when AFS=0, a release priority mode takes place;

AFCORR stands for AF correct. When a zoom operation is conducted in the in-focus priority state, the focal position may be moved depending on a photographic lens (such as a variable focus lens). This flag is used to compensate the focal position of the lens. When AFCORR=1, the focal position being moved is compensated, while when AFCORR=0, it is not compensated; and ON/OFF of the macro switch represents whether or not the zooming lens group is positioned in the macro area.

The control operations of the camera control device structured as mentioned above are described using the flow charts illustrated in FIGS. 14–42.

When the lock switch SWLOCK is turned ON, the control device, including the camera control circuit 4 and lens control circuit 5, executes a series of instructions shown in FIG. 14. The control device is initialized in step S1 by executing an initialization subroutine, shown in FIG. 34.

Figure 35:
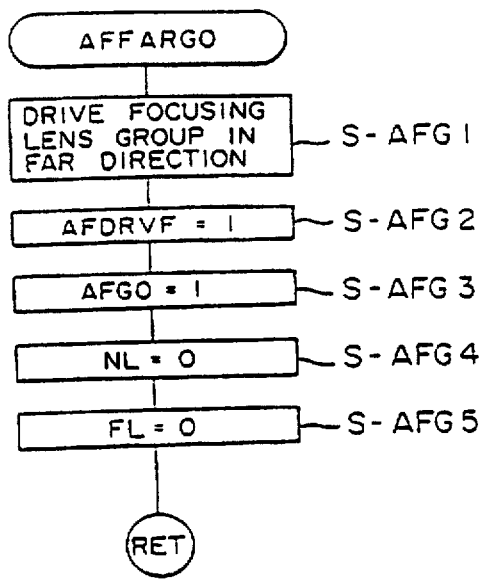

The initialization subroutine determines whether the AF mode switch (that is, the auto/manual selection mode switch SWAF A/M) has been turned ON in step S1-1. When the AF mode switch has been turned ON, the automatic focus operation is selected and processing advances to step S1-2 to execute the AFFARGO subroutine, which is shown in FIG. 35. When the switch is OFF, the manual operation is selected and processing advances to step S1-26. The subroutine drives the focus lens, namely the focusing lens group, to the far terminus in step S1-2.

The subroutine activates the AF motor drive section 45 so as to drive the focusing lens group to the far terminus in step S-AFG1. The process sets the AFDRVF flag to 1, representing that the focusing lens group is being driven in the far direction step S-AFG2. The process sets the AFGO flag to 1 to indicate that the focusing lens group is being driven in step S-AFG3. The NL flag is set to 0 to indicate that the near limit of the focusing lens group has not been detected (step S-AFG4) and the FL flag is set to 0 to indicate that the far end has not been detected (step-S-AFG5). After that, the subroutine returns to step S1-3 of the initialize subroutine, shown in FIG. 34.

When the focusing lens is being driven to the far terminus, driving pulses are outputted from the AF pulser 48 to the lens CPU 44. The subroutine determines whether the driving pulses are outputted from the AF pulser in S1-3. This determination is made by detecting whether the pulse interval is at least 100 msec. When a negative determination is obtained (i.e., a pulse interval of less than 100 msec), the subroutine enters a loop until the determined condition is affirmative (i.e., a pulse interval of 100 msec or more). When the pulse interval exceeds 100 msec, the focusing lens is driven and stopped at the far terminus. At this time, a friction type clutch, which is linked with the focusing lens group, slips. Thus, when the pulse interval exceeds 100 msec, the test performed in step S1-3 is positive (i.e., the pulse interval is at least 100 msec in duration) and processing advances to step S1-4 so as to execute an AFSTOP subroutine. The AFSTOP subroutine determines whether the focusing lens group is being driven (AFGO=1) in step S-AS1, shown in FIG. 41. When the lens group is not being driven, AFGO=0 and processing returns to S1-5 of the initialize subroutine. When the process determines that the focusing lens group is being driven in step S-AS1, AFGO is equal to 1. Thus, processing advances to steep S-AS2 to stop AF motor M1 so as to stop driving the focusing lens group before advancing to step S-AS3. This step sets the AFGO flag to 0. After that, processing returns to step S1-5 of the initialize subroutine.

In step S1-5, the FL flag is see to 1 to represent that the far terminus of the focusing lens group has been detected. At the present time, the focusing lens group is not positioned at the near terminus, and the subroutine advances to step S1-6 so as to set the NL flag to 0 to represent that the near terminus of the focusing lens group has not been detected, before proceeding to step S1-7.

If the subroutine determines that the AF switch, (i.e. the auto/manual selection switch SWAF A/M) has not been turned ON in step S1-1, it is unknown where the focusing lens group is positioned. Thus, processing advances to steps S1-2G and S1-27, so as to set the FL flag and the NL flag to 0. Thereafter, processing advances to step S1-7.

In step S1-7, since the focusing lens block is positioned at the far terminus and the number of driving pulses from the far terminus for the focusing lens group, $P_{inf}$ is 0, the subroutine sets $P_{inf}$ to 0 Thereafter, the WL flag (which represents whether the wide terminus of the zooming lens group is being detected) is set to 0, the TL flag (for representing whether the tele terminus of the zooming lens group is being detected) is set to 0, the MFL flag (for representing whether the far terminus of the focusing lens group is being detected by driving the zoom ring in the macro area) is set to 0, the MNL flag (for representing whether the near terminus of the focusing lens group is being detected by driving the zoom ring in the macro area) is set to 0, the SNREN flag (for representing whether the release operation is permitted) is set to 0, the MF flag (for representing whether the manual focus state takes place) is set to 0, and the AF flag (for representing whether the autofocus state takes place) is set to 0 (steps S1-8 to S1-14). Processing then advances to S1-15.

A determination is made as to whether the macro switch has been turned ON in step S1-15. When the determined condition is YES (ON), processing advances to S1-16, so as to set the PZMACRO flag (for representing whether the zooming lens group is positioned in the macro area by the power zoom mechanism) to 1 before going to step S1-18. When the determined condition is NO (OFF), processing goes to step S1-17 so as to set the PZMACRO flag to 0 before advancing to step S1-18.

Next, the AFGO flag (for representing whether the focusing lens group is being driven) is set to 0, the PZGO flag (for representing whether the zooming lens group is being driven) is set to 0, the PZMGO flag (for representing whether the zooming lens group is being driven by the PZ motor M2 in the macro area) set to 0, the PZMODE flag (for representing whether the zooming lens group can be driven by the power zoom mechanism) is set to 0, the MAGIMG flag (for representing whether to start the image magnification constant operation) is set to 0, the ONIMG flag (for representing whether the image magnification constant control operation takes place) is set to 0, a timer, such as a 5 msec timer, is started, and the timer is permitted to be interrupted in steps S1-18 to S1-25, before processing returns to step S2 of the start program shown in FIG. 14.

In step S2, the program determines whether the AF node switch, namely the auto/manual selection switch SWAF A/M, has been turned ON. When the switch has been turned ON, processing advances to S3. When the switch has not been turned ON, processing advances to step S-M1, shown in FIG. 21.

Figure 21:
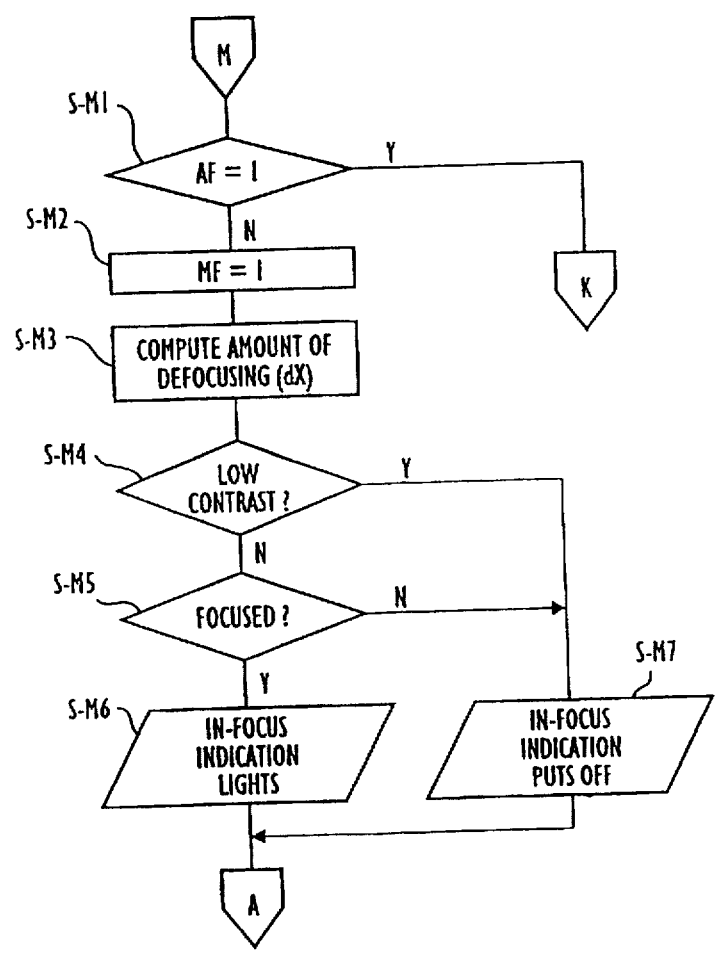

The next step determines whether the AF mode switch (switch SWAF A/M) has been turned ON and the AF operation (AF=1) takes place in step S-M1, shown in FIG. 21. When AE equals 1 (i.e. AF operation takes place), processing advances to step S-K1, shown in FIG. 30. When AF does not equal 1, the program sets the MF flag ( for representing whether the manual focus state takes place) to 1 (in step S-M2), and advances to step S-M3, so as to compute the amount of defocusing of the focusing lens group, dx.

Afterwards, a determination is made as to whether the contrast is LOW (step S-M4). When the contrast is LOW, processing advances to step S-M7 so as to turn OFF the in-focus indication. When the contrast is not LOW, processing advances to step S-M5 to determine whether the image is focused. If the image is not focused, processing advances to step S-M7, so as to turn OFF the in-focus indication. When the image is focused, processing advances to step S-M6 to turn ON the in- focus indication, before returning back to step S2, shown in FIG. 14, to determine whether the AF mode switch (switch SWAF A/M) has been turned ON (input). When the manual mode takes place, processing enters into a loop between step S-M1, shown in FIG. 21, and step S2, shown in FIG. 14, until the AF mode switch is turned ON.

Figure 30:
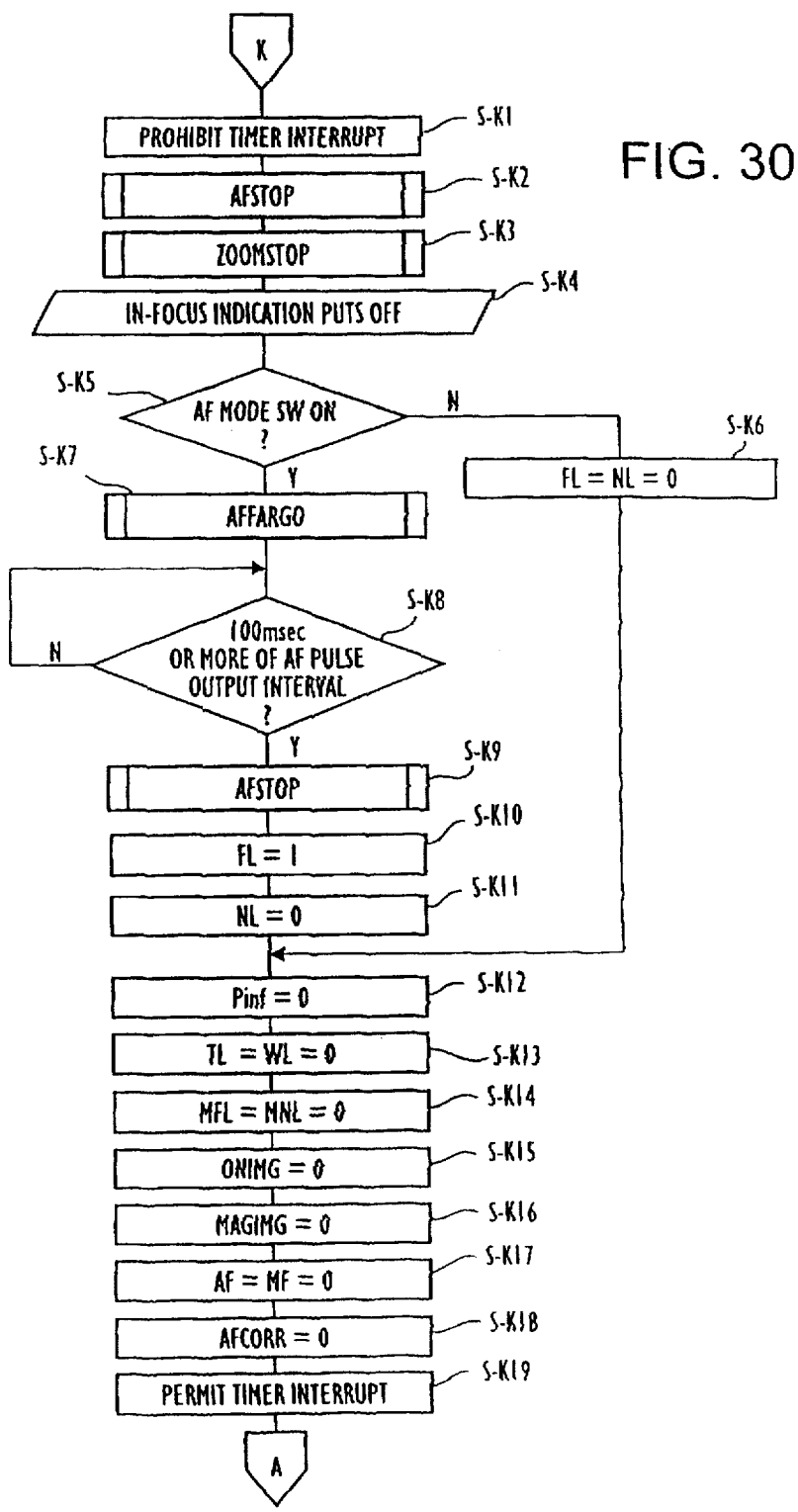

When AF=1 (i.e., AF operation state) in step S-M1 shown in FIG. 21, processing advances to step S-K1, shown in FIG. 30. This step prohibits the timer interrupt, before processing advances to step S-K2 to execute an AFSTOP subroutine. The AFSTOP subroutine determines whether the focusing lens group is being driven (AFGO=1) in step S-AS1, shown in FIG. 41. When the lens group is not being driven, processing advances to step S-K3, which calls a ZOOM-STOP subroutine, shown in FIG. 42. When AFGO=1, AF motor M1 is stopped so as to stop driving the focusing lens group. Processing then advances to step S-K3, after the AFGO flag (for representing whether the focusing lens group is being driven) is set to 0 to call the ZOOMSTOP subroutine in FIG. 42.

Figure 42:
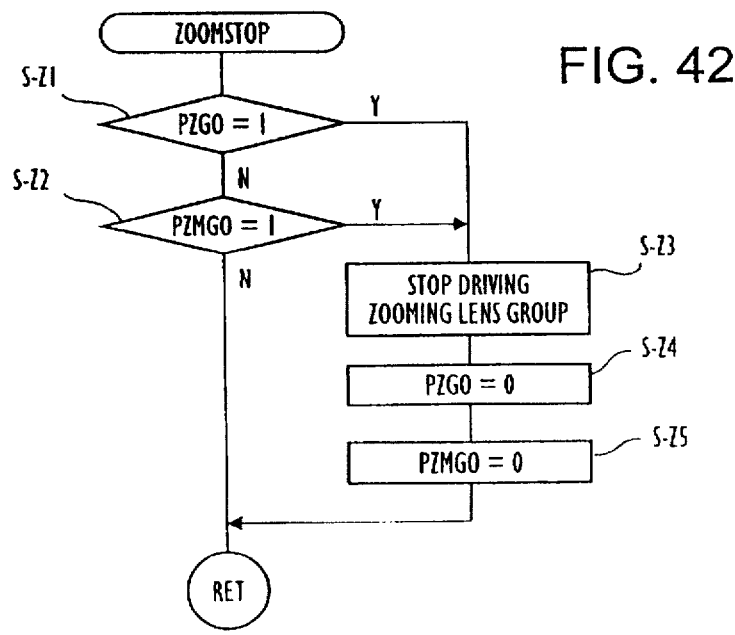

The ZOOMSTOP subroutine determines whether the zooming lens group is being driven (PZGO=1) in step S-Z1, shown in FIG. 42. When PZGO is not equal to 1, processing advances to S-Z2, so as to determine whether the AF drive (autofocus drive) operation is being conducted by the power zoom mechanism (PZ mechanism) in the macro area. When the AF drive operation is not being conducted by the PZ mechanism (i.e., PZMGO=0), processing returns to step S-K4, shown in FIG. 30. When the zooming lens group is being driven (i.e., PZGO=1) in step S-Z1, or the AF drive operation is being conducted i.e., PZMGO=1) in S-Z2, processing advances to step S-Z3, which stops PZ motor M2 so as to stop driving the zooming lens group. Thereafter, the PZGO flag (for representing whether the zooming lens group is being driven) and the PZMGO flag are each set to 0 (steps S-Z4 and S-Z5), before processing advances to step S-K4, shown in FIG. 30.

This step turns OFF the in-focus indication and then advances to step S-K5, so as to determine whether the AF mode switch (switch SWAF A/M) has been turned ON. If the AF mode switch is OFF, processing advances to step S-K6. If the AF mode switch is ON, processing advances to step S-K7 to call an AFFARGO subroutine.

If step S-K6 is performed, the FL flag (for representing whether the far terminus of the focusing lens group is being detected) and the NL flag (for representing whether the near terminus of the focusing lens group is being detected) are each set to 0. Processing then advances to step S-K12.

When step S-K7 is performed, the AFFARGO subroutine, shown in FIG. 35 is performed. In the same manner as described above, the process drives the focusing lens group in the far direction, sets the AFDRVF and AFGO flags to 1, sets the NL and FL flags to 0 and advances to step S-K8, shown in FIG. 30. When the focusing lens group is being driven in the far direction, driving pulses are outputted from the AF pulser 48 to the lens CPU 44. The software program deter-mines whether the driving pulses are being outputted from the AF pulser 48 in step S-K8. This determination is made by detecting whether a pulse interval of at least 100 msec occurs. When the pulse interval is less than 100 msec, the software program enters a loop, until a pulse interval off at least 100 msec is detected. When the pulse interval exceeds 100 msec, the focusing lens is driven and stopped at the far terminus. At this time, the friction type clutch, which is linked with the focusing lens slips. Thus, when the pulse interval exceeds 100 msec, processing advances to step S-K9 so as to execute the AFSTOP subroutine. This subroutine determines whether the focusing lens group is being driven (i.e., AFGO=1), in step S-AS1, shown in FIG. 41. When the lens group is not being driven, AFGO=0 and processing advances to the ZOOMSTOP subroutine in step S-K3, shown in FIG. 30. When AFGO=1, AF motor M1 is stopped so as to stop the driving of the focusing lens group.

Step S-AS3 is then performed to set the AFGO flag (for representing whether the focusing lens group is being driven) to 0 before advancing to step S-K10. The FL flag (for representing whether the far terminus of the focusing lens group is being detected) is then set to 1. Since the focusing lens group is not positioned at the near terminus, processing advances to step S-K11 to set the NL flag (for representing whether the near terminus of the focusing lens group is being detected) to 0 (steps S-K10 and S-K11).

Since the focusing lens group is positioned at the far terminus, the number of driving pulses from the far terminus for the focusing lens group, $P_{inf}$ is set to 0 (step S-K12). Thereafter, the WL flag (for representing whether the wide terminus of the zooming lens group is being detected), the TL flag (for representing whether the tele terminus of the zooming lens group is being detected), the MFL flag (for representing whether the far terminus of the focusing lens group is being detected by driving the zoom ring in the macro area), the MNL flag (for representing whether the near terminus of the focusing lens group is being detected by driving the zoom ring in the macro area), the ONIMG flag (for representing whether the image magnification constant control operation takes place), the MAGIMG flag (for representing whether to start the image magnification constant operation), the MF flag (for representing whether the manual focus state takes place), the AF flag (for representing whether the autofocus state takes place), and the AFCORR flag (for representing whether to compensate the focus position of the lens) are set to 0 in steps S-K13 to S-K18, the timer is permitted to be interrupted in step S-K19, and then the software program returns back to step S2, shown in FIG. 14.

When the program determines that the auto/manual selection switch SWAF A/M has been turned ON in step S2, processing advances to step S3. In S3, it is determined whether the MF flag (representing whether the manual focus state takes place) has been set to 1. When the focus state takes place, an affirmative (YES) result is obtained and processing advances to step S-K1. When the determined condition is negative, processing advances to step S4.

In step S4, it is determined whether the light metering SWS switch has been turned ON. When the SWS switch is OFF, processing returns back to step S2 so as to repeat the above operation until the SWS switch is turned ON. When the switch has been turned ON, processing advances to step S5 to set the AF flag (representing whether the autofocus state takes place) to 1. Next, the amount of defocusing of the focusing lens group dx is computed, in step S6, and it is determined whether the contrast of the subject is LOW, using the amount of light from the subject which enters into light reception element 10 (step S7). When the contrast of the subject is LOW, processing returns back to step S2 to repeat the above operation until the contrast becomes HIGH. When the cent fast of subject is sufficient, processing advances to step S8. This step determines whether the subject is focused. When the image is not focused, processing advances to S9. When the image is focused, processing advances to step S23 to determine whether the image magnification constant mode switch SWPZC has been turned ON and the MAGIMG flag (representing whether to start the image magnification constant operation) has been set to 1. When the MAGIMG flag has been set to 1, processing turns OFF the in-focus indication (in step S25) and advances to seep S-B1, shown in FIG. 15. When the MAGIMG flag has not been set to 1, processing advances to step S22, turning ON the in-focus indication. Then, the SWREN flag (representing whether the release operation is permitted) is set to 1 in step S23, and the software program advances to S24. This step determines whether the AF flag has been set to 1; that is, whether the in-focus priority/release priority selection switch SWAF S/C has been placed in the S position (in-focus priority position) and the AFS flag (representing whether the in-focus priority mode takes place) has been set to 1. When the determined condition is positive, the process enters a loop so as to lock the focus. When the determined condition is negative, (that is, the switch has been placed in the AFC position (release priority position)), processing returns back to step S2.

When it is determined that the subject is not focused in step S8, processing advances to step S9 to set the SWREN flag (representing whether the release operation is permitted) to 0. Then, the in-focus indication is turned OFF. In step S11, the amount of driving of the focusing lens group (dp), using the amount of defocusing dx obtained in step S6 is computed. In step S12, a determination is made as to whether the focusing lens group is being driven in the near direction. When the lens is being driven to the near direction, processing advances to step S13. When the lens is in the far direction, processing advances to step S18.

In step S13, it is determined whether the NL flag (representing whether the near terminus of the focusing lens group is being detected) has been set to 1. That is, it is determined whether the focusing lens group is positioned at the near limit (near terminus) in step S13. When the focusing lens group is positioned at the near terminus (near limit) and the NL flag has been set to 1, processing advances to step S-I1, shown in FIG. 20. When the focusing lens group is not positioned at the near terminus (near limit), processing advances to step S14.

If step S18 is executed, the FL flag is checked to determine whether the far terminus of the focusing lens group has been detected. When it has been detected, the FL flag is set to 1, meaning that the focusing lens group is positioned at the far terminus (for limit). When the focusing lens group is positioned at the far terminus (far limit) and FL has been set to, 1, processing advances to step S-I1, shown in FIG. 20. When the focusing lens group is not positioned at the far terminus (far limit), processing advances instead to step S19.

Figure 20:
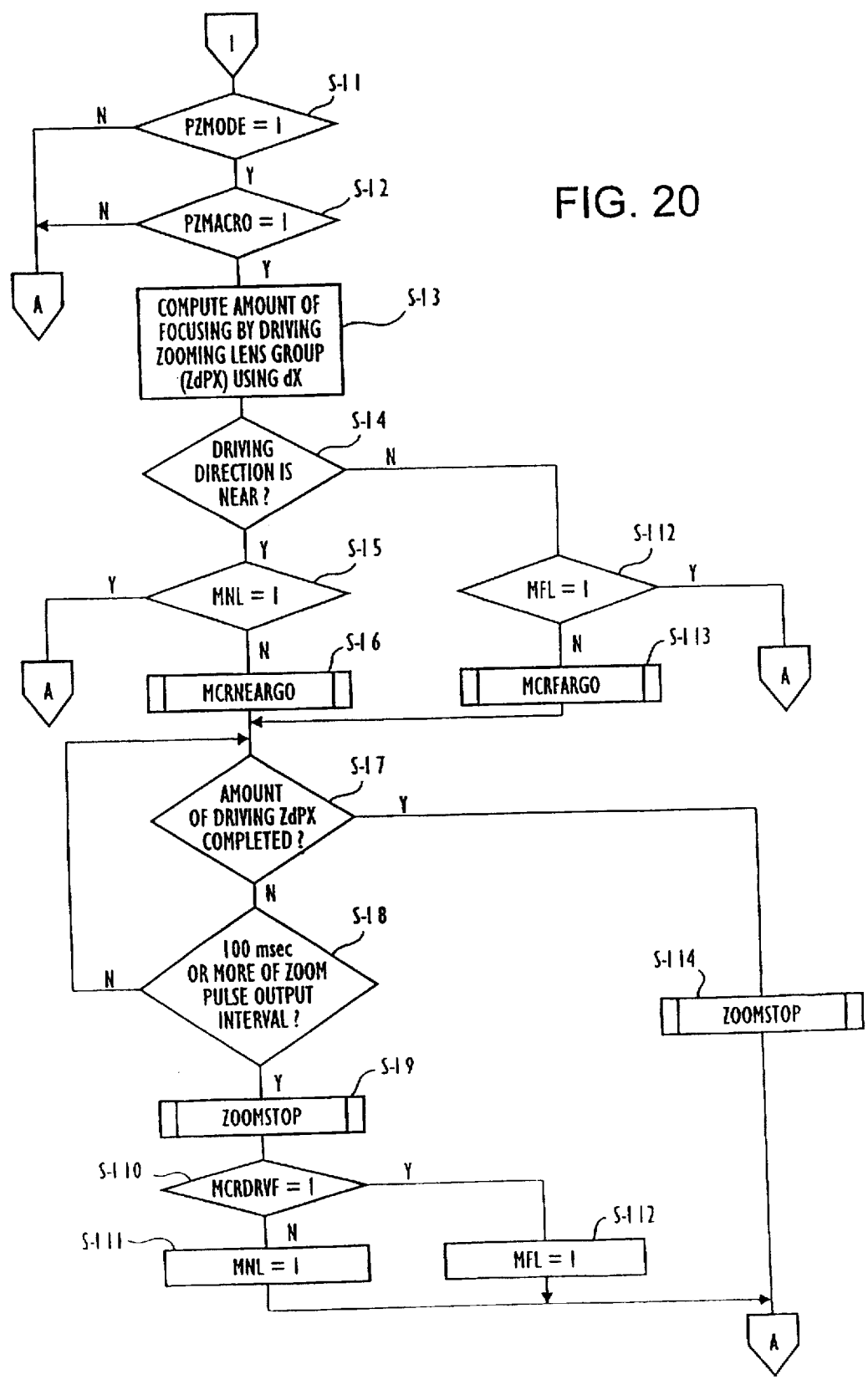

When the process advances to S-I1 shown in FIG. 20, a determination is made whether the PZMODE flag (representing whether the zooming lens group can be driven by the power zoom mechanism) has been set to 1. When the determined condition is negative, processing returns back to step S2, shown in FIG. 14, until the determined condition becomes positive. When the determined condition is positive, processing advances to step S-I2, so as to determine whether the macro switch has been turned ON arid the PZMACRO flag (representing whether the zooming lens group is positioned in the macro area by the power zoom mechanism) has been set to 1. When the determined condition is negative, processing returns back to step S2, shown in FIG. 14, so as to enter a loop. When the determined condition is positive, processing advances to step S-I3, so as to compute the amount of defocusing by driving the zooming lens group (zdpx) using the amount of defocusing dx described above. In step S-I4 it is determined whether the focusing direction of the zooming lens group is far or near. When it is determined that the lens is in the near direction, processing advances to step S-I5. When it is determined that the lens is in the far direction, processing advances to step S-I12.

Step S-I5 determines whether the MNL flag (representing whether the near terminus of the focusing lens group is being detected by driving the zoom ring in the macro area) has been set to 1. When the determined condition is positive, processing returns back to step S2, shown in FIG. 14, so as to enter a loop. When the determined condition is negative, processing advances to step S-I6 to call a MCRNEARGO subroutine.

Step S-I12 determines whether the MFL flag (representing whether the far terminus of the focusing lens group is being detected by driving the zoom ring in the macro area) has been set to 1. When the determined condition is positive, processing returns back to step S2, shown in FIG. 14, so as to enter a loop. When the determined condition is negative, processing advances to step S-I13 to execute a MCRFARGO subroutine.

Figure 39:
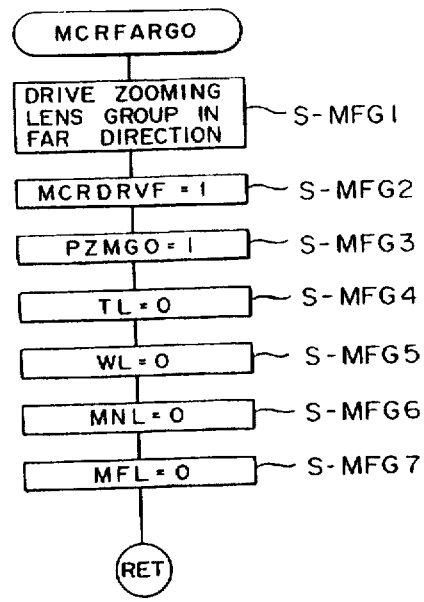
Figure 40:
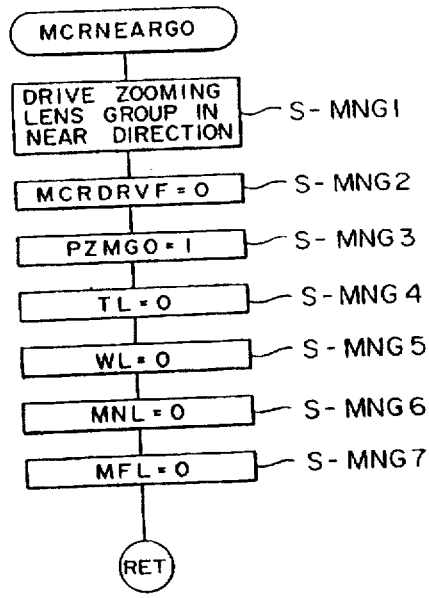

The MCRNEARGO subroutine (called in step S-I6) drives the zooming lens group in the near direction, as shown in FIG. 40. The MCRFARGO subroutine, called in step S-I13, drives the zooming lens group in the far direction and is shown in FIG. 39.

The MCRNEARGO subroutine, shown in FIG. 40, activates PZ motor M2 in step S-MNG1, so as to drive the zooming lens group in the near direction. Then, the MCRDRVF flag (representing whether the zooming lens group is being driven in far direction in the macro area) is set to 0 (i.e., near direction). The PZMGO flag (representing whether the zooming lens group is being driven by PZ motor M2 in the macro area) is set to 1 (i.e., drive state) and the TL flag (representing whether the tele terminus of the zooming lens group is being detected), the WL flag (representing whether the wide terminus of the zooming lens group is being detected), the MNL flag (representing whether the near terminus of the focusing lens group is being detected by driving the zoom ring in the macro area) and the MFL flag (representing whether the far terminus of the focusing lens group is being detected by driving the zoom ring in the macro area) are set to 0 in steps S-MNG3 to S-MNG7. After that, processing advances to step S-I7, shown in FIG. 20.

In the MCRFARGO subroutine, shown in FIG. 39, PZ motor M2 is activated (step S-MFG1) so as to drive the zooming lens group in the far terminus. Thereafter, the MCRDRVF flag (representing whether the zooming lens group is being driven in the far direction in the macro area) is set to 1 (i.e., far direction) in step S-MFG2, and the PZMGO flag (representing whether the zooming lens group is being driven by PZ motor M2 in the macro area) is set to 1 (i.e., drive state) in step S-MFG3. Then the TL flag (representing whether the tele terminus of the zooming lens group is being detected), the WL flag (representing whether the wide terminus of the zooming lens group is being detected), the MNL flag (representing whether the near terminus of the focusing lens group is being detected by driving the zoom ring in the macro area) and the MFL flag (representing whether the far terminus of the focusing lens group is being detected by driving the zoom ring in the macro area) are set to 0 in steps S-MFG4 to S-MFG7. Thereafter, processing advances to S-I7, shown in FIG. 20. When the zooming lens group is being driven, driving pulses are outputted from PZ pulser 49 to the lens CPU 44.

In step S-I7, it is determined whether the zooming lens group has been driven for the amount of focusing (zdpx) obtained in step S-I3. When the zooming lens group has been driven for an amount equal to zdpx, processing advances to step S-I14 so as to execute a ZOOMSTOP subroutine, shown in FIG. 47, before returning back to step S2 in FIG. 14. When the determined condition is negative, processing advances to step S-I8.

In the step S-I8, it is determined whether the driving pulses are being outputted from the PZ pulser 49. This determination is made by detecting whether the pulse interval is at least 100 msec. When the determined condition indicates a pulse interval of less than 100 msec, processing enters a loop until the determined condition indicates a pulse interval of at least 100 msec. When the pulse interval equals or exceeds 100 msec, the zooming lens group is driven and stopped at the far terminus or near terminus by executing the ZOOMSTOP subroutine called in either step S-I14 or S-I9. At this time, the friction type clutch, which links PZ motor M2 and the zooming lens group, slips. Thus, when the pulse interval equals or exceeds 100 msec, the determined condition is positive (100 msec or more) and processing advances to step S-I9 so as to execute the ZOOMSTOP subroutine, shown in FIG. 42. Thereafter, processing advances to S-I10 to determine whether the driven direction was near or far. When the determined condition is negative (i.e., near direction), processing advances to step S-I11, so as to set the MNL flag (representing whether the near terminus of the focusing Lens group is being detected by driving the zoom ring in the macro area) to 1, before returning back to step S2 in FIG. 14. When the determined condition is positive (i.e., far direction), processing advances to step S-I12 to set the MFL flag (representing whether the far terminus of the focusing lens group is being detected by driving the zoom ring in the macro area) to 1 before returning back to step S2 in FIG. 14.

Figure 36:
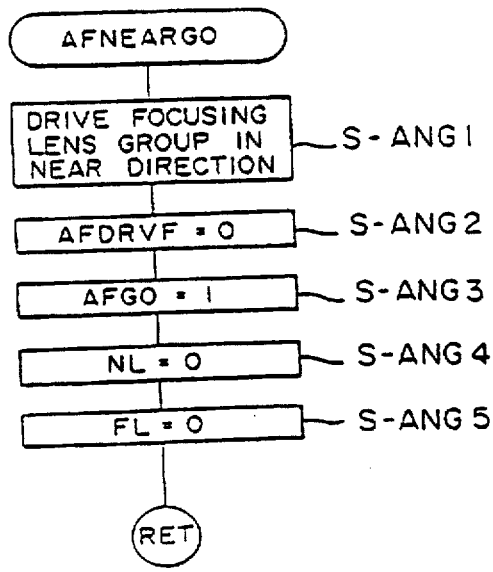

When processing advances from step S13 to S14 (FIG. 14), it drives the focusing lens group in the near direction, as shown in FIG. 36. When processing advances from steps S18 to S19 it drives the focusing lens group in the far direction, as shown in FIG. 35.

The instructions shown in FIG. 35 drive the focusing lens group in the far direction in step S-AFG1. The process sets the AFDRVF flag (representing whether the focusing lens group is being driven in the far direction) to 1 (i.e., far direction) in step S-AFG2. Then, the AFGO flag (representing whether the focusing lens group is being driven) is set to 1 (i.e., drive state) in step S-AFG3, and the NL flag (representing whether the near terminus of the focusing lens group is being detected) and FL flag (representing whether the far terminus of the focusing lens group is being detected) are set to 0 in steps S-AFG4 and S-AFG5, before advancing to step S15 in FIG. 14.

The instructions shown in FIG. 36 drive the focusing lens group in the near direction in step S-ANG1. In step S-ANG2, since the driving direction of the focusing lens group is near rather than far, the AFDRVF flag (representing whether the focusing lens group is being driven in the far direction) is set to 0 (i.e., near direction). The AFGO flag (representing whether the focusing lens group is being driven) is set to 1 in step S-ANG3. The NL flag (representing whether the near terminus of the focusing lens group is being detected) and the FL flag (representing whether the far terminus of the focusing lens group is being detected) are set to 0 in steps S-ANG4 and S-ANG5 before advancing to step S15 in FIG. 14.

In step S15, it is determined whether the focusing lens group has been driven for the amount of defocusing dp obtained in step S6. When the focusing lens group has been driven for an are amount equal to dp, processing advances to step S20 to execute an AF drive stop subroutine to stop the focusing lens group, before returning back to step S2. When the focusing lens group has not been driven by an amount equal to dp, processing advances to step S16 to determine whether the interval of the driving pulses, which are outputted from the AF pulser 48, is at least 100 msec. When the test, indicates the pulse interval is less than 100 msec, processing enters a loop so as to repeat steps S-15 and S-16. When the pulse interval exceeds 100 msec, processing stops driving the focusing lens group. At this time, the friction type clutch, which links AF motor M1 and the focusing lens group, slips. Thus, when the pulse interval exceeds 100 msec, processing advances to step S17 so as to execute the AF terminus point subroutine. After that, processing advances back to step S2.

AF Terminus Point Subroutine

Figure 23:
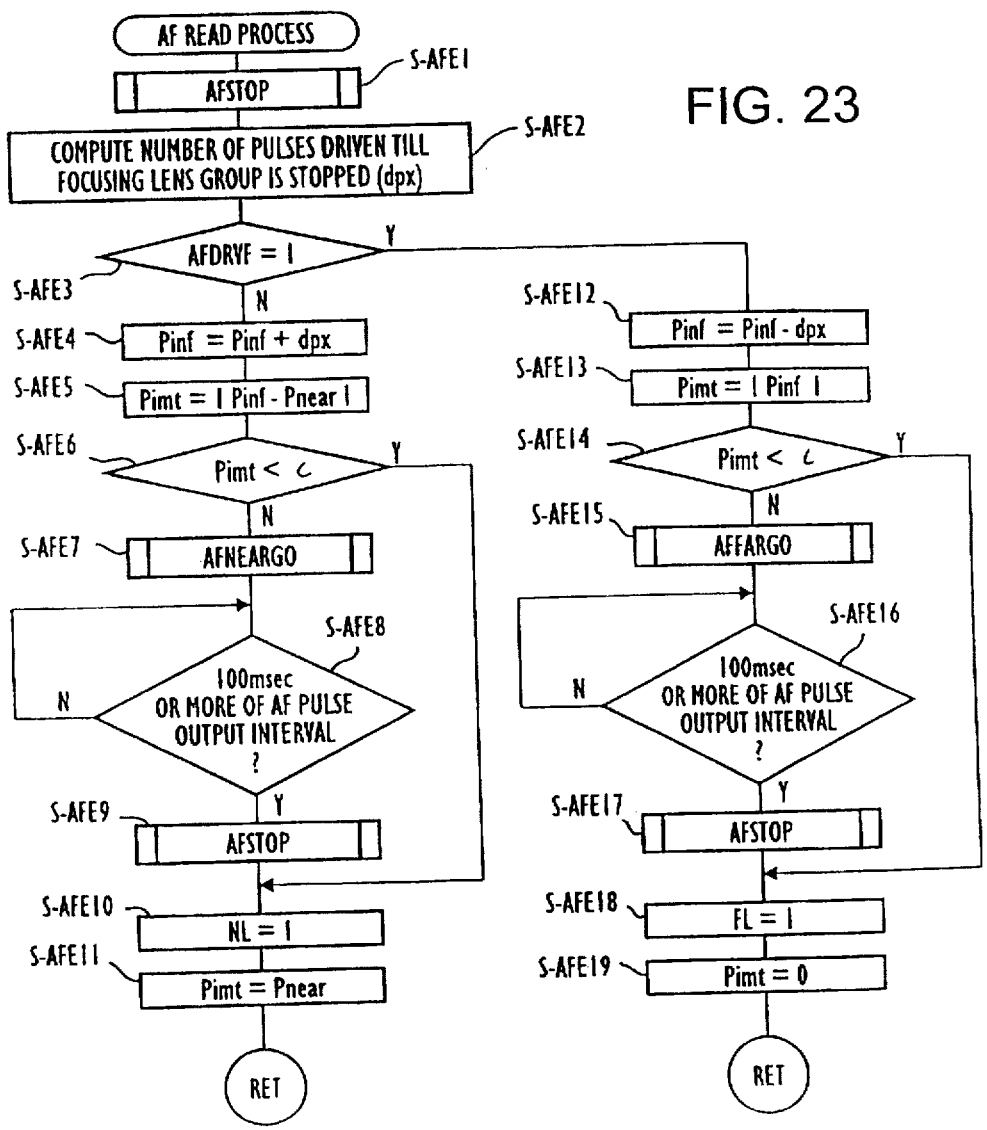

The AF terminus point subroutine in step S17 is performed as shown in FIG. 23. The AFSTOP subroutine, shown in FIG. 41, takes place in the manner as described above in step S-AFE1 to stop driving the focusing lens group, and then advances to step S-AFE2. The process computes the number of pulses being driven until the focusing lens group is stopped, dpx, using an output from the AF pulser 48 in step S-AFE2 before advancing to step S-AFE3 to determine whether the driving direction of the focusing lens group is far. When the driving direction is far, the determined condition is YES and the process advances to step S-AFE12. When the driving direction is near, the determined condition is NO and processing advances to step S-AFE4.

In step S-AFE4, the process replaces the number of pulses for advancing the focusing lens group $P_{inf}$ with a value where the number of pulses for advancing the focusing lens group from the far terminus $P_{inf}$ is added to the number of pulses being driven until the focusing lens group is stopped, dpx, obtained in step S-AFE2, before advancing to step S-AFE5.

In step S-AFE5, the process subtracts the number of pulses between the far terminus, $P_{inf}$, and near terminus, Pnear, of the focusing lens from the number of pulses between the near terminus and the focal point of the focusing lens group, $P_{inf}$, obtained in step S-AFE4, to compute an absolute value of the result as Plmt. After that, processing advances to step S-AFE6.

In the terminus point detection process, since the number of pulses between the far terminus and near terminus is known it can be set as the number of pulses for driving the focusing lens group to the near terminus. However, it is necessary to consider that the focusing lens group may not be driven to the near terminus and stopped in the midway due to some cause.

On the other hand, since the number of pulses Pnear is a known value from the lens being used, when the focusing lens group is positioned at the near terminus, the result of the absolute value of the subtraction of $P_{inf}$-Pnear will be 0. Thus, when the focusing lens group is positioned at the near terminus, the result of the subtraction should be 0. However, if the result of the subtraction is in a predetermined allowance, it is treated that the focusing lens group is positioned at the terminus point. The number of pulses Pnear, which is a known value of the lens, is stored in the lens ROM as fixed data.

Thus, the process determines whether the number of pulses at the terminus point is in a predetermined allowable value e or not. Namely, when |$P_{inf}$-Pnear| is less than the allowable value e, the determined condition is YES and processing advances to step S-AFE10. Otherwise, the predetermined condition is NO and the process advances to step S-AFE7. The allowable value e represents a range of pulses (such as 10 pulses) for which the focusing lens group can be driven without an error. In Step S-AFE7, the process drives the focusing lens group, shown in FIG. 36, on the near terminus side and then advances to step S-AFE8.

When the focusing lens group is being driven in the near direction, driving pulses are output from the AF pulser 48 to the lens CPU 44. The process determines whether the driving pulses are being output from the AF pulser 48 in step S-AFE8. This determination is made by detecting whether the pulse interval is at least 100 msec. When the determined condition is NO (less than 100 msec), the process enters a loop so as to repeat the test until the determined condition becomes YES (100 msec or more), namely the terminus point is detected. When the pulse interval exceeds 100 msec, the process drives the focusing lens group to the near terminus and stops it. At this time, the friction type clutch, which links AF motor M1 and the focusing lens group, slips. Thus, when the pulse interval exceeds 100 msec, the determined condition is YES (more than 100 msec) and processing advances to step S-AFE9 to perform the AFSTOP subroutine shown in FIG. 41. After that, the process advances to step S-AFE10 to set flag NL (representing whether the near terminus of the focusing lens group is being detected) to 1 in S-AFE10. Thereafter, the process equalizes $P_{l\,ms}$ to Pnear in step S-AFE11 and advances to S2, shown in FIG. 14.

When the process determines that the driving direction is far in step S-AFE3, the determined condition is YES (far direction) and the process advances to step S-AFE12. At that time, the process replaces the number of pulses for advancing the focusing lens group, $P_{inf}$, with a value where the number of pulses being driven until the focusing lens group is stopped, dpx, obtained in step S-AFE2 is subtracted from the number of pulses for which the focusing lens group is advanced from the far terminus, $P_{inf}$ and then advances to step S-AFE13.

In step S-AFt13, the process computes an absolute value |$P_{inf}$-dpx| for the number of pulses from the focal point to the far terminus of the focusing lens group, Pinf, obtained in step S-AFE12, and then advances to step S-AFE14. However, because the focusing lens group may not be driven to the far terminus, but rather stopped midway, it is necessary to detect that. On the other hand, when the focusing lens group is positioned at the far terminus, the absolute value of $P_{inf}$, namely the absolute value of $P_{inf}$-dpx in step S-AFE12 result of the subtraction in steps AFE12) will be 0. Thus, when the focusing lens group is positioned at the far terminus, the result of the subtraction should be 0. However, by considering that some error may occur, when the error is within an allowable value, it is treated as if the focusing lens group is positioned at the terminus point.

The process determines whether the number of pulses at the terminus point is in an allowable value e in step S-AFE14. In other words, when |$P_{inf}$| is less than the allowable value e, the determined condition is YES and the process advances to step S-AFE18. Otherwise, the determined condition is NO and the process advances to step S-AFE15 to drive the focusing lens group to the far terminus, shown in FIG. 35, in the manner described above.

When the focusing lens group is being driven to the far terminus, driving pulses are outputted from the AF pulser 48 to the lens CPU 44. The process determines whether the driving pulses are being output from the AF pulser 48 in step S-AFE16. This determination is made by detecting whether the pulse interval is at least 100 msec. When the determined condition is NO ( less than 100 msec), the process enters a loop so as to repeat the determination until the determined condition becomes YES (at least 100 msec), namely the terminus point is detected. When the pulse interval exceeds 100 msec, the process drives the focusing lens group to the far terminus and stops it. At that time, the friction type clutch, which links AF motor M1 and the focusing lens group, slips. Thus, when the pulse interval exceeds 100 msec, the determined condition is YES (more than 100 msec) and the process advances to step S-AFE17 to perform the AFSTOP subroutine shown in FIG. 41. The process then advances to step S-AFE18 to set flag FL (representing whether the far terminus of the focusing lens group is being detected) to 1 and $P_{inf}$ to 0 before advancing to step S2 in FIG. 14.

Figure 22:
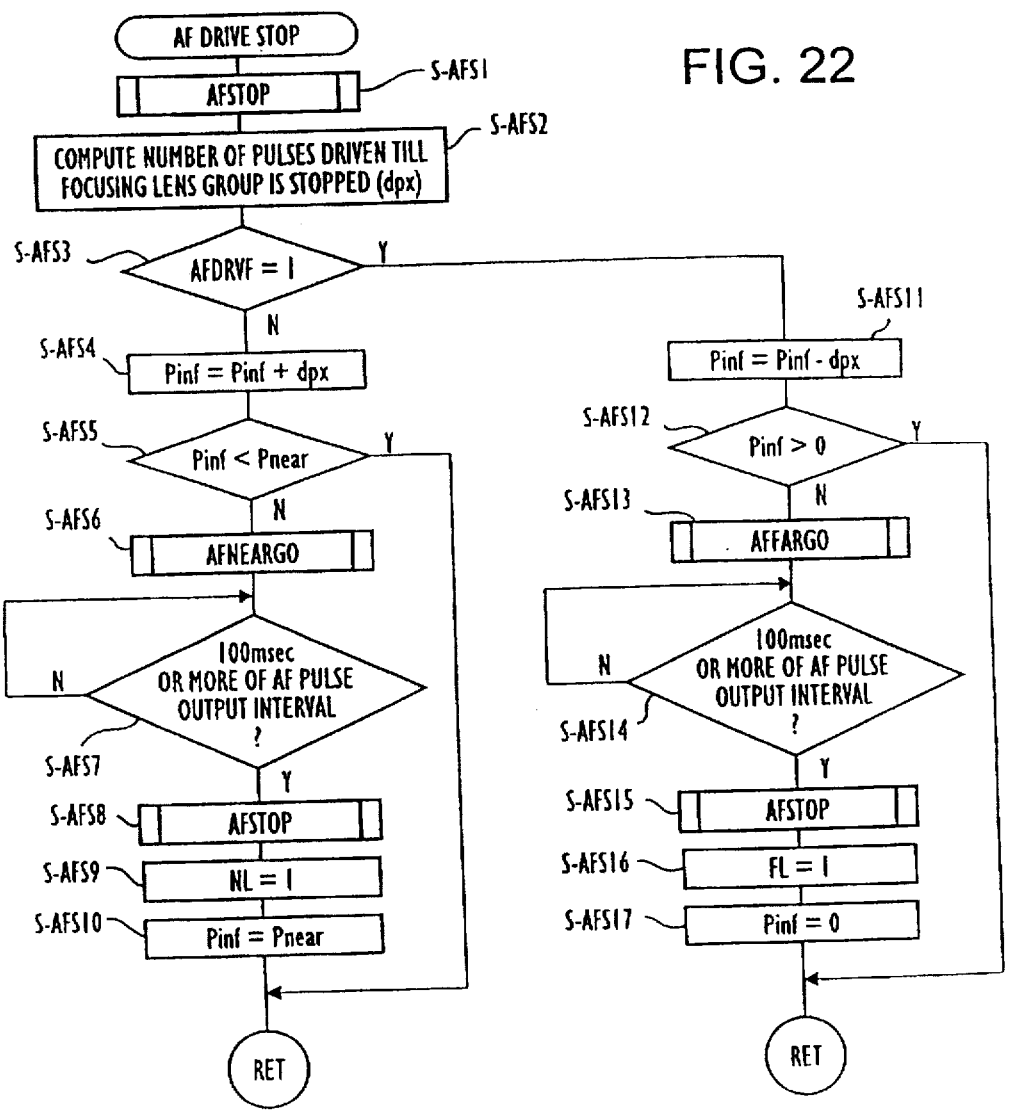

AF Drive Stop (FIG. 22)

The AF drive stop subroutine in step S20 is conducted as shown in FIG. 22. The AFSTOP subroutine shown in FIG. 41 as described above takes place in step S-AFS1 so as to stop driving the focusing lens group before advancing to step S-AFS2. The process computes the number of pulses being driven until the focusing lens group is stopped, dpx, using an output from the AF pulser 48 and then advances to step S-AFS3. The process determines whether the driving direction is far in step S-AFS3. When the determined condition is YES (far direction), the process advances to step S-AFS11. When the determined condition is NO (near direction), the process advances to step S-AFS4

The process replaces the number of pulses for advancing the focusing lens group, $P_{inf}$, with a value where the number of pulses being driven until the focusing lens group is stopped, dpx (equivalent to dp) obtained in step S-AFS2 is added to the number of pulses for which the focusing lens group is advanced from the far terminus, Pinf, before advancing to step S-AFS5.

The process determines whether the number of pulses at the terminus point is larger (out of range) or smaller (in range) than Pnear in step S-AFS5. When the determined condition is YES (in range), the process advances to step S2 in FIG. 14. When the determined condition is NO (out of range), the process advances to step S-AFS6. The process drives the focusing lens group in the near direction in step S-AFS6, shown in FIG. 36.

When the focusing lens group is being driven in the near direction, driving pulses are output from the AF pulser 48 to the lens CPU 44. The process determines whether the driving pulses are being output from the AF pulser 48 in step S-AFS7. This determination is made by detecting whether the pulse interval is at least 100 msec. When the determined condition is NO (less than 100 msec), the process enters a loop so as to repeat the determination until the determined condition becomes YES (100 msec or more), namely, the terminus point is detected. When the pulse interval exceeds 100 msec, the process drives the focusing lens group to the near terminus and stops it. At that time, the friction type clutch, which links AF motor M1 and the focusing lens group, slips. Then, when the pulse interval exceeds 100 msec, the determined condition becomes YES (100 msec or more) and the process advances to step S-AFS8 to perform the AFSTOP subroutine shown in FIG. 41. Thereafter, the process advances to step S-AFS9 and sets flag NL (representing whether the near terminus of the focusing lens group is being detected) to 1. The process then sets $P_{inf}$ to be equal to Pnear in step S-AFS10 before advancing to step S2 in FIG. 14.

The process determines whether the driving direction is far in step S-AFS3. When the determined condition is YES (far direction), the process advances to step S-AFS11. The process replaces the number of pulses for which the focusing lens group is advanced, $P_{inf}$, with a value where the number of pulses being driven until the focusing lens group is stopped, dpx, obtained in step S-AFS2 is subtracted from the number of pulses for which the focusing lens group is advanced from the far terminus, $P_{inf}$, and then advances to step S-AFS12.

The process determines whether the number of pulses $P_{inf}$ at the terminus point is larger (in range) or smaller (out of range) than 0 in step S-AFS12. When the determined condition is YES (in range), the process advances to step S2 in FIG. 14. When the determined condition is NO (out of range), the process advances to step S-AFS13. The process drives the focusing lens group in the far direction in the manner described above and shown in FIG. 35 in step S-AFS13.

When the focusing lens group is being driven in the far direction, driving pulses are outputted from the AF pulser 48 to the lens CPU 44. The process determines whether the driving pulses are being output from the AF pulser 48 in step S-AFS14. This determination is made by detecting whether the pulse interval is at least 100 msec. When the determined condition is NO (less than 100 msec) the process enters a loop so as to repeat the determination until the determined condition becomes YES (100 msec or more), namely the terminus point is detected. When the pulse interval exceeds 100 msec, the process drives the focusing lens group to the far terminus and stops it. At that time, the friction type clutch, which links AF motor M1 and the focusing lens group, slips. Thus, when the pulse interval exceeds 100 msec, the determined condition is YES (100 msec or more) and the process advances to step S-AFS15 to execute the AFSTOP subroutine shown in FIG. 41 before advancing to step S-AFS16 to set flag FL (representing whether the far terminus of the focusing lens group is being detected) to 1. Thereafter, $P_{inf}$ is set to 0 in step S-AFS17, and processing advances to step S2 in FIG. 14.

Image Magnification Constant Control

In step S21, shown in FIG. 14, the process determines whether flag MAGIMG (representing whether to start the image magnification constant operation) has been set to 1. When the MAGIMG flag has been set to 1, the determined condition is YES and the process advances to step S25. The process turns OFF the in-focus indication in step S25. The process then advances to step S-B1, shown in FIG. 15, to perform the image magnification constant control operation.

In step S-B1, shown in FIG. 15, the process sets flag ONIMG (representing whether the image magnification constant control operation takes place) to 1 (control state). The process then advances to step S-B2. The process computes the amount of advancing of the focusing lens group from the infinite terminus, $x_0$ in step S-B2 and then advances to step S-B3. The process inputs the present focal length information of the zooming lens group, $f_0$, in step S-B3 and then advances to step S-B4. The process determines whether the amount of advancing, $x_0$, is smaller than $f_0/150$. In this determination, whether the amount of advancing, $x_0$, is smaller than $f_0/150$ means whether the image magnification is too small to be controlled. When the image magnification is too small, a change of the image magnification, caused by a moving of the subject, cannot be precisely detected. Thus, in this case, when the determined condition is YES, the process advances to step S-B18 to turn OFF the in-focus indication. The process generates an out-of-control signal to inform the operator that the image magnification constant control operation is disabled in step S-B19. The process sets flag SWREN (representing whether the release operation is permitted), flag ONIMG (representing whether the image magnification constant control operation takes place) and flag MAGIMG (representing whether to start the image magnification constant operation) to 0 in steps S-B20 to S-B22, before advancing to step S2 in FIG. 14.

When the process determines that the image magnification is not too small in step S-B4, the determined condition is NO and the process advances to step S-B5. The process computes $m_0 = x_0/f_0$ in step S-B5 and then advances to step S-B6. The process computes the amount of defocusing, dx, in step S-B6 and advances to seep S-B7 to determine whether the contrast of the subject is LOW. When the determined condition is YES (LOW contrast), the process advances to step S-B23 to set flag SWREN (representing whether the release operation is permitted) to 0. The process turns OFF the in-focus indication in S-B24 and then advances to step S2 in FIG. 14 so as to enter a loop until the contrast becomes HIGH. For improving the operability, this operation allows the image magnification constant control operation to be continued when the subject returns to a predetermined position on the screen, even if it is lost from the screen or it has moved in a horizontal direction and the contrast decreases.

When the determined condition is NO, the process advances to step S-B8 to determine whether the subject is focused. When the determined condition is YES (focused), since the contrast is HIGH and the subject does not move from the former position, the process advances to step S-B16. The process then sets flag SWREN (representing whether the release operation is permitted) to 1 (release permission) in step S-B16 and advances to step S-B17 so as to turn ON the in-focus indication before returning back to step S-B1 so as to enter a loop. When the determined condition is NO (not focused) in step S-B8, since the lens should be moved, the process advances to step S-B9. The process computes the amount of driving of the focusing lens group, dp, using the amount of defocusing, dx, in step S-B9 and then advances to step S-B10.

The process computes a focal length of the focusing lens group of which the amount of defocusing dx occurs, using equation (7) in step S-B10 and then advances to step S-B11. In this step, the focal length f of equation (7) is assumed to be f1. Assuming that the focal length at the wide terminus of the focusing lens group is fW and that at the TL terminus it is ft, to perform the image magnification constant control operation, it is necessary that fW<f1<ft. The process determines this in step S-B11. When f1 is not in the range, the determined condition is NO and the process advances to step S-B25. The process sets flag SWREN (representing whether the release operation is permitted) to 0 in step S-B25 and then turns OFF the in-focus indication in step S-B26 before advancing to step S-E1 in FIG. 18. The process starting at step S-E1 waits until f1 is in the range of fW<f1<ft.

When f1 is in the range of fW<f1<ft in S-B11, the determined condition is YES and the process advances to Step S-B12. The process computes the control image magnification, $=f1/f_0$, and then advances to step S-B13. The process inputs constants A, B, and C, for computing the amount of driving of the zooming lens group Pz, from the lens ROM 43 to the lens CPU 43 or main CPU 6 and then advances to step S-B14. The process computes the amount of driving Pz according to equation (11) using the constants A, B, and C in step S-B14 and then advances to step S-B15 to determine whether dp and Pz are 0. When both of them are not 0, the determined condition is NO and the process advances to step S-N1 in FIG. 16. When both of them are 0, the determined condition is YES and the process advances to step S-B16 to set flag SWREN (representing whether the release operation is permitted) to 1 (release permission) and to turn ON the in-focus indication (in step S-B17) before returning back to step S-B1 so as to enter a loop.

Figure 16:
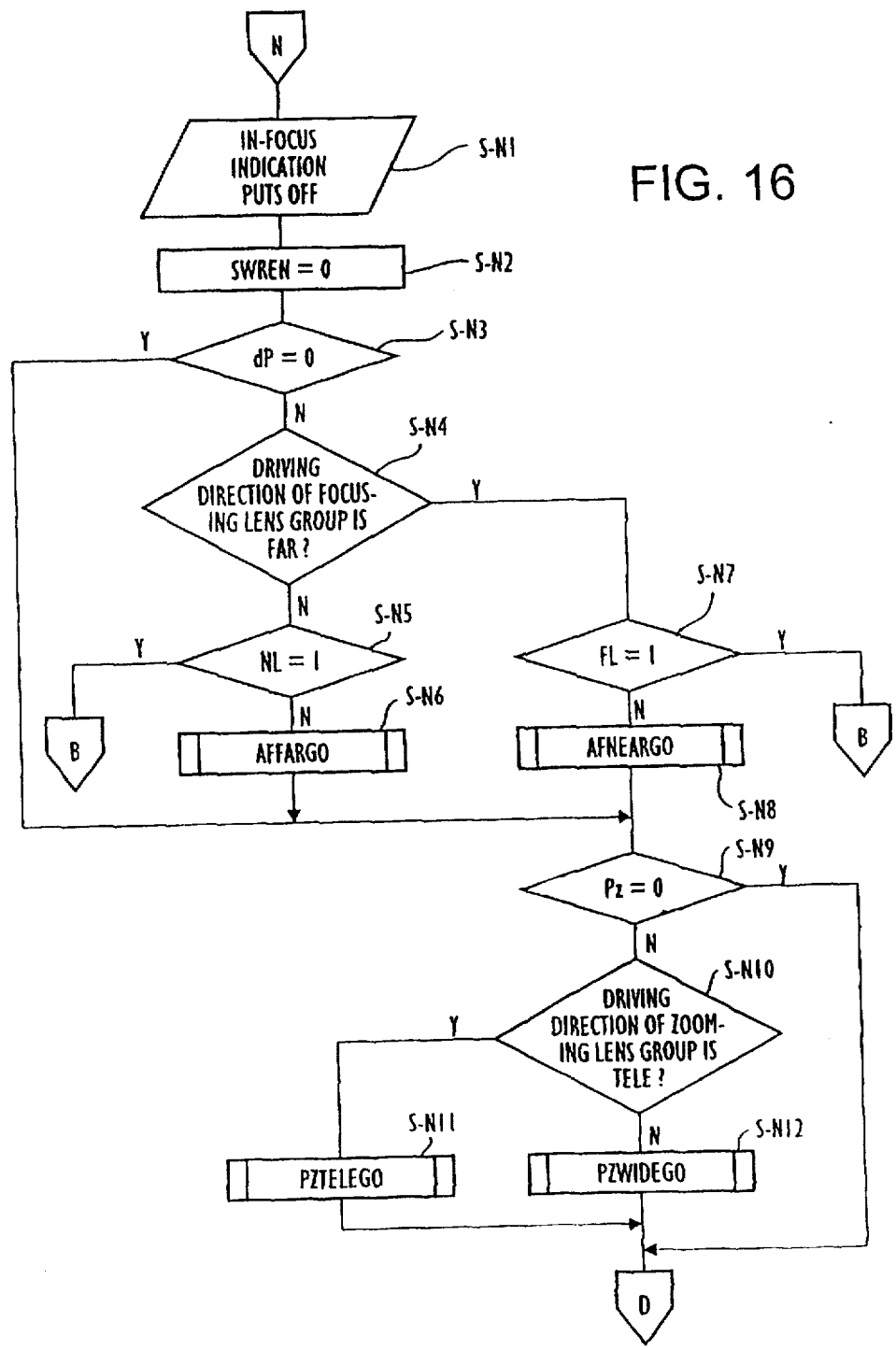

When the process determines that either dp or Pz is not 0 in S-B15, it advances to step S-N1 in FIG. 16 to turn OFF the in-focus indication. The process then sees flag SWREN (representing whether the release operation is permitted) to 0 in step S-N2 and advances to step S-N3 to determine whether the amount of driving of the focusing lens group, dp, is 0. When the amount of driving is 0, the determined condition is YES and the process advances to step S-N9 to determine whether the amount of driving of the zooming lens group, Pz, is 0. When the amount of driving of the zooming lens group Pz is 0, the determined condition is YES and the process advances to step S-D1 in FIG. 17.

When the amount of driving dp is not 0 in step S-N3, the determined condition is NO and the process advances to step S-N4 to determine whether the driving direction of the focusing lens group is far. When the direction is near, the determined condition is NO and the process advances to step S-N5. When the direction is far, the determined condition is YES and the process advances to step S-N7. The process determines whether flag NL (representing whether the near terminus of the focusing lens group is being detected) has been set to 1 in step S-N5. When the terminus point has been detected and the NL flag has been set to 1, the determined condition is YES and the process returns back to step S-B1 in FIG. 15 so as to enter a loop. When the determined condition is NO, the process advances to step S-N6. The process determines whether flag FL (representing whether the far terminus of the focusing lens group is being detected) has been set to 1 in step S-N7. When the terminus point has been detected and the FL flag has been set to 1, the determined condition is YES and the process returns back to step S-B1 in FIG. 15 so as to enter a loop. When the determined condition is NO, the process advances to step S-N8. The process in step S-N6, shown in FIG. 35, is the AFFARGO subroutine which drives the focusing lens group in the far direction. The subroutine in step S-N8, shown in FIG. 36, is the AFNEARGO subroutine which drives the focusing lens group in the near direction. After that, the process advances to step S-N9 to determine whether the amount of driving, Pz, is 0. When it is not 0, the determined condition is NO and the process advances to step S-N10 to determine whether the driving direction of the zooming lens group is towards the telephoto side. When the direction is towards the telephoto side, the determined condition is YES and the process advances to step S-N11 to execute a PZTELEGO subroutine, shown in FIG. 37, which drives the zooming lens group in the tele direction. When the direction determination is wide in step S-N10, the determined condition is NO and the process advances to step S-N12 to perform a PZWIDEGO subroutine, shown in FIG. 38, which drives the zooming lens group in the wide direction.

Figure 37:
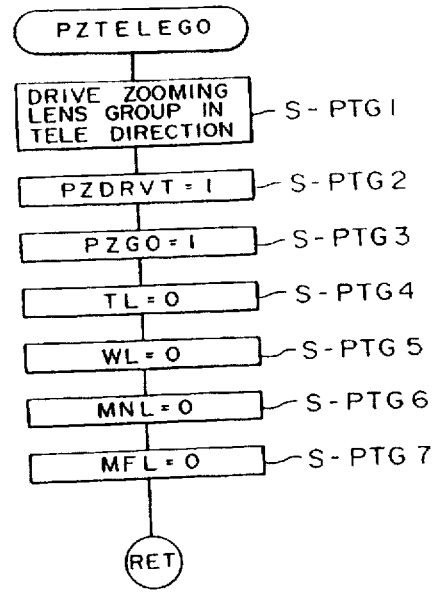

The PZTELEGO subroutine, shown in FIG. 37, drives the zooming lens group in the tele direction in step S-PTG1. The process then sets flag PZDRVT (representing whether the zooming lens group is being driven in the tele direction) to 1 (tele direction) and flag PZGO (representing whether the zooming lens group is being driven) to 1 (drive state) in steps S-PTG2 and S-PTG3. In steps S-PTG4 to S-PTG7, the process sets flag TL (representing whether the tele terminus of the zooming lens group is being detected), flag WL (representing whether the wide terminus of the zooming lens group is being detected), flag MNL (representing whether the near terminus of the focusing lens group is being detected by driving the zoom ring in the macro area) and flag MFL (representing whether the far terminus of the focusing lens group is being detected by driving the zoom ring in the macro area) to 0 before advancing to step S-D1 in FIG. 17.

Figure 38:
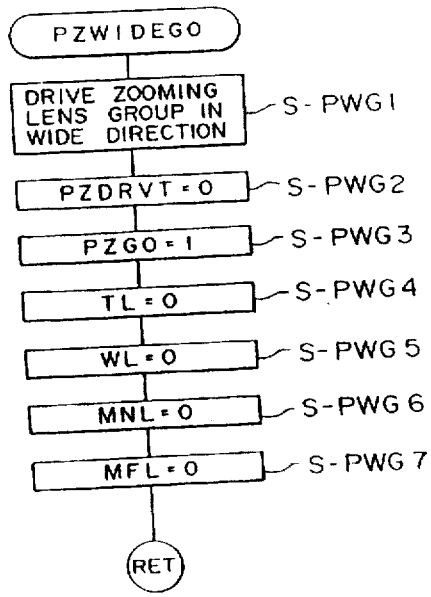

The PZWIDEGO subroutine, shown in FIG. 38, drives the zooming lens group in the wide direction in step S-PWG1. The process sets flag PZDRVF (representing whether the zooming lens group is being driven in the tele direction) to 0 (wide direction) in step S-PWG2 and flag PZGO (representing whether the zooming lens group is being driven) to 1 (drive state) in step S-PWG3. Thereafter, in steps S-PWG4 to S-PWG7, the process sets flag TL (representing whether the tele terminus of the zooming lens group is being detected), flag WL (representing whether the wide terminus of the zooming lens group is being detected), flag MNL (representing whether the near terminus of the focusing lens group is being detected by driving the zoom ring in the macro area) and flag MFL (representing whether the far terminus of the focusing lens group is being detected by driving the zoom ring in the macro area) before advancing to step S-D1 in FIG. 17.

The process beginning at step S -D1 always stops at any position rather than detecting the terminus point, because the focusing lens group is positioned in the zoom area. The process operates to only detect the terminus point of the focusing lens group. In the process starting at step S-D1, the following cases are described:

(a) When both the focusing lens group and zooming lens group do not move;

(b) When only the zooming lens group moves and the focusing lens group does not move;

(c) When the zooming lens group stops and only the focusing lens group moves;

(d) When both the focusing lens group and the zooming lens group move (however, the focusing lens group stops earlier than the zooming lens group); and (e) When both the focusing lens group and zooming lens group move (however, the zooming lens group stops earlier than the focusing lens group).

Each of the above cases is described below as follows:
(a) When Both the Focusing Lens Group and Zooming Lens Group Do Not Move In step S-D1, shown in FIG. 17, the process determines whether flag AFGO (representing whether the focusing lens group is being driven) has been set to 1 (drive state). When the determined condition is YES, the process advances to step S-D2. When the determined condition is NO, the process advances to step S-D13. The process determines whether flag PZGO (representing whether the zooming lens group is being driven) has been set to 1 (drive state) in step S-D16. When the determined condition is NO, the process advances to step S-D16. The process sets flag SWREN (representing whether the release operation is permitted) to 1 (in-focus indication) in step S-D16, stops driving the focusing lens group, shown in FIG. 22, in step S-D17, and then advances to step S-D18.

The process then determines whether flag FL (representing whether the far terminus of the focusing lens group is being detected) has been set to 0 (terminus point detection) in step S-D18. When the terminus point has been detected, the determined condition is YES and the process advances to step S-B1 in FIG. 15 so as to enter a loop. When the terminus point has not been detected, the determined condition is NO and the process advances to step S-D19. The process then determines whether flag NL (representing whether the near terminus of the focusing lens group is being detected) has been set to 1 (terminus joint detection) in step S-D19. When the determined condition is YES, the process advances to step S-B1 in FIG. 15. When the terminus point has not been detected, the determined condition is NO and the process advances to step S-D20.

When the determined conditions in steps S-D18 and S-D19 are both NO, since the image magnification becomes constant, the process turns ON the in-focus indication in step S-D20. The process then sets flag SWREN (representing whether the release operation is permitted) to 1 in step S-D21 before returning back to step S-B1 in FIG. 15 so as to enter a loop. When either determined condition in step S-D18 or S-D19 is YES, the process returns back to step S-B1 in FIG. 15 so as to enter a loop until the image magnification becomes constant.

(b) When Only the Zooming Lens Group Moves and the Focusing Lens Group Does Not Move The process determines whether flag AFGO (representing whether the focusing lens group is being driven) has been set to 1 (drive state) in step S-D1. When the determined condition is YES, the process advances to step S-D2. When the determined condition is NO, the process advances to step S-D13. The process determines whether flag PZGO (representing whether the zooming lens group is being driven) has been set to 1 (drive state) in step S-D13. When the determined condition is YES, the process advances to step S-D14. The process determines whether the zooming lens group has been driven for the number of driving pulses, Pz, in step S-D14. When the determined condition is NO, the process returns back to step S-D1 so as to enter a loop until the zooming lens group has been driven for the number of driving pulses, Pz. When the zooming lens group has been driven for the number of driving pulses Pz, the determined condition in step S-D14 is YES (drive completion) and the process advances to step S-D15. The process stops driving the zooming lens group shown in FIG. 42 in step S-D15 and then advances to step S-D16. After that, the process advances from steps S-D16 to S-D21 and then returns back to step S-B1 in FIG. 15, so as to enter a loop.

(c) When the Zooming Lens Group Stops and Only the Focusing Lens Group Moves

The process determines whether flag AFGO (representing whether the focusing lens group is being driven) has been set to 1 (drive state) in step S-D1. When the determined condition is YES (drive state), the process advances to step S-D2. The process determines whether flag PZGO (representing whether the zooming lens group is being driven) has been set to 1 (drive state) in step S-D2. When the determined condition is NO (non-drive state), the process advances to step S-D4. The process determines whether the focusing lens group has been driven for the number of pulses dp in step S-D4. When the determined condition is YES, the process advances to step S-D12 so as to perform the AFS-TOP subroutine shown in FIG. 41. The process stops driving the focusing lens group and then returns back to step S-D1 so as to enter a loop.

When the determined condition in step S-D4 is NO, the process advances to step S-D5. The process determines whether the output interval of the AF pulses, which are output from the AF pulser 48, is at least 100 msec in step S-D5. When the determined condition is NO (less than 100 msec), the process returns back to step S-D1 so as to enter a loop until the pulse interval becomes 100 msec or more. When the determined condition is YES (100 msec of more), the process advances to step S-D6 so as to perform the AFSTOP subroutine shown in FIG. 41. The subroutine stops driving the focusing lens group and then advances to step S-D7.

The process determines whether flag PZGO (representing whether the zooming lens group is being driven) has been set to 1 (drive state) in step S-D7. When the zooming lens group is not being driven, the determined condition is NO and the process advances to step S-D10. The process advances to the terminus point process shown in FIG. 23 and then returns to step S-B1 in FIG. 15, so as to enter a loop.

(d) When Both the Focusing Lens Group and the Zooming Lens Group Move; However, the Focusing Lens Group Stops Earlier than the Zooming Lens Group The process determines whether flag AFGO (representing whether the focusing lens group is being driven) has been set to 1 (drive state) in step S-D1. When the determined condition is YES (drive state), the process advances to step S-D2. The process when determines whether flag PZGO (representing whether the zooming lens group is being driven) has been set to 1 (drive state in step S-D2. When the determined condition is YES (drive state), the process advances to step S-D3. The process determines whether the zooming lens group has been driven for the required number of driving pulses Pz in step S-D3. When the determined condition is NO, the process advances to step S-D4 to determine whether the focusing lens group has been driven for the required number of pulses dp. When the determined condition is YES, the process advances to step S-D12 so as to perform the AFSTOP subroutine, shown in FIG. 41. The subroutine stops driving the focusing lens group, and then returns back to step S-D1, to advance to steps S-D13 to S-D19.

When the determined condition is NO in step S-D4, the process advances to step S-D5 to determine whether the output interval of the AF pulses, which are outputted from the AF pulser 48, is at least 100 msec. When the determined condition is NO (less than 100 msec), the process returns back to step S-D1 so as to enter a loop until the pulse interval becomes 100 msec or more. When the determined condition is YES (100 msec or more), the process advances to step S-D6 so as to perform the AFSTOP subroutine shown in FIG. 41, which stops driving the focusing lens group and then advances to step S-D7.

The process then determines whether flag PZGO (representing whether the zooming lens group is being driven) has been set to 1 (drive state) in step S-D7. When the zooming lens group is being driven, the determined condition is YES and the process advances to step S-D8. The process determines whether the zooming lens group has been driven for the number of driving pulses Pz based on the pulses which are outputted from the Pz pulser 49 in step S-D8. When the determined condition is NO, the process enters a loop until the zooming lens group has been driven for the number of driving pulses. When the determined condition is YES, the process advances to step S-D9 so as to stop driving the zooming lens group by executing a ZOOM-STOP subroutine, shown in FIG. 42 before advancing to step S-D10 in FIG. 17 to perform the terminus point process subroutine and then returning back to step S-B1 in FIG. 15, so as to enter a loop.

(e) When Both the Focusing Lens Group and Zooming Lens Group Move; However, the Zooming Lens Group Stops Earlier Than the Focusing Lens Group The process determines whether flag AFGO (representing whether the focusing lens group is being driven) has been set to 1 (drive state) in step S-D1. When the determined condition is YES (drive state), the process advances to step S-D2. The process then determines whether flag PZGO (representing whether the zooming lens group is being driven) has been set to 1 (drive state) in step S-D2. When the determined condition is YES (drive state), the process advances to step S-D3. The process then determines whether the zooming lens group has been driven for the required number of driving pulses Pz in step S-D3. When the determined condition is YES, the process advances to step S-D11 to stop driving the zooming lens group before advancing to step S-D4.

The process determines whether the focusing lens group has been driven for the required number of pulses dp in step S-D4. When the determined condition is YES, the process advances to step S-D12 so as to perform the AFSTOP subroutine, shown in FIG. 41, to stop driving the focusing lens group before returning back to step S-D1. When the AFSTOP subroutine is completed, flag AFGO (representing whether the focusing lens group is being driven) is set to 0. Thus, since the determined condition in step S-D1 is NO, the processes in steps S-D13 to S-D21 are performed.

When the determined condition is NO in step S-D4, the process advances to step S-D5 to determine whether the output interval of the AF pulses, which are outputted from the AF pulser 48, is at least 100 msec. When the determined condition is NO (less than 100 msec), the process returns back to step S-D1 so as to enter a loop until the output interval becomes 100 msec or more. When the determined condition is YES (100 msec or more), the process advances to step S-D6 to perform the AFSTOP subroutine shown in FIG. 41, which stops driving the focusing lens group before advancing to step S-D7.

The process determines whether flag PZGO (representing whether the zooming lens group is being driven) has been set to 1 (drive state) in step S-D7. When the zooming lens group is not being driven, the determined condition is NO and the process advances to step S-D10 to execute the terminus point process subroutine shown in FIG. 23, before returning back to step S-B1 in FIG. 15 so as to enter a loop.

Figure 18:
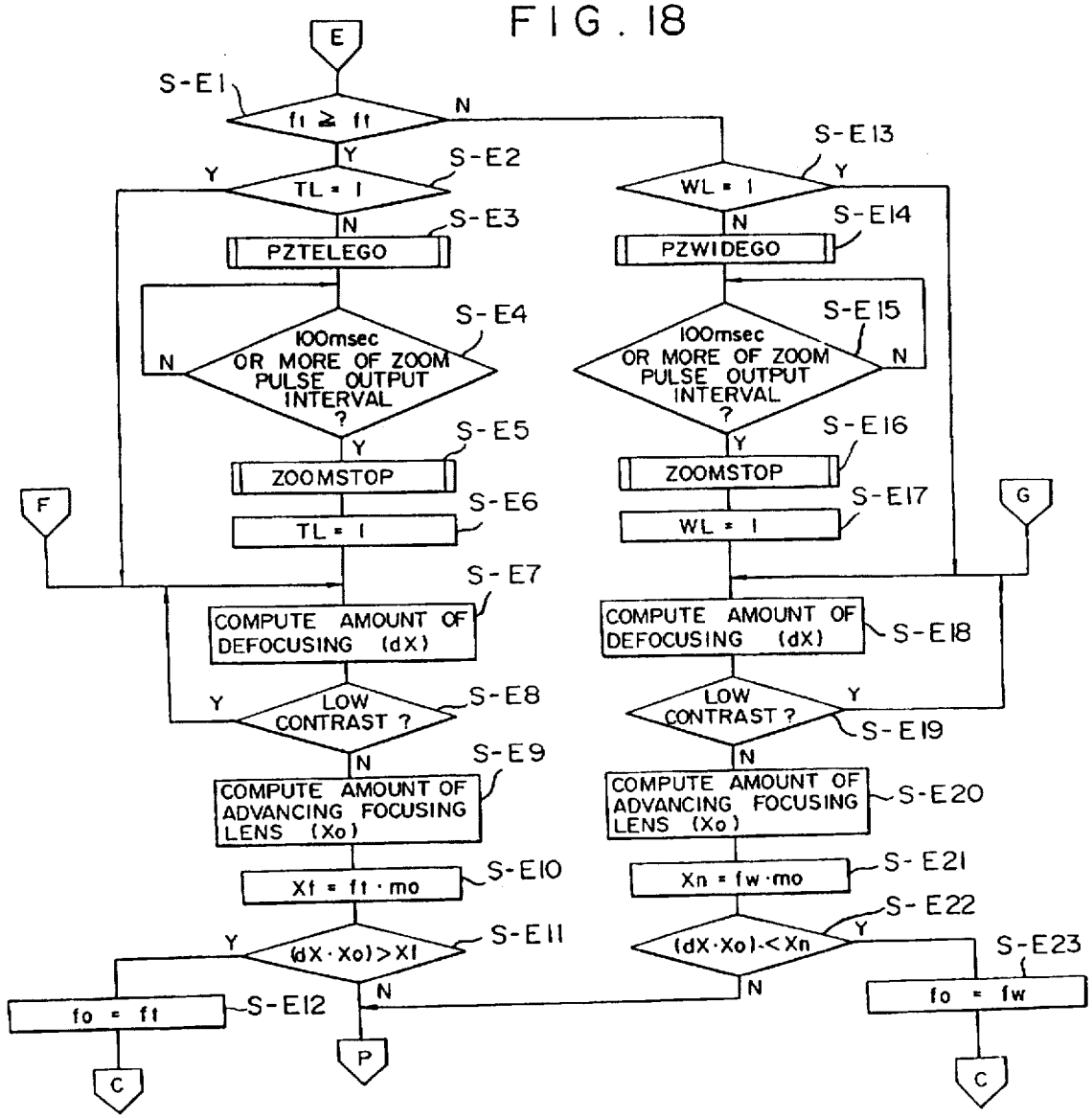
Figure 19:
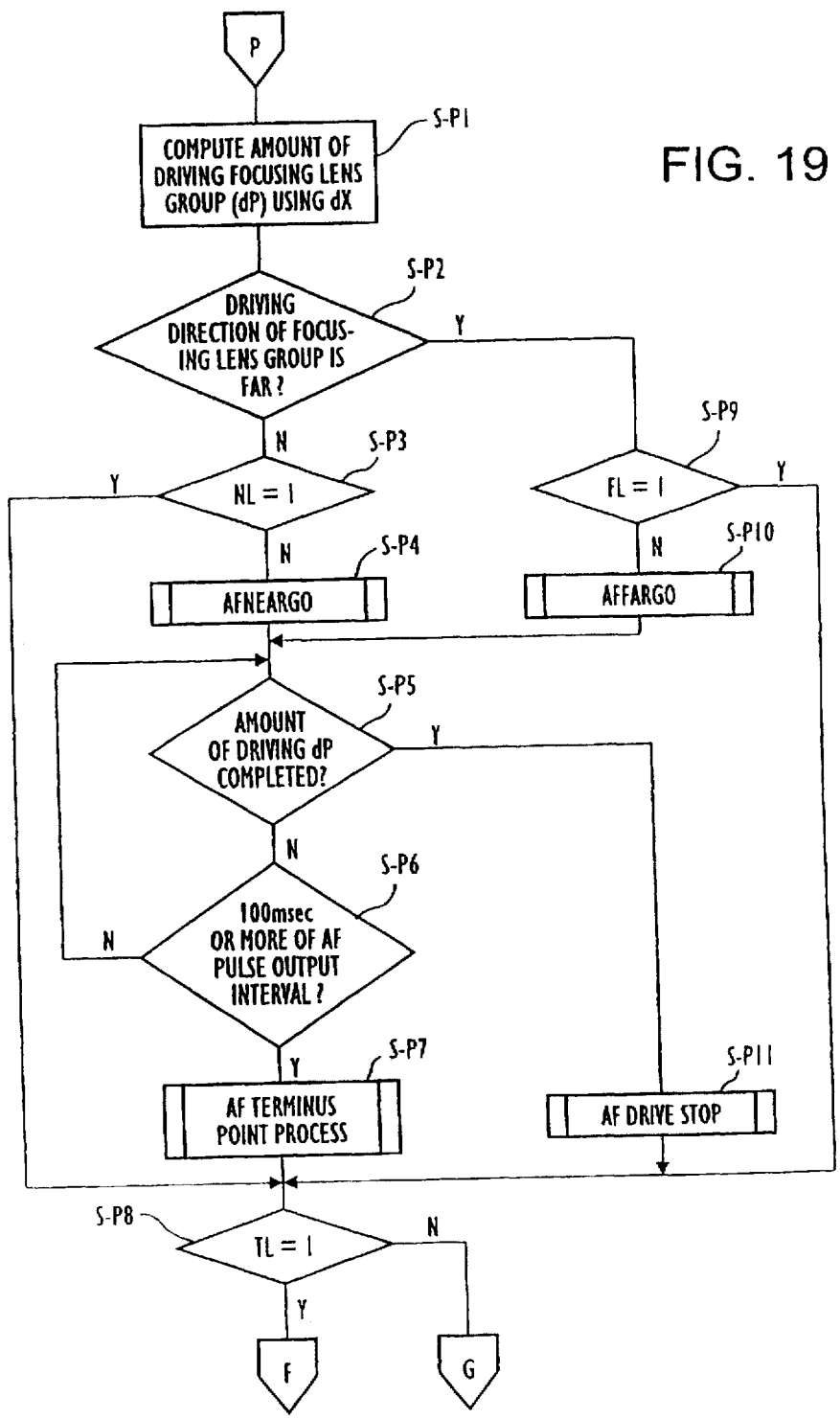

When the process advances to steps S-B25 and S-B26, based on the determined condition in step S-B11, processing advances to step S-E1 in FIG. 18. When the image magnification constant control is not in the zoom range, since it is preferable that the zooming lens group be moved to the terminus point rather than being placed midway for further processing, the process advances to step S-E1.

Whether the zooming lens group is positioned at the wide terminus or tele terminus is determined using f1. When f1 is smaller than ft, f1 is smaller than fw. Thus, by determining the sizes of f1 and ft only, the size of f1 and fw can be determined at the same time, rather than having to determine the sizes of f1 and ft and then f1 and fw.

Thus, the process determines whether f1 is equal to or larger than ft in step S-E1. When f1 is equal to or larger than ft, the zooming lens group will be positioned on the tele terminus side. Thus, the determined condition is YES and the process advances to step S-E2. When f1 is smaller than ft, the zooming lens group will be positioned on the wide terminus side. Thus, the determined condition is NO and the process advances to step S-E13.

The process determines whether flag TL, (representing whether the tele terminus of the zooming lens group is being detected) has been set to 1 (terminus point detection) in step S-E2. When the terminus point has been detected, the determined condition is YES and the process advances to step S-E7. When the determined condition is NO, the process advances to step S-E3. The process drives the zooming lens group in the tele direction, as shown in FIG. 37, in step S-E3 and then advances to step S-E4, the process waits until the zooming lens group is positioned at the terminus point in step S-E4. When the determined condition is NO (less than 100 msec), the process enters a loop until the determined condition becomes YES after the zooming lens group is detected at the terminus point. When the determined condition is YES (100 msec or more), the process advances to step S-E5 to perform a ZOOMSTOP subroutine shown in FIG. 42. The process stops driving the zooming lens group in step S-E5 and then advances to step S-E6. The process sets flag TL (representing whether the tele terminus of the zooming lens group is being detected) to 1 in step S-E6 before advancing to step S-E7.

When the process advances from step S-E2 or S-E6 to step S-E7, it computes the amount of defocusing of the focusing lens group, dx, and then advances to step S-E8 to determine whether the contrast of the subject is LOW. When the contrast is LOW, the determined condition is YES and the process enters a loop until the proper contrast is present. When the proper contrast is present, the determined condition is NO and the process advances to step S-E9. The process computes the amount of advancing of the focusing lens group, $X_0$, in step S-E9 and advances to step S-E10. The process computes $Xf = ft \cdot m_0$ in step S-E10 and then advances to seep S-E11.

In step S-E11, the process determines whether or not the subject is in the focal length of the image magnification $m_0$ obtained last time using the determination of whether $dx+x_0$ is larger than $x_f$ obtained in step S-E10. When the process determines that the subject is in the focal length, the determined condition is YES and the process advances to step S-E12 to replace $f_0$ with ft and then advance to step S-B9 in FIG. 15 so as to start driving the focusing lens group. When the process determines that the subject is far from the focal length in step S-E11, the determined condition is NO and the process advances to seep S-P1, shown in FIG. 19.

When the process determines that f1 is smaller than ft and that the focusing lens group is positioned on the WE terminus side in step S-E1, the determined condition is NO, and the process advances to step S-E13 to determine whether flag WL (representing whether the wide terminus of the zooming lens group is detected) has been set to 1 (terminus point detection). When the terminus point has been detected, the determined condition is YES and the process advances to step S-E18. When the determined condition is NO, the process advances to step S-E14, which executes a subroutine to drive the zooming lens group in the wide direction, as shown in FIG. 38, and then advances to step S-E15. The process waits until the zooming lens group detects the terminus point in step S-E15. When the determined condition is NO (less than 100 msec), the process enters a loop until the zooming lens group is positioned at the terminus point and the determined condition becomes YES. When the determined condition is YES (100 msec or more), the process advances to step S-E16 to perform the ZOOMSTOP subroutine shown in FIG. 42, which stops driving the zooming lens group before advancing to step S-E17 to set flag WL (representing whether the wide terminus of the zooming lens group is being detected) to 1 before advancing to step S-E18.

When the process advances from step S-E13 or S-E17 to step S-E18, it computes the amount of defocusing of the focusing lens group, dx, in step S-E7 and then advances to step S-E19. The process determines whether the contrast of the subject is LOW in step S-E19. When the contrast is LOW, the determined condition is YES and the process enters a loop until the proper contrast is present. When the proper contrast is present, the determined condition is NO and the process advances to step S-E20. The process computes the amount of advancing of the focusing lens group, $x_0$, in step S-E20 and then advances to step S-E21 to compute $x_n + fw \cdot m_0$ before advancing to step S-E22.

The process determines whether the subject is in the focal length of the image magnification $m_0$ that was obtained last time using the determination of whether $dx+x_0$ is smaller than $x_n$ in step S-E22. When the subject is in the focal length in step S-E22, the determined condition is YES and the process advances to step S-E23 to replace $f_0$ with fw. The process then advances to step S-B9 in FIG. 15 so as to start driving the focusing lens group. When the process determines that the subject is nearer to the focal length, the determined condition is NO and the process advances to step S-P1, shown in FIG. 19.

The process computes the amount of driving of the focusing lens group, dp, using the amount of defocusing, dx, in step S-P1 before advancing to step S-P2 to determine whether the driving direction of the focusing lens group is far. When the determined condition is NO (near direction), the process advances to step S-P3. When the determined condition is YES (far direction), the process advances to step S-P9. The process determines whether flag NL (representing whether the near terminus of the focusing lens group is being detected) has been set to 1 in step S-P3. When the terminus point has been detected, the determined condition is YES and the process advances to step S-P8. When the determined condition is NO, the process advances to step S-P4. The process determines whether flag FL (representing whether the far terminus of the focusing lens group is being detected) has been set to 1 in step S-P9. When the terminus point has been detected, the determined condition is YES and the process advances to step S-P10. When the determined condition in step S-P3 is NO, the process advances to step S-P4. The process drives the focusing lens group in the near direction, as shown in FIG. 36, in step S-P4. The process drives the focusing lens grouping the far direction, as shown in FIG. 35, in step S-P10 and then advances to step S-P5.

The process determines whether the focusing lens group has been driven for the amount of driving dp. When the focusing lens group has been driven for the amount of driving, the determined condition is YES and the process advances to step S-P11 to perform the AF drive stop subroutine, shown in FIG. 22, before advancing to step S-P8. When the determined condition is NO, the process advances to step S-P6 to determine whether the interval of pulses, which are outputted from the AF pulser 48, is at least 100 msec. When the determined condition is NO (less than 100 msec), the process returns back to step S-P5 so as to enter a loop. When the determined condition is YES (100 msec or more), the process advances to step S-P7 so as to perform the AF terminus point process subroutine shown in FIG. 23. The subroutine then advances to step S-P8 to determine whether flag TL (representing whether the tele terminus of the zooming lens group is being detected) has been set to 1. When the terminus point has been detected, the determined condition is YES and the process advances to step S -E7, shown in FIG. 18. When the determined condition is NO, the process advances to step S-E18, shown in FIG. 18, so as to repeat the same operation.

Timer Interrupt Process

Figure 24:
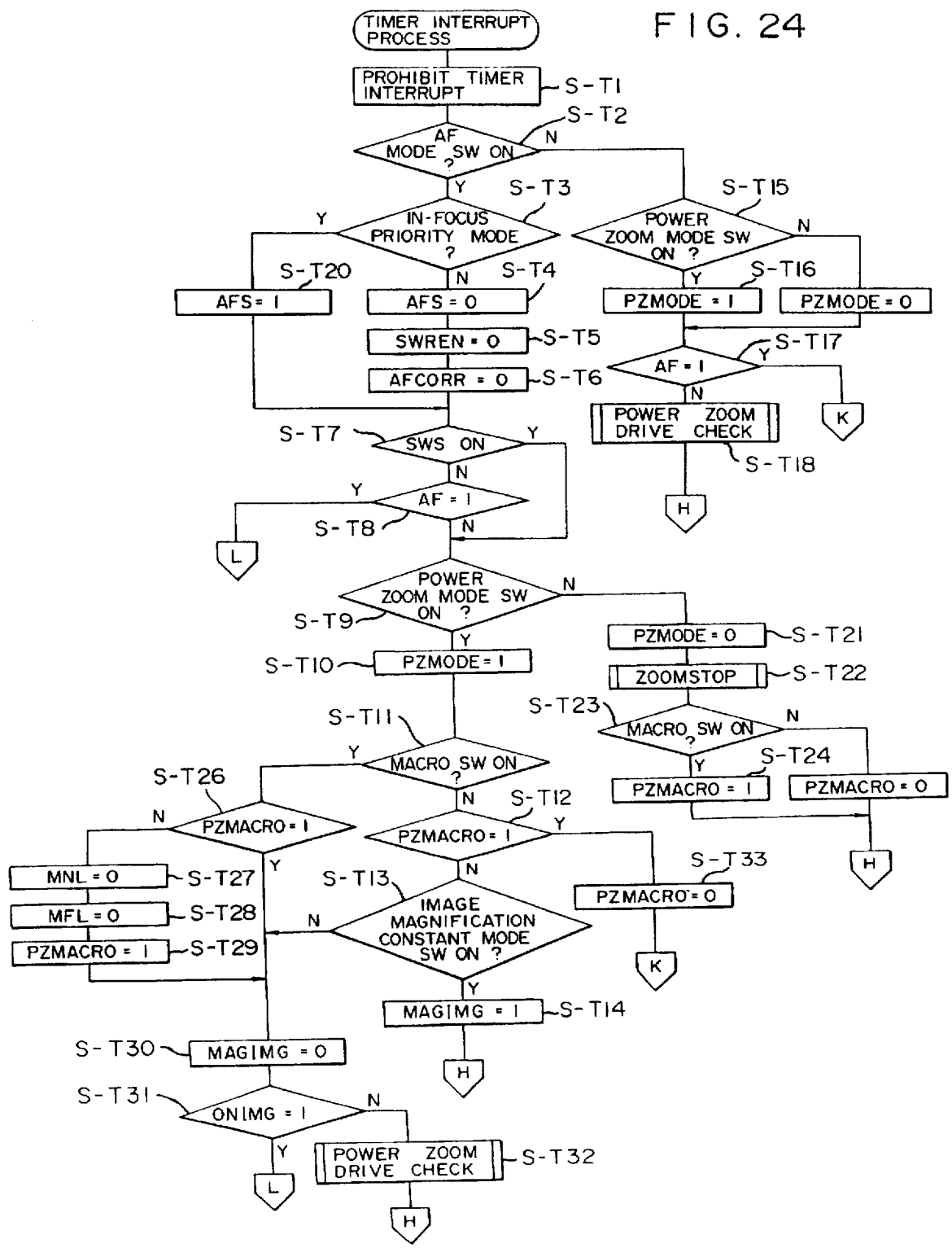

This process prohibits a timer interrupt in step S-T1, shown in FIG. 24, and then advances to step S-T2. The process turns ON the AF mode switch (switch SWAF A/M) and determines whether the AF mode takes place. When the determined condition is YES (AF mode), the process advances to step S-T3. When the determined condition is NO (manual mode), the process advances to step S-T15 to determine whether the power zoom mode switch SWPZ has been turned ON. When the switch has been turned ON, the determined condition is YES and the process advances to step S-T16. When the switch has been turned OFF, the determined condition is NO and the process advances to step S-T19. The process sets flag PZMODE (representing whether the zooming lens group can be driven by the power zoom mechanism) to 1 (drive enable) in step S-T16 and sets flag PZMODE to 0 (drive disable) in step S-T19. After that, processing advances to step S-T17 to determine whether flag AF (representing whether the autofocus state takes place) has been set to 1. (autofocus state) in step S-T17. When the determined condition is YES, the process advances to step S-K1 in FIG. 30. When the determined condition is NO, the process advances to step S-T18, wherein a subroutine checks whether the power zoom is driven shown in FIG. 28) before advancing to step S-H1 in FIG. 25.

The process determines whether the release switch SWR has been turned ON in step S-H1. When the switch has been turned ON, the determined condition is YES and the process advances to step S-H2. When the switch has not been turned ON, the determined condition is NO and the process advances to step S-H12 to execute a lens sheltering check subroutine, shown in FIG. 32, before advancing to step S-H13, in which a power zoom drive check subroutine, shown in FIG. 28, takes place. Processing then advances to step S-H14 to permit a timer interrupt so as to complete the timer interrupt process.

When the process determines that the release switch SWR has been turned ON in step S-H1, processing advances to step S-H2, wherein a determination is made as to whether flag MF (representing whether the manual focus state takes place) has been set to 1 (manual focusing state). When the manual focus state takes place, the determined condition is YES and the process advances to step S-H5. When the determined condition is NO, the process advances to step S-H3. The process determines whether the in-focus priority/ release priority selection switch SWF S/C has been placed in the in-focus priority (AFS) position or not in step S-H3. When the switch has been placed in the in-focus priority (AFS) position, the determined condition is YES and the process advances to step S-H4. When the switch has been placed in the release priority (AFC) position, the determined condition is NO and the process advances to step S-H11. The process then determines whether flag ONIMG (representing whether the image magnification constant control operation takes place) has been set to 1. (image magnification constant state) in step S-H11. When the image magnification constant state takes place, the determined condition is YES and the process advances to step S-H4. When the determined condition is NO, the process advances to step S-H5. The process determines whether flag SWREN (representing whether the release operation is permitted) has been set to 1. (release permission) in step S-H4. When the determined condition is YES, the process advances to step S-H5. When the determined condition is NO, the process advances to step S-H12 to S-H14 to complete the timer interrupt process.

In step S-H5, the process determines whether flag AFGO (representing whether the focusing lens group is being driven) has been set to 1. (drive state). When the focusing lens group is being driven, the determined condition is YES and the process advances to step S-H6. When the determined condition is NO, the process advances to step S-H10. The AFSTOP subroutine, shown in FIG. 41, takes place in step S-H6 so as to stop driving the focusing lens group before advancing to step S-H7 to compute the number of pulses being driven until the focusing lens group is stopped, dpx, using an output from the AF pulser 48. Processing then advances to step S-H8 wherein a determination is made as to whether flag AFDRVF (representing whether the focusing lens group is being driven in the far direction) has been set to 1 (far direction). When the direction is far the determined condition is YES and the process advances to step S-H15. When the determined condition is NO, the process advances to step S-H9. The process replaces $P_{inf}$ with $P_{inf}-dpx$ (in step S-H15) or replaces $P_{inf}$ with $P_{inf}+dpx$ (in step S-H9) before advancing to step S-H10 to execute the ZOOMSTOP subroutine, shown in FIG. 42, so as to stop driving the zooming lens group and so that the process can advance to step S-Q1, shown in FIG. 26, or step S-Q'1, shown in FIG. 27.

Release Process (1) Release Process Q'

Figure 26:
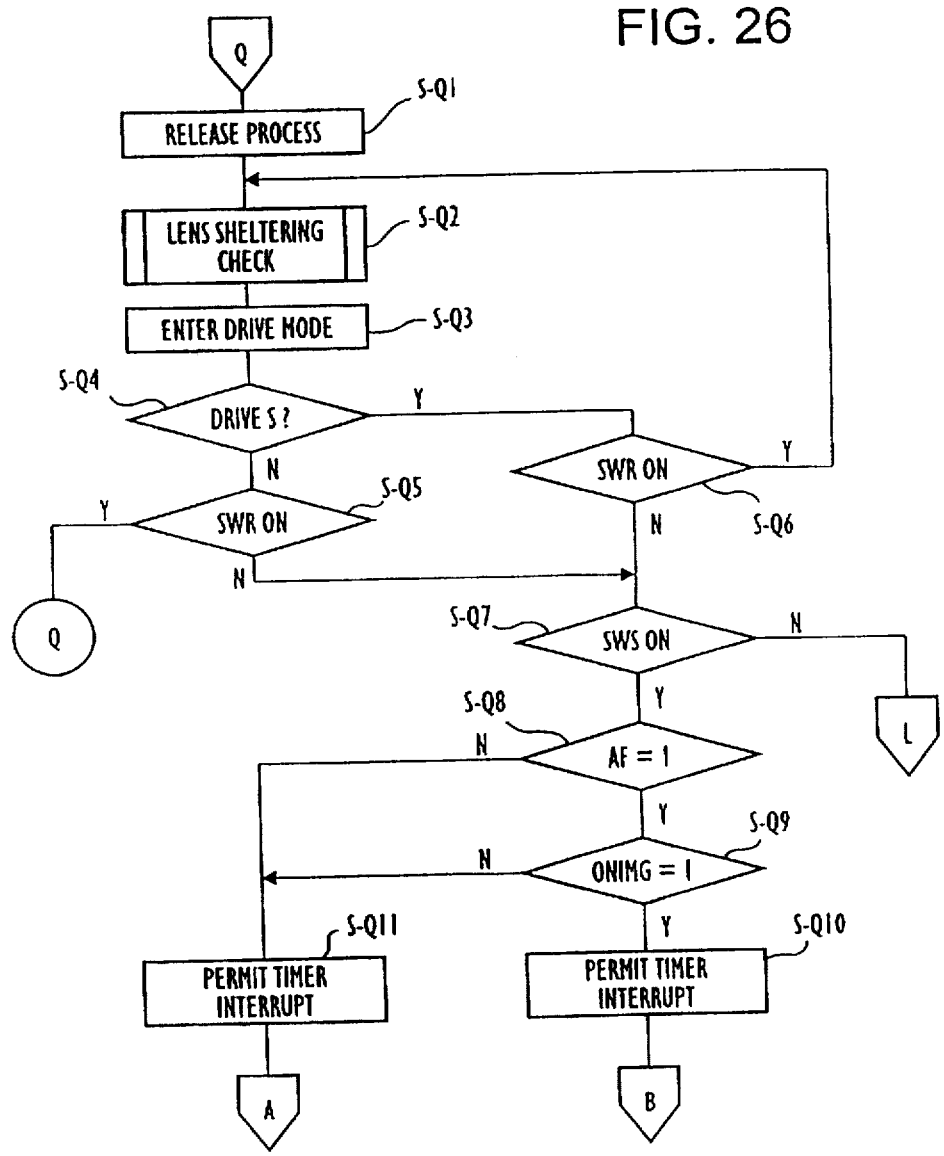

The release process, shown in FIG. 26, is continuously performed without driving the focusing lens group and zooming lens group when the release switch SWR has been turned ON in the continuous release mode (drive C).

When the process advances to step S-Q1, shown in FIG. 26, it performs a release process to release the shutter of the camera. A lens sheltering check subroutine, shown in FIG. 32, takes place in step S-Q2 before processing advances to step S-Q3. When the operator controls the up switch SWUP or down switch SWDOWN with the drive switch SWDRIVE, the process enters the drive C mode, namely continuous release mode (where the release process is continuously performed) or drive S mode, namely single release mode (where the release process is performed once) and then advances to step S-Q4 to determine whether the drive mode is drive S. When the drive mode is drive C mode, the determined condition is NO and the process advances to step S-Q5. When the drive mode is drive S, the determined condition is YES and the process advances to step S-Q6. The process determines whether the release switch SWR has been turned ON in step S-Q5. When the switch has been turned ON, the determined condition is YES and the process returns back to step S-Q1, so as to continuously perform the release process in a loop until the switch is turned OFF. When the switch has been turned OFF, the determined condition is NO and the process advances to step S-Q7, the process also determines whether the release switch SWR has been turned ON or OFF in step S-Q6. When the process has been turned ON, the determined condition is YES and processing returns back to step S-Q2 so as to enter a loop until the switch is turned OFF. When the switch has been turned OFF, the determined condition is NO and the process advances to step S-Q7 to determine whether the light metering switch SWS has been turned ON. When the switch has not been turned ON, the determined condition is NO and the process advances to step S-L1, in FIG. 31. When the switch has been turned ON, the determined condition is YES and the process advances to step S-Q8.

Figure 31:
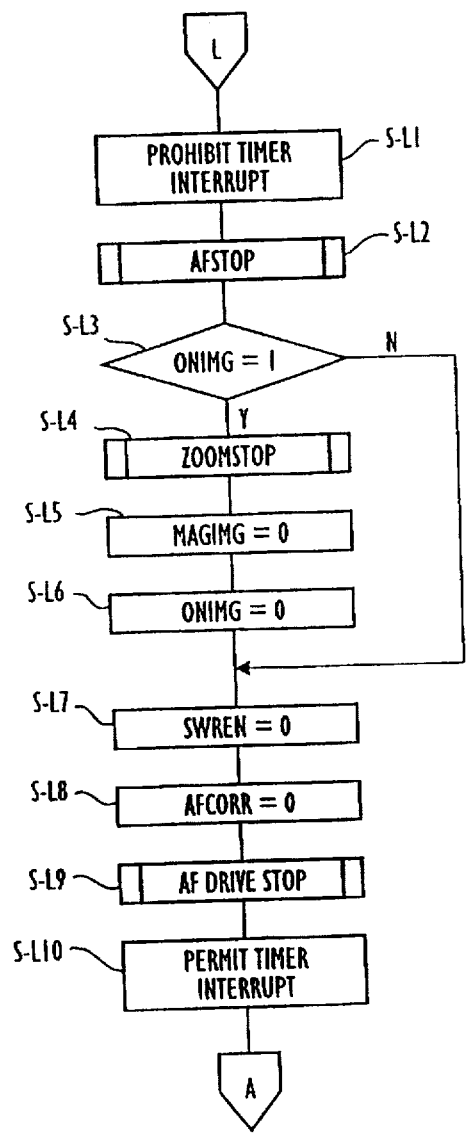
Figure 41:
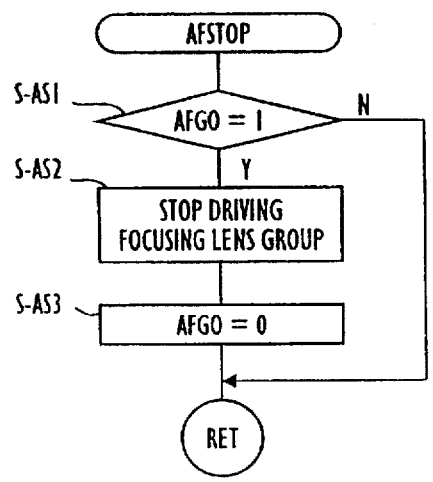

The process prohibits the timer interrupt in step S-L1, shown in FIG. 31, and then advances to S-L2 to execute the AFSTOP subroutine, shown in FIG. 41, to stop the focusing lens group before advancing to step S-L3 to determine whether flag ONIMG (representing whether the image magnification constant control operation takes place) has been set to 1 (image magnification constant control state). When the control operation does not take place, the determined condition is NO and the process advances to step S-L7. When the control operation takes place, the determined condition is YES and the process advances to step S-L4. The ZOOMSTOP subroutine, shown in FIG. 42, stops the zooming lens group and then advances to step S-L5 to set flag MAGIMG (representing whether to start the image magnification constant operation) to 0. In step S-L6, flag ONIMG (representing whether the image magnification constant control operation takes place) is set to 0. The process then sets flag SWREN (representing whether the release operation is permitted) to 0 (non-permission) and flag AFCORR (representing whether to compensate the focus position of the lens) to 0 in steps S-L5 and S-E8. The AF drive stop subroutine, shown in FIG. 22, takes place in step S-L9 and then the process advances to step S-L10 to permit the timer interrupt before returning back to step S2 in FIG. 14.

When the process advances from step S-Q7 to S-Q8 in FIG. 26, it determines whether flag AF (representing whether the autofocus state takes place) has been set to 1 (autofocus state). When the autofocus state takes place, the determined condition is YES and the process advances to step S-Q9 to determine whether flag ONIMG (representing whether the image magnification constant control operation takes place) has been set to 1. (image magnification consultant control state). When the control state does not take place, the determined condition is NO and the process advances to step S-Q11. Alternatively, when the determined condition in step S-Q8 is NO, the process advances to step S-Q11. When the control state in step S-Q9 takes place, the determined condition is YES and the process advances to step S-Q10. The process permits the timer interrupt in step S-Q10 and then returns back to step S-B1 in FIG. 15. The process also permits the timer interrupt in step S-Q11 before returning back to step S2 in FIG. 14.

(2) Release Process Q'

Figure 27:
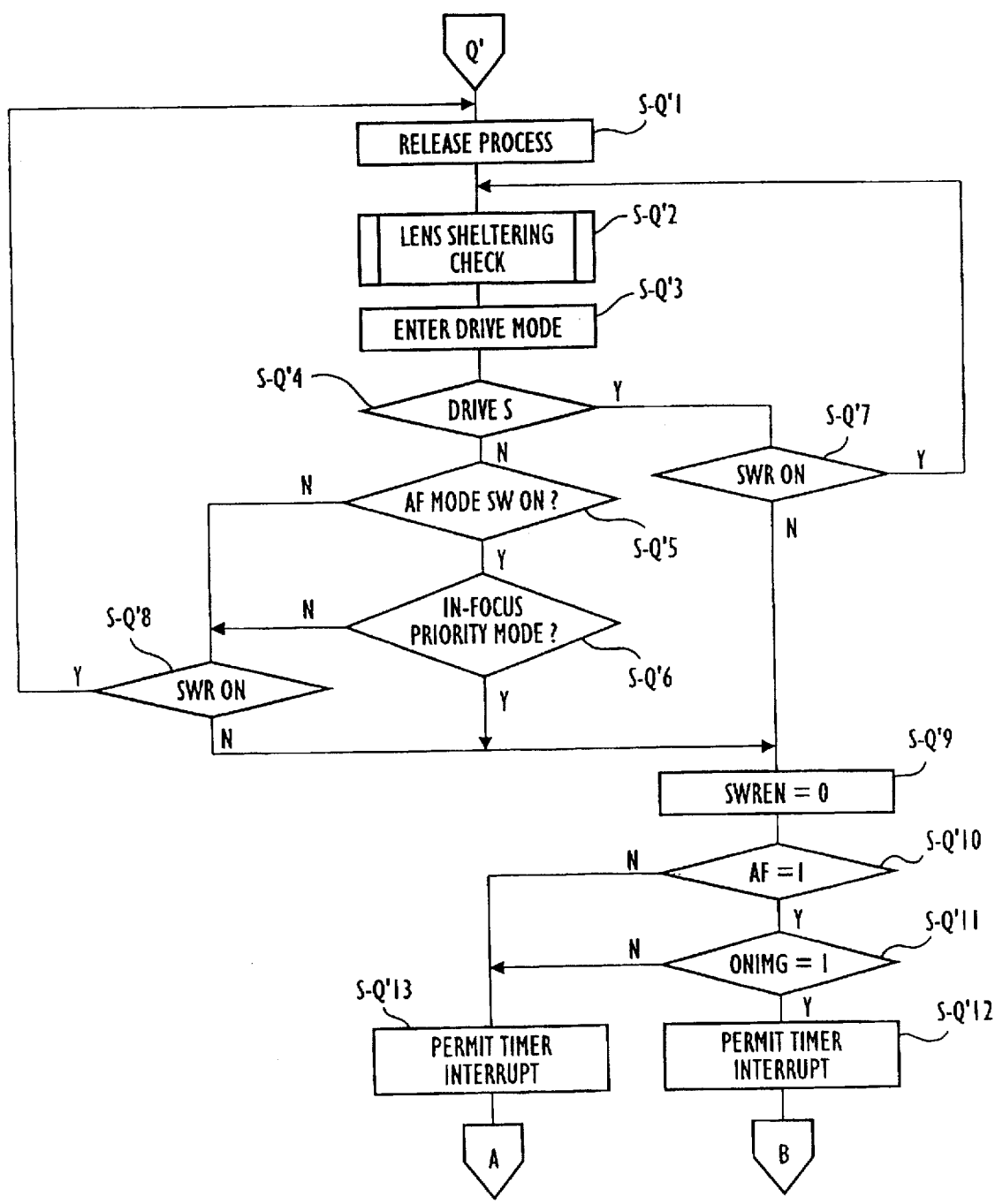

The release process Q' shown in FIG. 27 performs the release permission which is preceded by a repeated AF operation and image magnification constant control operation, regardless of whether the release switch SWR has been turned ON/OFF when the drive mode is in the continuous release mode (drive C) and the in-focus priority mode takes place. In other words, the processes in steps S-Q'5 and S-Q'6 perform the release operation after determining whether the AF mode and in-focus priority mode takes place.

Figure 32:
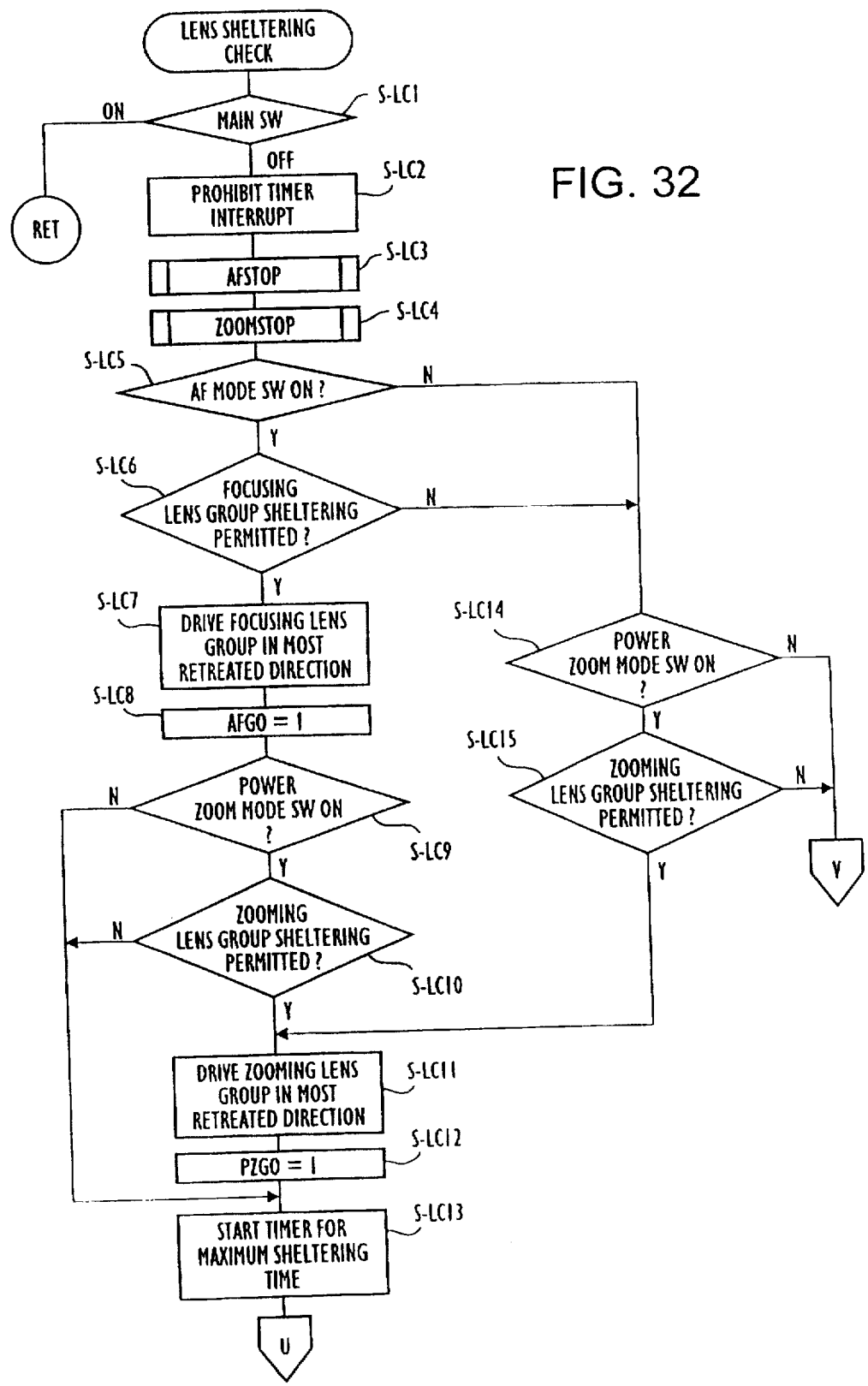
Figure 33:
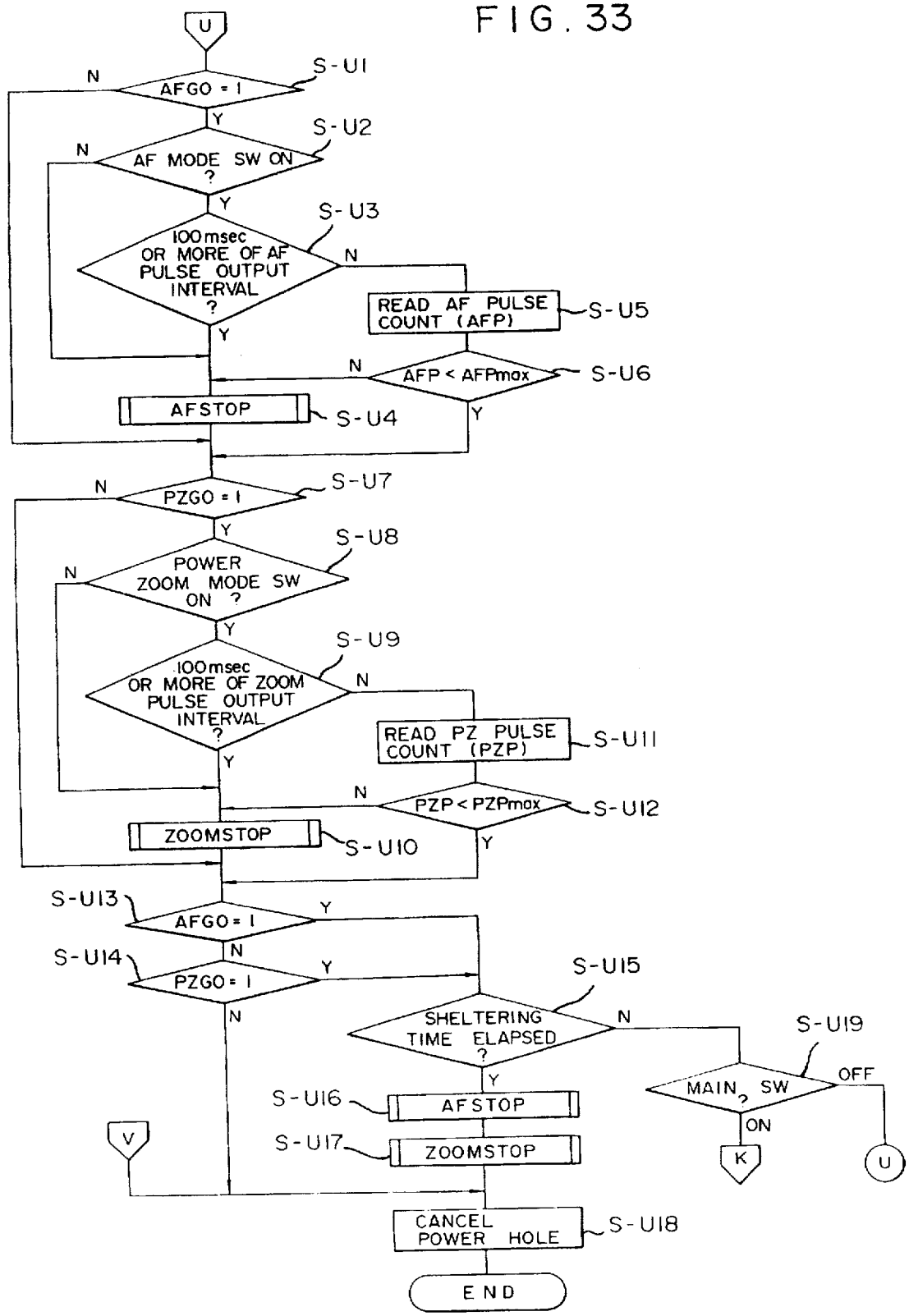
Figure 34:
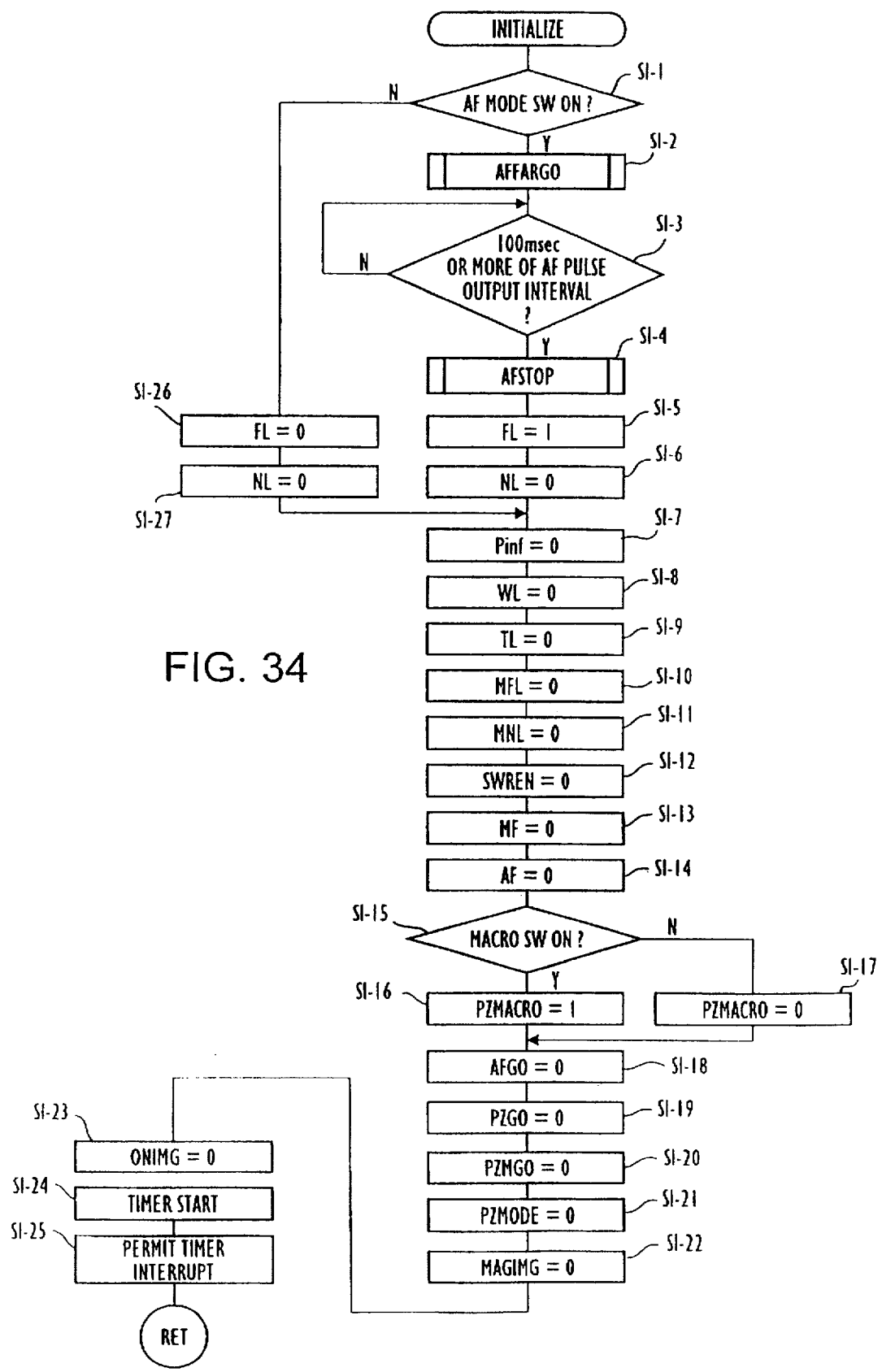

The release process in step S-Q'1 releases the shutter of the camera and then advances to step S-Q'2 to execute the lens sheltering check subroutine that is shown in FIG. 32. Processing then advances to step S-Q'3. When the operator controls the up switch SWUP or down switch SWDOWN with the drive switch SWDRIVE operated, the process enters the drive C mode, namely the continuous release mode (where the release process is continuously performed) or the drive S mode, namely the single release mode (where the release process is performed once) and then advances to step S-Q'4 to determine whether the drive mode is the drive S mode. When the drive mode is drive C mode, the determined condition is NO and the process advances to step S-Q'5. When the drive mode is the drive S mode, the determined condition is YES and the process advances to step S-Q'7.

The process determines whether the r-elease switch SWR has been turned ON in step S-Q'7. When the switch has been turned ON, the determined condition is YES and the process returns back to step S-Q'2 so as to enter a loop until the switch is turned OFF. When the switch has been turned OFF, the determined condition is NO and the process advances to step S-Q'9.

The process determines whether the AF mode switch (switch SWAF A/M) has been turned ON in step S-Q'5. When the switch has been turned ON, the determined condition is YES (AF mode) and the process advances to step S-Q'6. When the switch has been turned OFF, the determined condition is NO (manual) and the process advances to step S-Q'8. In step S-Q'6, the process determines whether the in-focus priority/release priority selection switch SWF S/C has been placed in the in-focus priority position (AFS). When the switch has been placed in the in-focus priority position, the determined condition is YES and the process advances to step S-Q'9. When the determined condition is NO, the process advances to step S-Q'8.

In step S-Q'8, the process determines whether the release switch SWR has been turned ON. When the switch has been turned ON, the determined condition is YES and the process returns back to step S-Q'1, so as to continuously perform the release process in a loop until the switch is turned OFF. When the switch has been turned OFF, the determined condition is NO and the process advances to step S-Q'9.

The process executed in step S-Q'9 sets flag SWREN (representing whether the release operation is permitted) to 0 and then advances to step S-Q'10 to determine whether flag AF (representing whether the autofocus state takes place) has been set to 1 (autofocus). When the autofocus state takes place the determined condition is YES and the process advances to step S-Q'11. However, when the determined condition is NO, the process advances to step S-Q'13. When processing advances from step S-Q'10 to S-Q'11, a determination is made as to whether flag ONIMG (representing whether the image magnification constant control operation takes place) has been set to 1 (image magnification constant control state). When the control state does take place, the determined condition is YES and the process advances to step S-Q'12. When the control state does not take place, the determined condition is NO and the process advances to step S-Q'13. The process permits the timer interrupt in step S-Q'12 and then returns back to step S-B1 in FIG. 15. The process permits the timer interrupt in S-Q'13 and then returns back to step S2 shown in FIG. 14.

Figure 25:
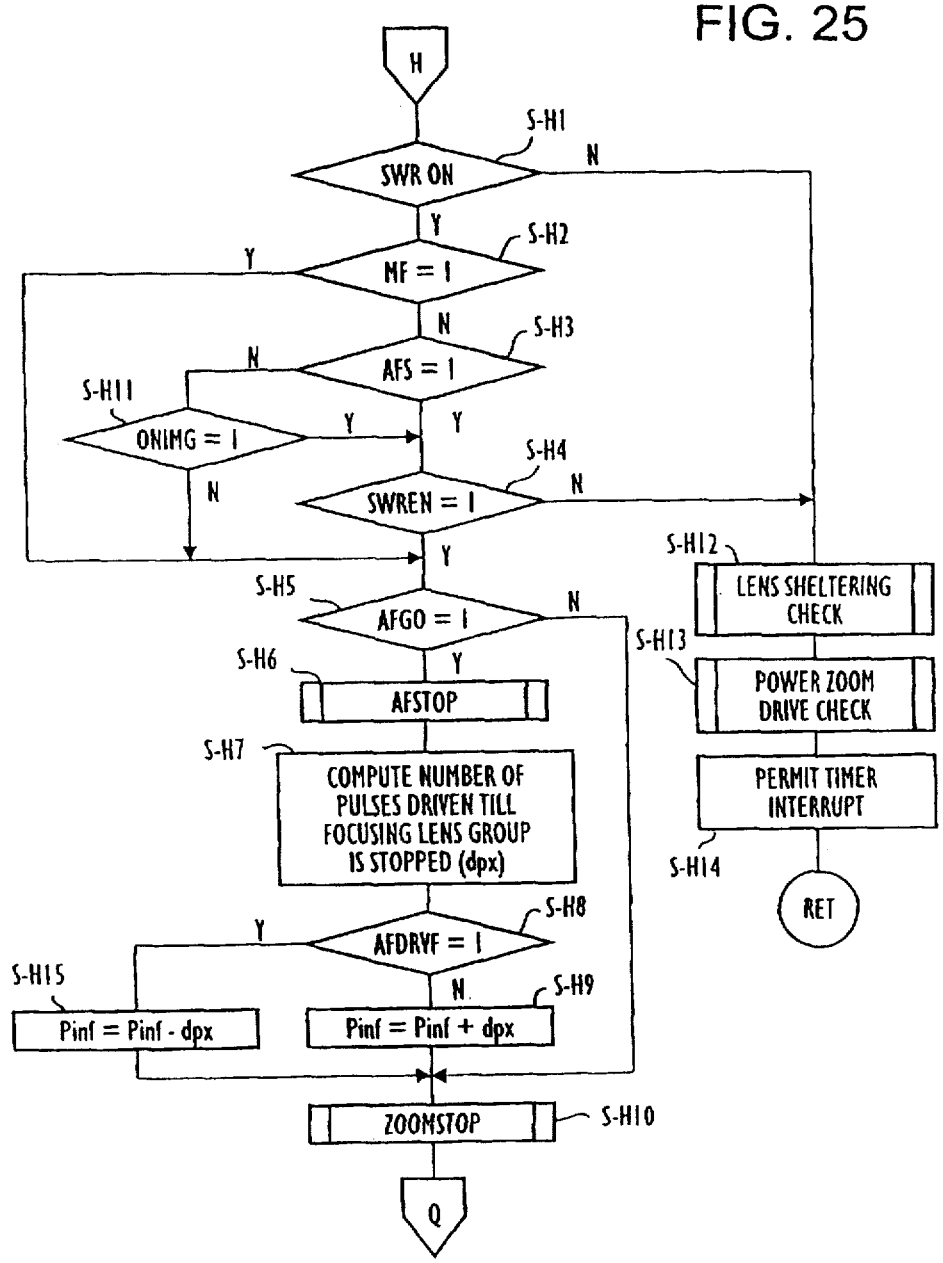

When the process determines that the manual mode takes place in step S-T2 in FIG. 24, the processes in steps S-T15 to S-T18, the process beginning at step S-K1 in FIG. 30, the process beginning at step S-H1 shown in FIG. 25, the process beginning at step S-Q1 in FIG. 26 or the process beginning at step S-Q'1 in FIG. 27, and the process beginning at step S-L1 in FIG. 31 take place. When the process determines that the AF mode switch (switch SWAF A/M) has been turned OFF in step S-T2, the determined condition is NO (AF) and the process advances to step S-T3.

The process determines whether the in-focus priority mode takes place in step S-T3. When the mode is the in-focus mode, the process advances to step S-T20 to set flag AFS (representing whether the in-focus priority mode takes place) to 1 (in-focus priority) before advancing to step S-T7. When the process determines that the mode is not the in-focus priority mode in S-T3, the determined condition is NO and the process advances to step S-T4 to set flag AFS (representing whether the in-focus priority mode takes place) to 0. Since the release operation can be performed at any time, the process sets flag SWREN representing whether the release operation is permitted) to 0 in step S-T5 so that the AF process can be performed even if the focal point is moved after the subject is focused. In other words, even if the subject is focused in the in-focus priority mode, the in-focus state cannot always be detected. When the present mode is changed to another mode, it is necessary to perform the AF process once again.

When the zooming lens group is driven and zoomed after the subject is focused, the focal point may be moved depending on the type of the photographic lens used, such as a variable focal lens. When the variable focal lens is zoomed by driving the zooming lens group, the focal point is moved. Thus, the focal point must be compensated. In the in-focus priority mode, it is necessary to set flag AFCORR to 1 and perform the AF operation once again. However, since the present mode is not the in-focus priority mode, the process sets flag AFCORR (representing whether to compensate the focus position of the lens) to 0 in step S-T6 and then advances to step S-T7.

The process determines whether the light metering switch SWS has been turned ON in step S-T7. When the switch has been turned ON, the determined condition is YES and the process advances to step S-T9, without checking the AF bit. When the switch is OFF, the determined condition is NO and the process advances to step S-T8 so as to check the AF bit. The process determines whether flag AF (representing whether the autofocus state takes place) has been set to 1 (autofocus state) in step S-T8. When the autofocus state takes place, tile determined condition is YES and the process advances to step S-L2 in FIG. 31. When the determined condition is NO, the process advances to step S-T9.

The process determines whether the power zoom switch SWPZ has been turned ON in step S-T9. When the switch has been turned OFF, the determined condition is NO and the process advances to step S-T21. When the switch has been turned ON, the determined condition is YES and the process advances to step S-T10 to set flag PZMODE (representing whether the zooming lens group can be driven by the power zoom mechanism) to 1 (drive state) before advancing to step S-T11. Alternatively, the process sets flag PZMODE to 0 in step S-T21 and then advances to step S-T22 to execute the ZOOMSTOP subroutine, shown in FIG. 42. Processing then advances to step S-T23.

Regardless of whether the zoom switch SWPZ has been turned ON or OFF, the zooming lens group may have been manually moved to the macro area. In addition, although the zooming lens group is driven and controlled regardless of whether it is positioned in the zoom area or macro area, the drive control method depends on the area where the zooming lens is positioned. Thus, the process determines whether the macro switch has been turned ON in steps S-T11 and S-T23.

When the process determined that the macro switch SWPZC has been turned ON in step S-T23, the determined condition is YES and the process advances to step S-T24 to set flag PZMACRO (representing whether the zooming lens group is positioned in the macro area by the power zoom mechanism) to 1 (macro area). When the switch has not been turned ON, the determined condition is NO and the process advances to step S-T25 to set flag PZMACRO to 0 (zoom area) in step S-T25, so as to perform the process beginning at step S-H1.

When the process determines that the macro switch has been turned ON in step S-T11, the determined condition is YES and the process advances to step S-T26. When the switch has not been turned ON, the determined condition is NO and the process advances to step S-T12. The process determines whether flag PZMACRO (representing whether the zooming lens group is positioned in the macro area by the power zoom mechanism) has been set to 1 (macro area) in step S-T26. When the zooming lens group has been positioned in the macro area, the determined condition is YES and the process advances to step S-T30. When the zooming lens group has not been positioned in the macro area, the determined condition is NO and the process advances to steps S-T27 to S-T29 to set flag MNL (representing whether the near terminus of the focusing lens group is being detected by driving the zoom ring in the macro area) and flag MFL (representing whether the far terminus of the focusing lens group is being detected by driving the zoom ring in the macro area) to 0 and flag PZMACRO (representing whether the zooming lens group is positioned in the macro area by the power zoom mechanism) to 1 (macro area) before advancing to step S-T30. Since the image magnification constant control operation cannot be performed in the macro area, the process sets flag MAGIMG (representing whether to start the image magnification constant operation, to 0 in step S-T30 and then advances to step S-T31 to determine whether flag ONIMG (representing whether the image magnification constant control operation takes place) has been set to 1 (control state). When the control operation is being performed, the determined condition is YES and the process advances to step S-L1 in FIG. 31 so as to stop the image magnification constant control operation. When the control operation is not being performed, the determined condition is NO and the process advances to step S-T32 to execute the power zoom drive check subroutine, shown in FIG. 28, before advancing to step S-H1 in FIG. 25 so as to perform the release process.

When the process advances from step S-T11 to step S-T12, the process determines whether flag PZMACRO (representing whether the zooming lens group is positioned in the macro area by the power zoom mechanism) has been set to 1 (macro area). When the zooming lens group has been positioned in the macro area, the determined condition is YES and the process advances to step S-T33. When the zooming lens group has not been positioned in the macro area, the determined condition is NO and the process advances to step S-T13. The process sets flag PZMACRO to 0 (zoom area, rather than macro area) in step S-T33 and then advances to step S-K1 in FIG. 30.

When the process advances from step S-T12 to step S-T13, the process determines whether the image magnification constant node switch SWPZC has been turned ON. When the switch has not been turned ON, the determined condition is NO and the process advances to steps S-T30 and S-T31, described above. After that, he process advances to step S-L1 in FIG. 31, so as to stop the image magnification constant control operation. When the switch has been turned ON, the determined condition is YES and the process advances to step S-T14 to set flag PZMACRO (representing whether the zooming lens group is positioned in the macro area by the power zoom mechanism) to 1 in step S-T14 and advances to step S-H1, in FIG. 25 so as to perform the release process.

Power Zoom Drive Check

Figure 28:
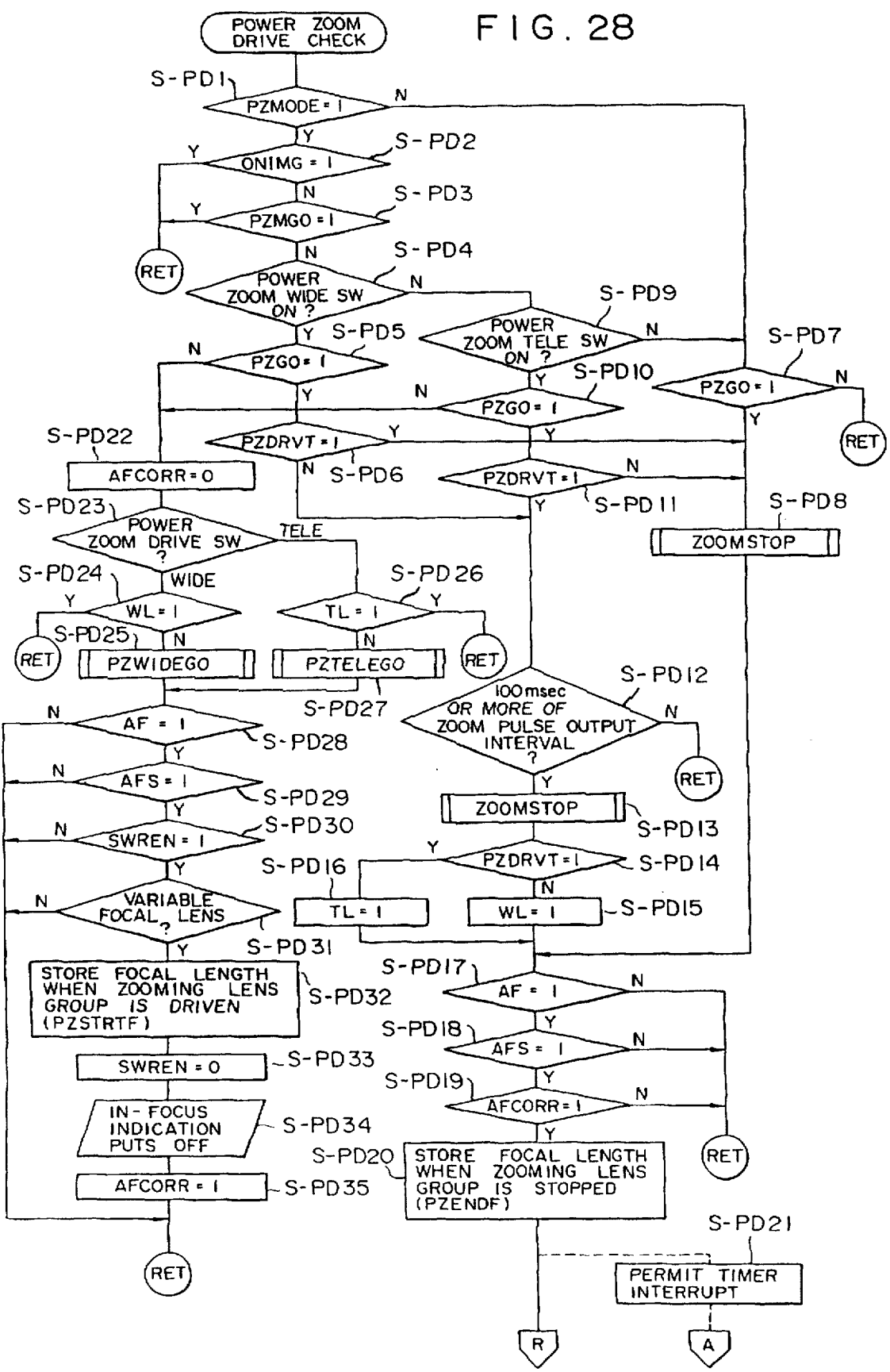
Figure 29:
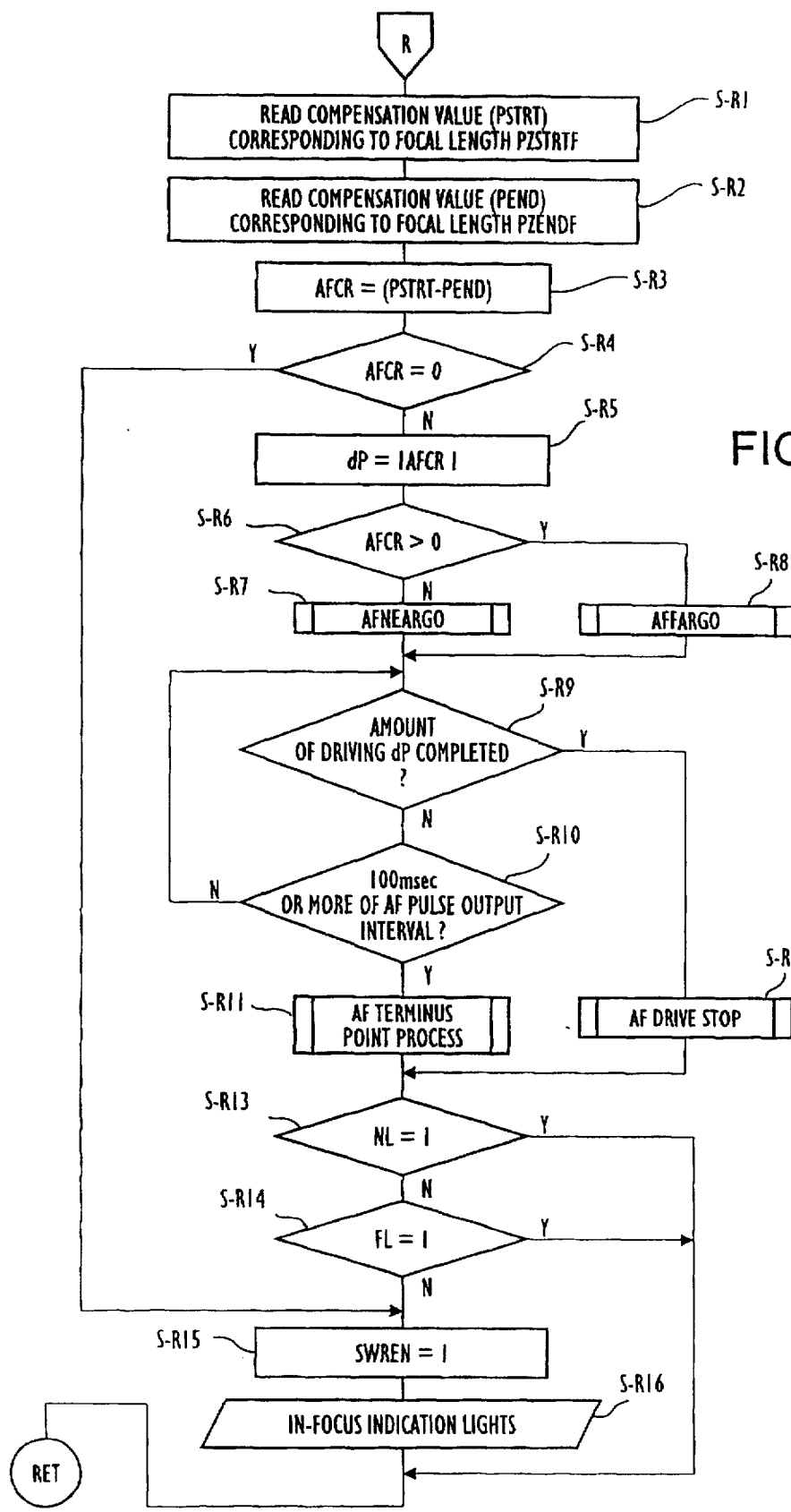

This process determines whether the power zoom mode switch SWPZ has been turned ON and flag PZMODE (representing whether the zooming lens group can be driven by the power zoom mechanism) has been set to 1 (drive enable) in step S-PD1 in FIG. 28. When the power zoom can be driven, the determined condition is YES and the process advances to step S-PD2. When the power zoom cannot be driven, the determined condition is NO and the process advances to step S-PD7. The process determines whether the zooming lens group is being driven by the power zoom mechanism, by checking to see if flag PZGO (representing whether the zooming lens group is being driven) has been set to 1 (drive state) in step S-PD7. When the zooming lens group is not being driven, the procress advances to a step following the power zoom drive check process. When the zooming lens group is being driven, the determined condition is YES and the process advances to step S-PD8 to execute the ZOOMSTOP subroutine shown in FIG. 42 to stop the zooming lens group, before advancing to step S-PD17.

When the process determines that flag PZMODE (representing whether the zooming lens group can be driven by the power zoom mechanism) has been set to 1 (drive enable) in step S-PD1, the determined condition is YES and the process advances to step S-PD2 to determine whether flag ONIMG (representing whether the image magnification constant control operation takes place) has been set to 1

(control state). When the control operation is being performed, the determined condition is YES and the process advances to a step following the power zoom drive check process. When the determined condition is NO, the process advances to step S-PD3. The process determines whether flag PZMGO (representing whether the zooming lens group is being driven by PZ motor M2 in the macro area) has been set to 1 (drive state) in step S-PD3. When the zooming lens group is being driven, the determined condition is YES and the process advances to a step following the power zoom drive check process. When the determined condition is NO, the process advances to step S-PD4.

The process determines whether the zooming switch SWPZW (for driving the zooming lens group in the wide direction) has been turned ON in step S-PD4. When the switch has been turned ON, the determined condition is YES and the process advances to step S-PD5. When the determined condition is NO, the process advances to step S-PD9 to determine whether the zoom switch SWPZT (for driving the zooming lens group in the tele direction) has been turned ON. When the switch has been turned ON, the determined condition is YES and the process advances to step S-PD10 when the determined condition is NO, the process advances to step S-PD7. The process determines whether flag PZGO (representing whether the zooming lens group is being driven) has been set to 1 (drive state) in step S-PD5. When the zooming lens group is not being driven, the determined condition is NO and the process advances to step S-PD22. When the zooming lens group is being driven, the determined condition is YES and the process advances to step S-PD6. The process determines whether flag PZGO has been set to 1 (drive state in seep S-PD10. When the lens group is not being driven, the determined condition is NO and the process advances to step S-PD22. When the lens group is being driven, the determined condition is YES and the process advances to step S-PD11.

When the zooming lens group is being moved to the tele side, while the zoom switch SWPZW for driving the zooming lens group in the wide direction has been turned ON and the zooming lens group is being driven, a contradiction occurs. Thus, the process determines whether flag PZDRVT (representing whether the zooming lens group is being driven on the tele side) has been set to 1 (being driven to the tele side) in step S-PD6. When the zooming lens is being driven on the tele side, a contradiction occurs. Thus, the determined condition is YES and the process advances to step S-PD8 so as to perform the ZOOMSTOP subroutine, which stops the zooming lens group.

In addition, when the zooming lens group is being moved on the wide side while the zoom switch SWPZT for driving the zooming lens group in the tele direction has been turned ON and the zooming lens group is being driven, a contradiction occurs. Thus, the process determines whether flag PZDRVT (representing whether the zooming lens group is being driven on the tele side) has been set to 1 (being driven on tele side) in step S-PD11. When the zooming lens group is being driven on the wide side, a contradiction occurs. In this case, the determined condition is NO and the process advances to step S-PD8 so as to execute the ZOOMSTOP subroutine, which stops the zooming lens group.

On the other hand, when the process determines that the zooming lens group is not being driven on the tele side in step S-PD6, no contradiction occurs. In this case, the determined condition is NO and the process advances to step S-PD12. Also, when the process determines that the zooming lens group is not being driven on the wide side in step S-PD11, namely the lens is being driven on the tele side, no contradiction occurs. In this case, the determined condition is YES and the process advances to step S-PD12. In step S-PD12, the process determines whether the interval of the pulses being output ted from the PZ pulser 49 is at least 100 msec. When the pulse interval is less than 100 msec, the determined condition is NO and the process advances to a step following the power zoom drive check process. When the output terminal is 100 msec or more, the determined condition is YES and the process advances to the ZOOM-STOP subroutine, shown in FIG. 42, which stops the zooming lens group. The process then advances to step S-PD14 to determine whether flag PZDRVT (representing whether the zooming lens group is being driven on the tele side) has been set to 1 (being driven on tele side). When the zooming lens group is being driven on the tele side, the determined condition is YES and the process advances to step S-PD16. When the zooming lens group is being driven on the wide side, rather than the tele side, the determined condition is NO and the process advances to step S-PD15, wherein flag WL (representing whether the wide terminus of the zooming lens group is being detected) is set to 1 and then advances to step S-PD17. The process sets flag TL (representing whether the tele terminus of the zooming lens group is being detected) to 1 in step S-PD16 and then also advances to step S-PD17.

When the process advances from steps S-PD5 and S-PD10 to step S-PD22, it set flag AFCORR (representing whether to compensate the focus position of the lens) to 0. The process then determines in which direction, tele or wide, the zooming lens group is being driven to by which zoom switch, SWPZT or SWPZW. When the zoom switch SWPZT has been turned ON, the process advances to step S-PD26. When the zoom switch SWPZW has been turned ON, the process advances to step S-PD24.

In step S-PD24, the process determines whether flag WL (representing whether the wide terminus of the zooming lens group is being detected) has been set to 1. In step S-PD26, the process determines whether flag TL (representing whether the tele terminus of the zooming lens group is being detected) has been set to 1. When the determined condition in step S-PD24 or step S-PD26 is YES, the process advances to a step following the power zoom drive check process. When the determined condition in step S-PD24 or step S-PD26 is NO, the process advances to steps S-PD25 and S-PD27, respectively.

The PZWIDEGO subroutine, shown in FIG. 38, drives the zooming lens group in the wide direction. The PZTELEGO subroutine, shown in FIG. 37, drives the zooming lens group in the tele direction. When each subroutine has completed its execution, processing advances to step S-PD28.

The process determines whether flag AF (representing whether the autofocus state takes place) has been set to 1 (autofocus state) in step S-PD28. When the autofocus state takes place, the determined condition is YES and control advances to step S-PD29 to determine whether the in-focus priority/release priority selection switch SWF S/C has been placed in the in-focus priority (AFS) position. When the switch has been placed in the in-focus priority position, the determined condition is YES and the process advances to step S-PD30 to determine whether flag SWREN (representing whether the release operation is permitted) has been set to 1 (release permission). When the release operation has been permitted, the process advances to step S-PD31 to determine whether the photographic lens 3 is a variable focal lens, based on the information stored in the lens ROM 43. When the photographic lens is a variable focal, the determined condition is YES and the process advances to step S-PD32. When the determined condition in steps S-PD28 to S-PD31 is NO, the process advances to a step following the power zoom drive check process.

When the process advances from step S-PD31 to step S-PD32, it stores the focal length PZSTARTF at which the zooming lens group is driven in step S-PD32 and advances to step S-PD33 to set flag SWREN (representing whether the release operation is permitted) to 0 (non-release permission) and advances to step S-PD35 to set flag AFCORR (representing whether to compensate the focus position of the lens) to 1 after turning OFF the in-focus indication in step S-PD34. Processing then advances to a step following the power zoom drive check process.

When the process advances from step S-PD8, step S-PD15 or step S-PD16 to step S-PD17 a determination is made as to whether flag AF (representing whether the autofocus state takes place) has been set to 1 (autofocus state). When the autofocus state takes place, the determined condition is YES and the process advances to step S-PD18 to determine whether the in-focus priority/release priority selection switch SWF S/C has been placed in the in-focus priority (AFS) position. When the in focus priority mode takes place, the determined condition is YES and the process advances to step S-PD19 to determine whether flag AFCORR (representing whether to compensate the focus position of the lens) has been set to 1. When the determined condition is YES, the process advances to step S-PD20. The process stores the focus length PZENDF, at which the zooming lens group is stopped, in Step S-PD20 and advances to step S-R1 in FIG. 29, or alternatively, to step S2 in FIG. 14. When the determined condition in steps S-P17 to S-P19 is NO, the process advances to a step following the power zoom drive check process.

The process reads a compensation value PSTRT corresponding to the focal length PZSTART at which the zooming lens group is driven from the lens ROM 43 in step S-R1. In step S-R2, the process reads a compensation value PEND, corresponding to the focal length PZENDF at which the zooming lens group is stopped, from the lens ROM 43 and advances to step S-R3. The compensation value is the amount of deviation of the focal length caused by the zooming lens group being driven when a variable focal lens is used as the photographic lens. The amount of deviation (compensation value) is listed in Table 2.

TABLE 2

| Focal Length | Compensation Pulse (Compensation Value n) |
|---|---|
| 70 | $n_1$ |
| 79 | $n_2$ |
| 89 | $n_3$ |
| 101 | $n_4$ |
| 114 | $n_5$ |
| 129 | $n_6$ |
| 146 | $n_7$ |
| 165 | $n_8$ |
| 165 | $n_9$ |
| 186 | $n_{10}$ |
| 210 | $n_{11}$ |

The compensation pulses (compensation value n) can be changed by lens designing. In addition, the compensation pulses are also changed depending on which of $n_1$ to $n_{11}$ the standard value 0 is based. When the process advances from step S-R2 to step S-R3, it computes a value AFCR, subtracting the compensation value PEND from the compensation value PSTRT so as to observe how much the compensation value PSTRT, at which the zooming lens group is driven, deviates from the compensation value PEND at which the zooming lens group is stopped. The process then advances to step S-R4 to determine whether the result of the subtraction is 0. When the result is 0, the subject is focused, the determined condition is YES and the process advances to step S-R15. When the result is not 0, the subject is not focused, and the process advances to step S-R5. The process serfs flag SWREN (representing whether the release operation is permitted) to 1 in step S-R15. The process advances to step S-R16, turns ON the in-focus indication and advances to a step following the power zoom drive check process.

When the process determines that the result of the subtraction is not 0 in step S-R4 and it has advanced to step S-R5, the process replaces the amount of driving of the focusing lens group, dp, with the absolute result of the subtraction of AFCR, in step S-R5. In this car, e, since the amount of driving is an absolute value, assuming that dp=|AFCR|, the process advances to step S-R6 to determine whether the result of the subtraction, AFCR, is positive or negative. When the result is positive, the determined condition is YES and the process advances to step S-R8. When the result is negative, the process advances to step S-R7. Subroutine AFNEARGO, shown in FIG. 36, drives the focusing lens group to the near side in step S-R7, while the subroutine AFFARGO, shown in FIG. 35, drives the focusing lens group to the far terminus side in step S-R8. Both subroutines advance to step S-R9 when they have completed their routine.

The process determines whether the focusing lens group has been driven for the amount of driving, dp, in step S-R9. When the focusing lens group has not been completely driven, the determined condition is NO and the process advances to step S-R10. When the determined result is YES, the process advances to step S-R12. In step S-R10, the process determines whether the interval of the pulses being outputted from the AF pulser 48 is at least 100 msec. When the pulse interval is less than 100 reset, the determined condition is NO and the process returns back to step S-R9 so as to enter a loop. When the process determines that the pulse interval exceeds 100 msec in step S-R10, the process advances to step S-R11 to execute the terminus point process subroutine, shown in FIG. 23. The AF drive stop subroutine, shown in FIG. 22, takes place when processing goes from step S-R9 to step S-R12. Then the process advances to step S-R13.

The process determines whether flag NL (representing whether the near terminus of the focusing lens group is being detected) has been set to 1 in step S-R13. When the determined condition is NO, the process advances to step S-R14 to determine whether flag FL (representing whether the far terminus of the focusing lens group is being detected) has been set to 1. When the determined condition is NO, the process advances to step S-R15 to set flag SWREN (representing whether the release operation is permitted) to 1 before advancing to step S-R16 to turn ON the in-focus indication. Processing then advances to a step following the power zoom drive check process. When the determined condition either in step S-R13 or step S-R14 is YES, steps S-R15 and S-R16 are skipped. Instead, processing advances to a step following the power zoom drive check process.

Lens Sheltering Check

This process determines whether the main switch, namely the lock switch SWLOCK, has been turned ON in step S-LC1, shown in FIG. 32. When the switch has been turned ON, the determined condition is YES and the process advances to a step following the power zoom drive check. When the determined condition is NO, the process prohibits the timer interrupt (step S-LC2) and then advances to step S-LC3 to execute the AFSTOP subroutine, shown in FIG. 41, so as to stop the focusing lens group. In step S-LC4, the ZOOMSTOP subroutine, shown in FIG. 42, takes place to stop the zooming lens group. Thereafter, the process determines whether the AF mode switch (switch SWAF A/M) has been turned ON in step S-LC5. When the switch has been turned ON, namely the AF mode takes place, the determined condition is YES and the process advances to step S-LC6. When the determined condition is NO (manual), the process advances to step S-LC14. The process determines whether the focusing lens group is of a shelter type in accordance with the information stored in the lens ROM 43 in step S-LC6, When the focusing lens group is of the shelter type, the determined condition is YES and the process advances to step S-LC7. When the determined condition is NO, the process advances to step S-LC14.

The process determines whether the power zoom switch SWPZ has been turned ON in step S-LC14. When the switch has been turned ON, the determined condition is YES and the process advances to step S-LC15. The process determines whether the zooming lens group is of the shelter type in accordance with the information stored in the lens ROM 43 in step S-LC15. When the zooming lens group is of the shelter type, the determined condition is YES and the process advances to step S-LC11. When the process determines that the power zoom switch SWPZ has been turned OFF in step S-LC14 or that the zooming lens group is not of the shelter type in step S-LC15, the determined condition is NO and the process advances to step S-U18. This cancels the power hold operation.

When the process advances from step S-LC6 to step S-LC7, it drives the focusing lens group in a direction where it can be retreated in step S-LC7 and advances in step S-LC8. The process then sets flag AFGO (representing whether the focusing lens group is being driven) to 1 in step S-LC8. The process then determines whether the power zoom switch SWPZ has been turned ON in step S-LC9. When the switch has been turned ON, the determined condition is YES and the process advances to step S-LC10 to determine whether the zooming lens group is of the shelter type, in accordance with the information stored in the lens ROM 43. When the zooming lens is of the shelter type, the determined condition is YES and the process advances to step S-LC11 to drive the zooming lens group in a direction where it is retreated in step S-LC11. In step S-LC12, flag PZGO (representing whether the zooming lens group is being driven) is set to 1 before the process advances to step S-LC13.

When the process determines that the power zoom switch SWPZ has been turned OFF in step S-LC9 or that the zooming lens group is not of the shelter type in step S-LC10, the determined condition is NO and the process advances to step S-LC13. When the process advances from step S-LC12, step S-LC9 or step S-LC10 to seep S-LC13, the process activates a sheltering timer for the lens, the value of which has been stored in the lens ROM 43, and then advances to step S-U1 in FIG. 33.

In step S-U1, the process determines whether flag AFGO (representing whether the focusing lens group is being driven) has been set to 1 (drive state). When the focusing lens group is not being driven, the determined condition is NO and the process advances to step S-U7. When the focusing lens group is being driven, the determined condition is YES and the process advances to step S-U2. The process determines whether the AF mode switch (switch SWAF A/M) has been turned ON in step S-U2. When the switch has been turned ON and the AP mode takes place, the determined condition is YES and the process advances to step S-U3. When the determined condition is NO (manual mode), the process advances to step S-U4. The process determines whether the interval of the pulses being outputted from the AF pulser 48 is at least 100 msec in step S-U3. When the pulse interval is less than 100 msec, the determined condition is NO and the process advances to step S-U5. When the pulse interval is 100 msec or more, the determined condition is YES and the process advances to step S-U4.

When the process advances from step S-U3 to step S-U5, it counts the pulse count value AFP, which is the number of pulses being outputted from the AF pulser 48 and then advances to step S-U6 to determine whether the pulse count value AFP is smaller than the maximum value of driving the focusing lens group, AFPmax. When the pulse count value AFP is smaller than AFPmax, the determined condition is YES and the process advances to step S-U7. When AFP is larger than AFPmax, the determined condition is NO and the process advances to execute the AFSTOP subroutine, shown in FIG. 41, to stop the focusing Lens group, because, if the pulses which are outputted from the AF pulser 48 are continuously outputted, even if they exceed AFPmax, the battery power would be quickly consumed. Thus, it is necessary to stop the focusing lens group.

Next, the process determines whether flag PZGO (representing whether the zooming lens group is being driven) has been set to 1 (drive state) in step S-U7. When the zooming lens group is not being driven, the determined condition is NO and the process advances to step S-U13. When the zooming lens group is being driven, the determined condition is YES and the process advances to step S-U8. The process then determines whether the zooming switch SWPZ has been turned ON in step S-U8. When the switch has been turned ON, the determined condition is YES and the process advances to step S-U9. When the determined condition is NO, the process advances to seep S-U10. In step S-U9, the process determines whether the interval of the pulses being outputted from the PZ pulser 49 is at least 100 msec. When the pulse interval is less than 100 msec, the determined condition is NO and the process advances to step S-U11. When the interval exceeds 100 msec, the process advances to step S-U10.

When the process advances from step S-U9 to S-U11, it counts a pulse count value, PZP, of pulses being outputted from the PZ pulser 49 and then advances to step S-U12 to determine whether the pulse count value PZP is larger than the maximum value for driving the zooming lens group, PZPmax. When PZP is smaller than PZPmax, the determined condition into step S-U13. When PZP advances to step S-U13. When PZP is larger than PZPmax, the determined condition is NO and the process advances to step S-U10 to execute a ZOOMSTOP subroutine, shown in FIG. 42, to stop the zooming lens group, before advancing to step S-U13, because, if the pulses which are outputted from the PZ pulser 49 are continuously outputted, even if they exceed PZPmax, battery power would be quickly consumed. Thus, it is necessary to stop the focusing lens group.

In step S-U13, a determination is made as to whether flag AFGO (representing whether the focusing lens group is being driven) has been set to 1. When the focusing lens group is not being driven, the determined condition is NO and the process advances to step S-U14 to determine whether flag PZGO (representing whether the zooming lens group is being driven) has been set to 1. When the zooming lens group is not being driven, the determined condition is NO and the process advances to step S-U18 to cancel the power hold. Processing is then completed.

When the process determines that the focusing lens group is being driven in step S-U14, or that the zooming lens group is being driven in step S-U14, the determined condition is YES and the process advances to step S-U15 to determine whether the sheltering time period has elapsed. When the sheltering time period has not elapsed, the determined condition is NO and the process advances to step S-U19 to determine whether the main switch, namely the lock switch SWLOCK, has been turned ON. When the switch has been turned OFF, the determined condition is NO and the process advances to step S-U1, so as to enter a loop. When the switch has been turned ON, the determined condition is YES and the process advances to step S-K1 in FIG. 30.

On the other hand, when the process advances from step S-U15 to step S-U16, the AFSTOP subroutine, shown in FIG. 41 is executed to stop the focusing lens group. Thereafter, the ZOOMSTOP subroutine, shown in FIG. 42, takes place to stop the zooming lens group. Then, the process cancels the power hold and ends the routine.

In the above embodiment, the zoom position is detected by the zoom code plate. However, it is obvious that modifications and variations of the present invention are possible. For example, as shown in FIG. 43, a reflection plate 64, for detecting a position which moves in a peripheral direction is mounted on the outer surface of a cam ring 29. A reflection type photo detector 65 is on an opposite side of the reflection plate 64. The photo detector 65 comprises a light emitting element (LED) which emits light to the reflection plate 64 and a light reception element which receives the light reflected from the reflection plate. In addition to the reflection plate 64, as shown in FIG. 44(A), a concentration changing type reflection plate, whose concentrations change from one side to other side, can also be used. As shown in FIG. 44(B), a bar code plate type reflection plate can also be used.

As shown in FIGS. 45 and 46, it is also possible to detect a zoom position by a change of an electrostatic capacity of a variable capacity type zoom position detection means, which comprises an electrode plate 66 fixed to the base of a cam ring 29 and an electrode plate 67 mounted on a fixing frame 27 on an opposite side of the electrode plate 66.

As shown in FIG. 47, a zoom position can be detected by a change of a variable resistor of a variable resistor type zoom position detection means, which comprises a resistor plate 68 that is fixed on the base of a cam ring 29 in the peripheral direction and a brush 69 which touches the resistor plate 68.

FIG. 48 conceptually shows the relationship between the power zoom mechanism and the pulser. In the first embodiment, the zoom code plate and PZ pulser are commonly used. However, it is possible to provide another zoom code plate along with such a pulser. On the other hand, another pulser substituted for the zoom code plate can be used along with the PZ pulser.

In FIG. 48, a gear 70 is provided on the base of a cam ring 29. The gear 70 is linked with PZ motor M2 through a speed reduction gear mechanism 71. The speed reduction gear mechanism 71 comprises a gear 72 which is engaged to the gear 70, a pinion 73 which is engaged with the gear 72, an idle shaft 74 with which the pinion 73 is engaged, and a gear 75 fixed to the idle shaft 74. A transparent type PZ pulser 49 is provided between the idle shaft 74 and a barrel, not shown. The PZ pulser 49 comprises a slit plate 76 fixed to the idle shaft 74 and a photo detector 77 positioned on a peripheral side of the slit plate 76. As shown in FIG. 49, the peripheral portion of the slit plate 76 has many slits 76a therein in which the pitches radiate in radius directions. The photo detector 77 is positioned in the manner that the peripheral portion of the slit plate 76 is surrounded by a light emission element 77a and a light reception element 77b. PZ motor M2 and the speed reduction gear mechanism 71 are not limited to the positions shown in the diagram. The positions can be changed considering other parts.

It is also possible to use a reflection type PZ pulser 49 besides the transparent type. FIGS. 50 and 51 show an example of a reflection type pulser. In this example, a reflection plate 78 is fixed to the idle shaft 74. Many reflection planes 78a, which extend in the radius directions of the reflection plate 78, are provided thereon. A reflection type photo detector 79, which functions like the photo detector 52, is on an opposite site of the reflection plate 78.

FIGS. 52 and 53 show another example of a reflection type pulser. In this example, a multiple side reflector 80, whose peripheral portion reflects light, is fixed to the idle shaft 74. On a peripheral plane of the multiple side reflector 80, a reflection type photo reflector 81, which functions like the photo detector 52, is positioned.

The means for selecting the image magnification constant value desired by the camera operator can be set in a number of ways. Numerous embodiments, not discussed herein, can be designed that accomplish the desired task of selecting a desired magnification value. The following embodiments are illustrative only and do not limit the scope of the invention. For example, a plurality of switches can be provided on the camera body, the camera lens, or both, to select one of a plurality of present magnification values. A second type of magnification value setting means can comprise an up/down switch that selects a particular magnification value. Alternatively, a single pushbutton switch can be employed that cycles through a predetermined number of magnification values.

Instead of limiting the magnification values to a limited number of settings, the magnification setting means can be designed to allow the selection of one magnification value from an infinite number of magnification values. Furthermore, a range of magnification values can be provided from which a magnification value is selected. Such a range can be based upon the type of lens attached to the camera body.

While the present embodiment of the invention describes prohibiting the release of the shutter until an image returns to an allowed 1range during an image magnification constant operation, other procedures can be developed without departing from the scope and intent of the present invention. For instance, a software program can be written, such that when a subject leaves an area wherein an image magnification constant operation can be performed, the image magnification constant operation is terminated, while the automatic focus operation of the camera continues to operate so that a photograph can be taken. Alternatively, the camera can be programmed to give either a visual, audible or visual and audible indication when the object to be photographed is no longer within the range of the camera's lens for the image magnification constant operation to correctly operate. Alternatively, the camera can be programmed such that when the object to be photographed leaves the image magnification constant range, the shutter release on the camera is inhibited until the object re-enters the range of the camera lens in which the image magnification constant operation can function. Furthermore, the auto-focus operation can be programmed to continue operating during this time so that the camera is prepared to take a photograph as soon as the object to be photographed returns to the range in which the image magnification constant operation is functional.

Various other procedures and variations of the above-described procedures are possible by preparing an appropriate software program that is executed by the camera microprocessor. It is even possible to create a software program embodying more than one procedure so that the camera body can choose a procedure based upon the lens and/or situation that exists at the time a picture is taken.

Figure 15A:
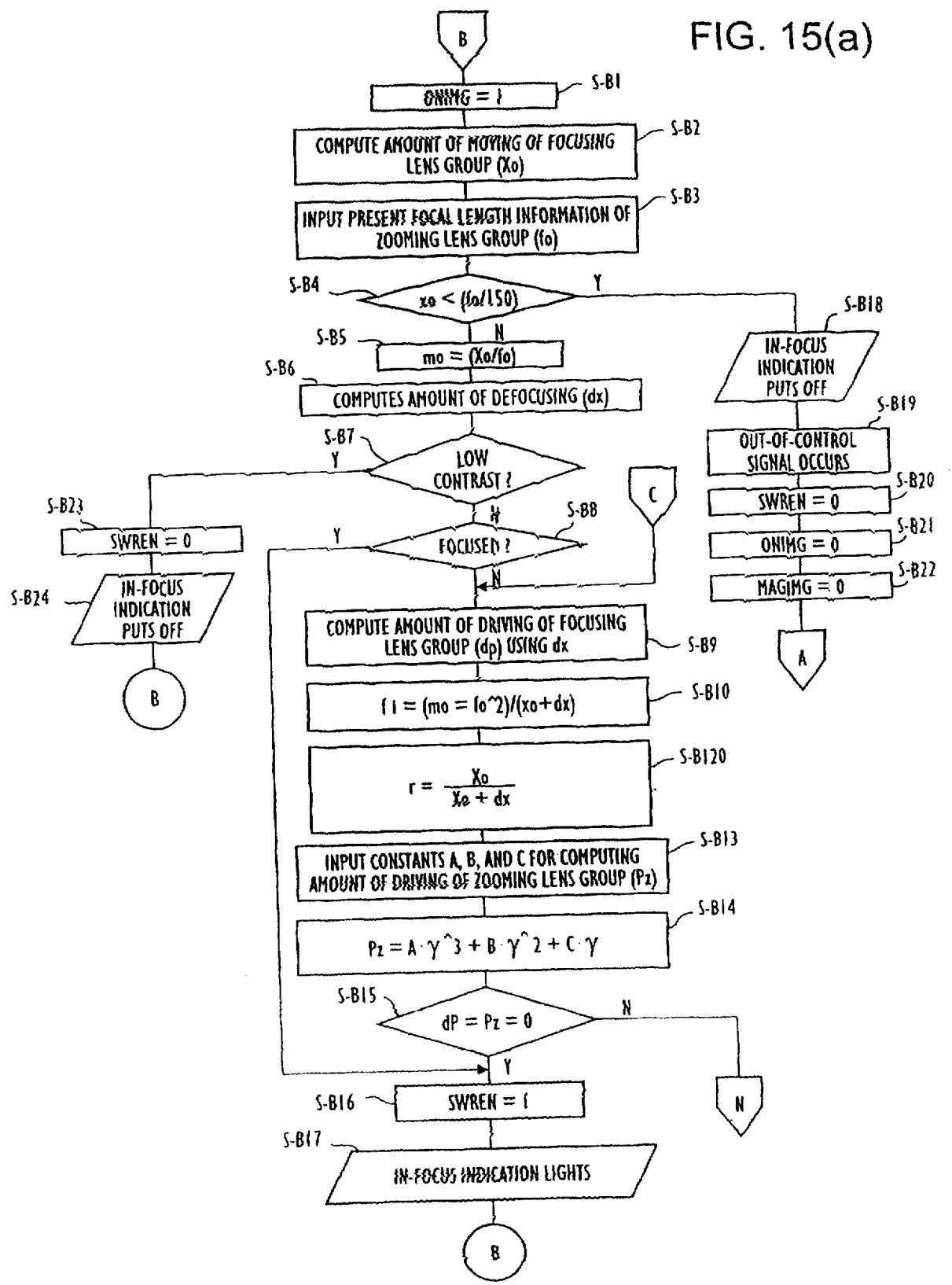
Figure 17A:
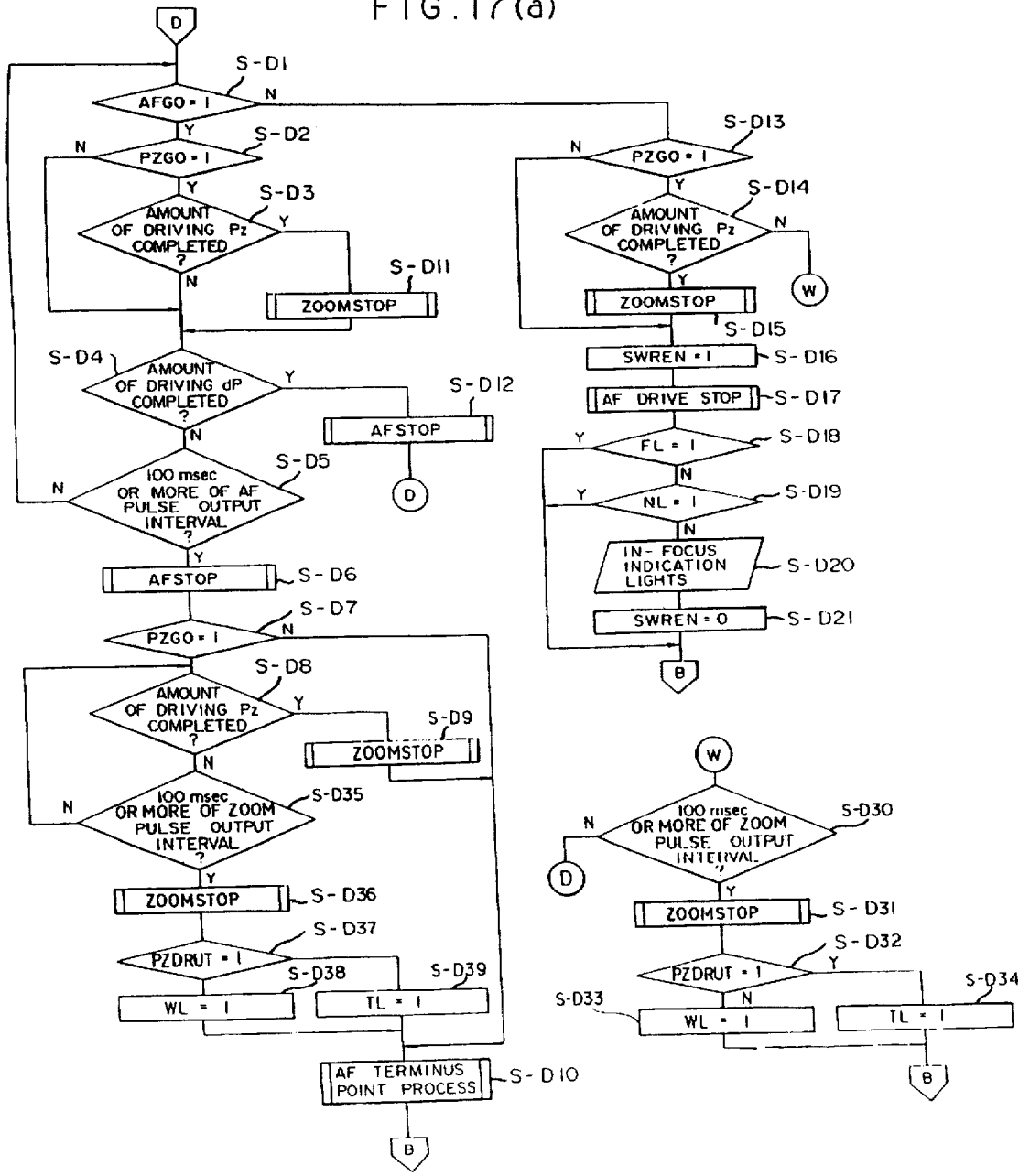

FIGS. 15(a) and 17(a) show a modified embodiment of the invention. In this modification, when a subject is moved out of a range where the image magnification can be controlled, the image magnification control can be temporarily stopped. When the subject moves back into the allowable range of the image magnification control, the image magnification control is resumed.

More particularly, as illustrated in FIG. 15(a), after step S-B10 is executed (which is the same as in FIG. 15 ), a control image magnification $$r = \frac{X_0}{X_0 + dX}$$

is computed at step S-B120.

Thereafter, processing returns to step S-B1 via steps S-B13 through S-B17. If the determined condition at step S-D14 (FIG. 17(a)) is NO, processing goes to step S-D30.

When the process advances to step S-D30, it determines whether the interval of the pulses being output from the PZ pulser 49 is at least 100 msec. When the determined condition is NO (less than 100 msec), the process advances to step S-D1 in FIG. 17(a) to enter a loop until the determined condition becomes YES. When the determined condition is YES, the process advances to step S-D31 to stop driving the zooming lens group. Thereafter, processing advances to step S-D32 to determine whether the direction of the zooming lens group is being driven towards the tele terminus. When the determined condition is YES, the process advances to step S-D33. When the determined condition is NO, the process advances to step S-D34. The process sets flag TL (representing whether the tele terminus of the zooming lens group is being detected) to 1 in step S-D33 and then returns back to step S-B1, shown in FIG. 15(a). The process sets flag WL (representing whether the wide terminus of the zooming lens group is being detected) to 1 in step S-D34 and then returns back to step S-B1 in FIG. 15(a).

Moreover, as in FIG. 17, the process determines whether the zooming lens group has been driven for Pz in step S-D8. When the determined condition is YES, the process advances to step S-D9. When the determined condition is NO, the process advances to step S-D35 to determine whether the interval of pulses being output from the PZ pulser 49 is at least 100 msec. When the determined condition is NO, the process returns back to step S-D8, so as to enter a loop until the zooming lens group has been driven for Pz. When the determined condition is YES, the process advances to step S-D36.

When the process advances to step S-D36, it stops driving the zooming lens group. After that, the process advances to step S-D37 to determine whether the zooming lens group is being driven towards the tele terminus. When the determined condition is YES, the process advances to step S-D38. When the determined condition is NO, the process advances to step S-D39. The process sets flag TL (representing whether the tele terminus of the zooming lens group is being detected) to 1 in step S-D39 and sets flag WL (representing whether the wide terminus of the zooming lens group is being detected) to 1 in step S-D38. After that, the process advances to step S-D10. The terminus point process takes place in step S-D10 and then processing returns back to step S-B1 in FIG. 15(a).

Figure 3A:
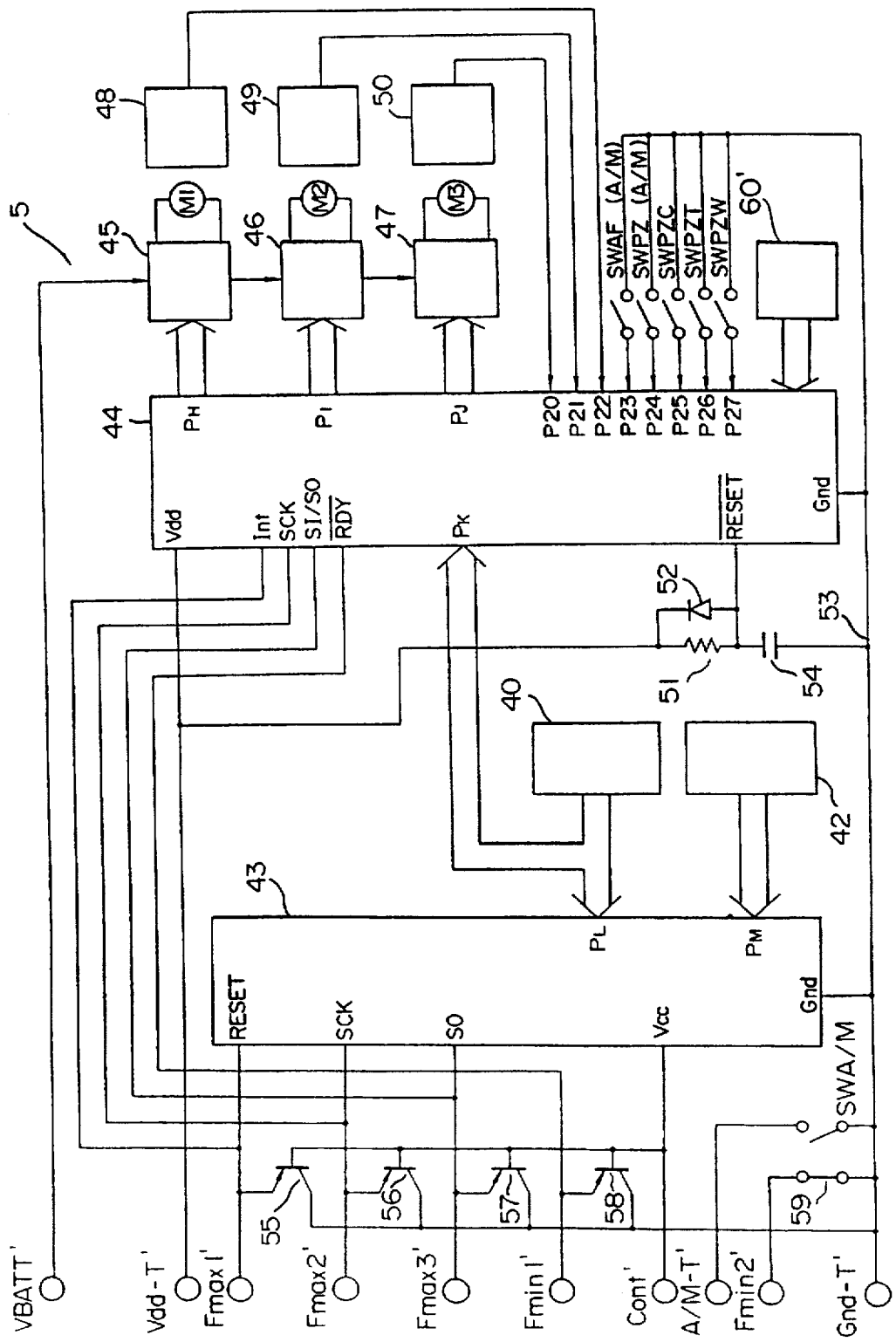
FIG. 3(a) is a modification of FIG. 3.
Figure 15B:
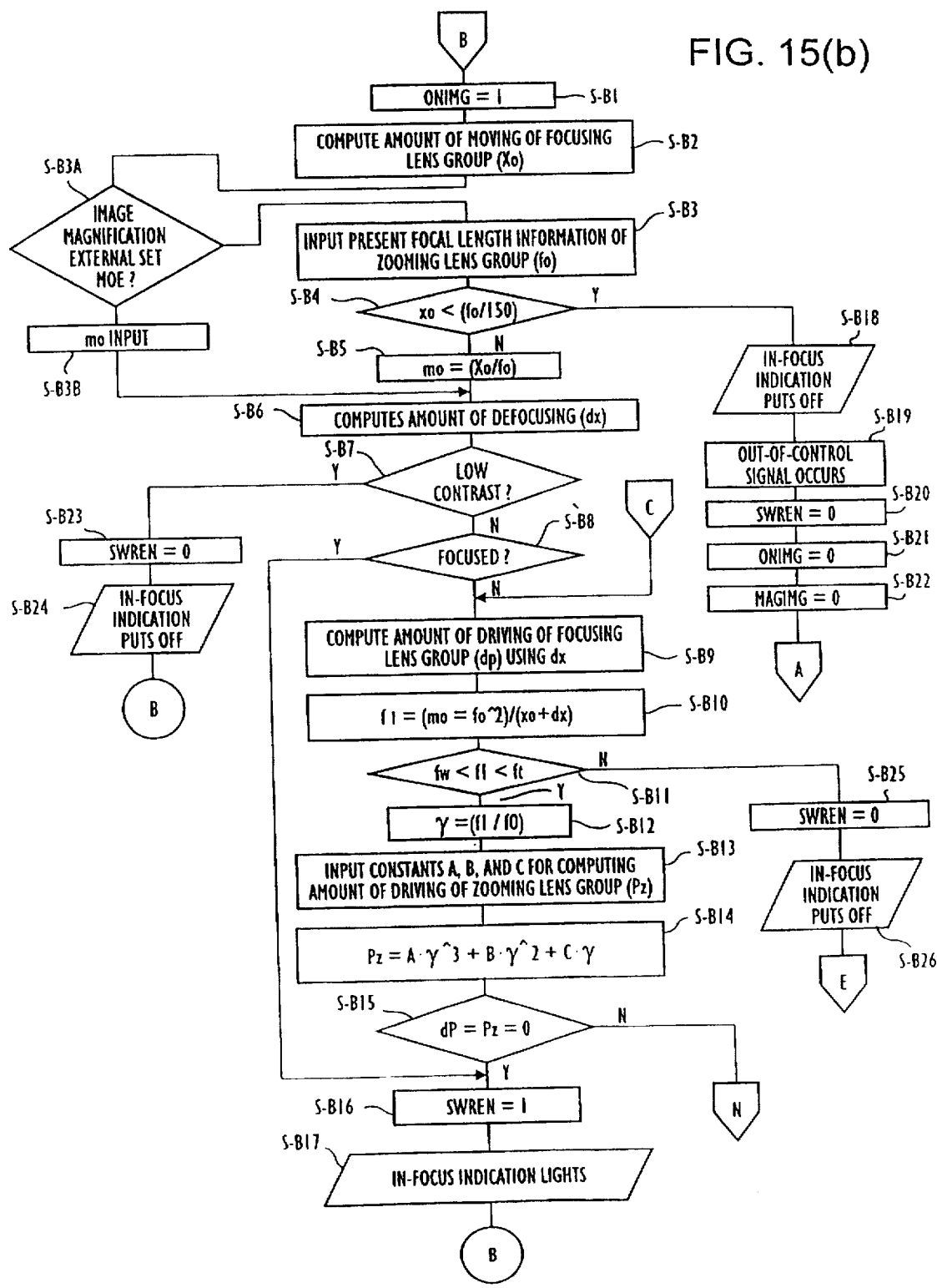

FIGS. 3(a), 14(a) and 15(b) show another modified embodiment of the invention. In this modification, the image magnification can be externally set.

More particularly, as illustrated in FIG. 3(a), an image magnification external setting switch SWIMG is employed which is connected to terminal P28 of the lens CPU 44. By turning ON the switch, a desired image magnification can be input from an image magnification external setting circuit 60'. The desired magnification being input from the image magnification external setting circuit 60' can be gradually or stepwise input. Switches SWPZC and SWIMG can be also provided on the body.

In this connection, as illustrated in FIG. 14(a), after step S5 is executed, it is determined whether the external image magnification setting mode is set at step S5', before advancing to step S6. If the answer is YES, the process goes to step S25, instead to S6.

Further, steps S-B3 and S-B3A in FIG. 15(b) are executed. In step S-B3A, the process determines whether the image magnification external setting means SWIMG has been turned ON. When the switch has been turned ON, the determined condition is YES and the process advances to step S-B3B. When the switch has not been turned ON, the determined condition is NO and the process advances to step S-B4 in FIG. 15(b). In step S-B3B, the process inputs the desired image magnification being set by switch SWIMG and then advances to step S-B6 in FIG. 15(b).

What is claimed is:

1. An image magnification control device for a camera, said device comprising:

means for effecting image magnification control of the camera;

means for monitoring the level of contrast of an object to be photographed; and means for disabling said image magnification control effecting means until such time as the monitored level of contrast of the object to be photographed reaches a prescribed minimum level.

2. The image magnification control device according to claim 1, wherein said effecting means effects image magnification control of the camera based upon one or more predetermined measured values.

3. An image magnification control device for a camera, said device comprising:

means for effecting image magnification control of the camera;

means for determining if the camera is in a macro mode; and means for disabling said image magnification control effecting means until such time as the camera is determined to be taken out of the macro mode.

4. The image magnification control device according to claim 3, wherein said effecting means effects image magnification control of the camera based upon one or more predetermined measured values.

* * * * *